United States Patent
Mizukami et al.

(10) Patent No.: US 7,483,676 B2
(45) Date of Patent: Jan. 27, 2009

(54) RADIO COMMUNICATION TERMINAL AND RADIO COMMUNICATION CONTROL METHOD

(75) Inventors: Hiromitsu Mizukami, Suwa (JP); Makoto Inoguchi, Nishitokyo (JP)

(73) Assignee: Seiko Epson Corporation (JP)

( * ) Notice: Subject to any disclaimer, the term of this patent is extended or adjusted under 35 U.S.C. 154(b) by 622 days.

(21) Appl. No.: 11/197,750

(22) Filed: Aug. 4, 2005

(65) Prior Publication Data

US 2006/0029018 A1  Feb. 9, 2006

(30) Foreign Application Priority Data

| Aug. 6, 2004 | (JP) | 2004-230279 |
| Nov. 24, 2004 | (JP) | 2004-338520 |
| Jul. 15, 2005 | (JP) | 2005-206549 |

(51) Int. Cl.
*H04B 7/00* (2006.01)

(52) U.S. Cl. ............... 455/68; 455/41.2; 455/553.1; 455/258

(58) Field of Classification Search ............ 455/41.2, 455/68, 553.1, 566, 132, 227, 230, 255, 258; 370/328, 498, 503
See application file for complete search history.

(56) References Cited

U.S. PATENT DOCUMENTS

| 5,144,668 A * | 9/1992 | Malek et al. ............. 375/134 |
| 5,541,954 A | 7/1996 | Emi |
| 7,185,244 B2 * | 2/2007 | Kojima et al. ............ 714/718 |
| 7,313,123 B2 * | 12/2007 | Haartsen .................. 370/342 |
| 2002/0080739 A1 | 6/2002 | Kuwahara |
| 2004/0266350 A1 * | 12/2004 | Kim ........................... 455/41.2 |

FOREIGN PATENT DOCUMENTS

| JP | 05-191378 | 7/1993 |
| JP | 07-030516 | 1/1995 |
| JP | 07-107010 | 4/1995 |
| JP | 07-147553 | 6/1995 |
| JP | 08-191260 | 7/1996 |
| JP | 10-257564 | 9/1998 |
| JP | 11-008571 | 1/1999 |
| JP | 2000-068904 | 3/2000 |
| JP | 2000-124406 | 4/2000 |
| JP | 2002-118497 | 4/2002 |
| JP | 2002-125039 | 4/2002 |
| JP | 2002-198867 | 7/2002 |
| JP | 2002-217800 | 8/2002 |
| JP | 2004-104475 | 4/2004 |
| JP | 2004-180230 | 6/2004 |
| JP | 2004-220264 | 8/2004 |

OTHER PUBLICATIONS

International Search Report for PCT/JP2005/014715 dated Nov. 14, 2005 (ISA/JP).

\* cited by examiner

*Primary Examiner*—Blane J Jackson
(74) *Attorney, Agent, or Firm*—Harness, Dickey & Pierce, P.L.C.

(57) ABSTRACT

A hopping control device selects one hopping pattern out of hopping patterns P1 to PN, reads out a hopping frequency sequence arranged in the selected hopping pattern from a frequency hopping pattern memory, and sends the hopping frequency sequence to frequency synthesizers as a frequency designation signal by wire at a predetermined period. The frequency synthesizers generate local oscillation signals of a frequency specified by the frequency designation signal, respectively, and output the local oscillator signals to mixers, respectively, to thereby perform communication by a frequency hopping system between a first housing unit and a second housing unit.

28 Claims, 25 Drawing Sheets

| HOPPING PATTERN P1 | HOPPING PATTERN P2 | ..... | HOPPING PATTERN PN |
|---|---|---|---|
| f1 | f14 | | f19 |
| f10 | f22 | | f1 |
| f27 | f31 | | f16 |
| f7 | f5 | ..... | f30 |
| f9 | f24 | | f22 |
| f12 | f7 | | f5 |
| ..... | ..... | | ..... |
| f22 | f3 | | f25 |

FIG. 5

RADIO COMMUNICATION TERMINAL AND RADIO COMMUNICATION CONTROL METHOD

FIELD OF THE INVENTION

The present invention relates to a radio communication terminal and a radio communication control method. In particular, the invention is suitably applied to a frequency-hopping radio communication system in which communication devices on a transmission side and a reception side communicate with each other while hopping transmission and reception frequencies in accordance with a predetermined hopping sequence.

BACKGROUND OF THE INVENTION

A frequency hopping system is an example of a spread spectrum radio communication technique. By using a frequency hopping system, it is possible to secure a large number of independent communication channels in a limited frequency band by selecting an appropriate hopping pattern.

In a communication system of the frequency hopping system, a transmission side communication apparatus and a reception side communication apparatus hop a transmission frequency and a reception frequency in synchronization with each other in accordance with an identical hopping sequence (a hopping pattern). An example of a hopping sequence of the transmission and the reception frequencies used in this case a hopping sequence having a relatively short repetition period and a hopping sequence having a long repetition period in order to improve confidentiality. Whether the hopping sequence is short or long, an acquisition technique for specifying which frequency in the hopping sequence is a transmission frequency currently used by the transmission side communication apparatus and synchronizing hopping timing of a reception frequency with the transmission side communication apparatus is important in the reception side communication apparatus.

A frequency hopping spectrum communication system is divided into a low-speed frequency-hopping spread spectrum system and a high-speed frequency-hopping spread spectrum system according to a relation between a data rate and a frequency hopping rate.

The low-speed frequency-hopping spread-spectrum communication system is a system in which the frequency hopping rate is lower than the data rate. The low-speed frequency-hopping spread-spectrum communication system transmits a plurality of symbols at one frequency. As examples of such low-speed frequency-hopping spread-spectrum communication systems, JP-A-7-30516 discloses a system for determining switching timing for a frequency that synchronizes frequencies of a transmitter and a receiver by counting the number of bits of demodulated information; JP-A-5-191378 discloses a method of including frequency information to be used next in a packet, and synchronizing working frequencies of a transmitter and a receiver by using the frequency information included in the packet; and JP-A-11-8571 discloses a system for detecting a shift of a frequency by performing f-V conversion to set a frequency on a reception side.

On the other hand, the high-speed frequency-hopping spread-spectrum communication system is a system in which the frequency hopping rate is higher than the data rate. The high-speed frequency-hopping spread-spectrum communication system transmits one system at a plurality of frequencies. In this system, since one symbol is transmitted at a plurality of frequencies, it is possible to obtain a satisfactory characteristic with respect to a frequency selective fading such as a multi-path fading. As in example of such a high-speed frequency-hopping spread-spectrum communication system, JP-A-8-191260 discloses a high-speed frequency-hopping spread-spectrum receiver which can perform acquisition of a hopping sequence in a short time, and a correlator and a synchronizer used in the high-speed frequency-hopping spread-spectrum receiver.

However, in the methods disclosed in JP-A-7-30516 and JP-A-5-191378, a working frequency is determined from a signal, which has passed through a demodulator, on the receiver side. Consequently, an initial acquisition cannot be performed unless there is a signal that is demodulated by the demodulator correctly. There is, therefore, a problem in that, for the initial acquisition, a user has to wait until frequencies of the transmitter and the receiver coincide with each other and, moreover, has to take measures for outputting a preamble signal that is required only for synchronizing frequencies.

In the method disclosed in JP-A-11-8571, since a shift of a frequency is detected by the f-V conversion to set a frequency on the reception side, a user has to wait until a frequency generated from a receiving station is stabilized after the shift of a frequency is detected. When this system is used for a communication system having an extremely broad band, it is necessary to use a linear f-V converter over a broad band.

In the method disclosed in JP-A-8-191260, a method of reducing time required for conventional acquisition of high-speed hopping is described. However, there is a problem in that, even if the method is used, time for correlating signals is still required and, moreover, a plurality of circuits for correlating signals are required to complicate a circuit of the receiver.

SUMMARY OF THE INVENTION

Thus, it is a first object of the invention to provide a radio communication terminal and a radio communication control method that are capable of performing a frequency hopping operation stably between a transmission side and a reception side without depending on a radio communication environment, and performing synchronization of frequency hopping quickly.

It is a second object of the invention to provide a radio communication terminal and a radio communication control method that are capable of performing a frequency hopping operation between a transmission side and a reception side without involving frequency offset, and making a preamble signal for frequency synchronization unnecessary. In order to solve the problems described above, a radio communication terminal according to an aspect of the invention includes a radio transmission unit that performs transmission processing for transmission data in accordance with a predetermined frequency hopping sequence, a radio reception unit that performs reception processing for reception data in accordance with a predetermined frequency hopping sequence, and a hopping control unit that sends, by wire, information for causing the radio communication terminal to perform frequency hopping in accordance with the frequency hopping sequences to both the radio transmission unit and the radio reception unit.

Such a configuration makes it possible for both the radio transmission unit and the radio reception unit to share, by wire, the information that causes the radio communication terminal to perform frequency hopping. Consequently, it is unnecessary to send the information for causing the radio communication terminal to perform frequency hopping by radio. It is unnecessary to estimate a hopping pattern from a reception signal on the radio reception unit side to perform initial acquisition. In addition, even in an inferior communication environment in which it is impossible to synchronize a frequency with a hopping pattern on a reception side correctly, it is possible to cause the radio communication terminal to perform frequency hopping stably in both the radio transmission unit and the radio reception unit. As a result, it is possible to simplify a circuit constitution of the radio reception unit, and it is unnecessary to output a preamble signal that is required only for synchronizing frequencies. Thus, it is possible to improve communication throughput.

A radio communication terminal according to another aspect of the invention includes a first radio transmission unit that performs transmission processing for transmission data in accordance with a first frequency hopping sequence, a first radio reception unit that performs reception processing for reception data in accordance with the first frequency hopping sequence, a second radio transmission unit that performs transmission processing for transmission data in accordance with a second frequency hopping sequence in which a hopping frequency at the time of transmission is set so as not to overlap a hopping frequency specified by the first frequency hopping sequence, a second radio reception unit that performs reception processing for reception data in accordance with the second frequency hopping sequence, and a hopping control unit that sends, by wire, information for causing the radio communication terminal to perform frequency hopping in accordance with the first frequency hopping sequence to both the first radio transmission unit and the first radio reception unit and sends, by wire, information for causing the radio communication terminal to perform frequency hopping in accordance with the second frequency hopping sequence to both the second radio transmission unit and the second radio reception unit.

This makes it possible for both the radio transmission units and the radio reception units to share the information that causes the radio communication terminal to perform frequency hopping while making it possible to prevent transmission data transmitted from the first radio transmission unit and transmission data transmitted from the second radio transmission unit from colliding with each other in an identical band. Therefore, it is possible to cause the radio communication terminal to perform two-way communication by the frequency hopping system stably even in an inferior communication environment in which it is impossible to synchronize a frequency with a hopping pattern on a reception side correctly.

According to still another aspect of the invention, in the radio communication terminal, the hopping control unit includes a hopping pattern acquiring unit that acquires a hopping pattern in which hopping frequencies are arranged so as not to overlap one another, and a hopping pattern delaying unit that delays an output of a hopping frequency included in the hopping pattern by one slot. The hopping control unit sends, by wire, a hopping pattern acquired by the hopping pattern acquiring unit to both the first radio transmission unit and the first radio reception unit in accordance with predetermined hopping timing and sends, by wire, a hopping pattern outputted from the hopping pattern delaying unit to both the second radio transmission unit and the second radio reception unit in accordance with the hopping timing.

Such a configuration makes it possible to prevent a hopping frequency at the time of transmission in the first radio transmission unit and a hopping frequency at the time of transmission in the second radio transmission unit from overlapping each other by delaying an output of a hopping frequency included in a hopping pattern. It is possible therefore, to prevent transmission data transmitted from the first radio transmission unit and transmission data transmitted from the second radio transmission unit from colliding with each other in an identical band while making it possible to simplify a circuit constitution. Thus, it is possible to cause the radio communication terminal to perform two-way communication by the frequency hopping system stably.

According to still another aspect of the invention, in the radio communication terminal, the first and the second radio transmission units and the first and the second radio reception units are arranged in an identical semiconductor chip, on an identical printed board, in an identical housing, in an identical module, in an identical package, or in apparatuses that are used integrally.

This makes it possible to perform data transmission in an identical product by radio, while making it possible for both the first and the second radio transmission units and the first and the second radio reception units to share, by wire, the information for causing the radio communication terminal to perform frequency hopping. As a result, it is possible to perform the data transmission in the identical product efficiently.

A radio communication terminal according to still another aspect of the invention includes a radio transmission unit that performs transmission processing for transmission data in accordance with a predetermined frequency hopping sequence, a radio reception unit that performs reception processing for reception data in accordance with a predetermined frequency hopping sequence, a first hopping control unit that performs frequency hopping control in the radio transmission unit, a second hopping control unit that performs frequency hopping control in the radio reception unit, and a wire control unit that performs control, by wire, between the first hopping control unit and the second hopping control unit such that the frequency hopping sequences of the radio transmission unit and the radio reception unit coincide with each other.

This makes it possible to cause the radio communication terminal to perform hopping control in the radio transmission unit and the radio reception unit separately, while causing frequency hopping sequences of the radio transmission unit and the radio reception unit to coincide with each other. Therefore, it is unnecessary to send, by radio, information for causing the radio communication terminal to perform frequency hopping. In addition, it is possible to reduce the load by the wire control unit and to control deterioration in a quality of radio communication by the frequency hopping system while coping with high-speed hopping.

According to still another aspect of the invention, the radio communication terminal includes a first hopping pattern storing unit that is provided on the first hopping control unit side and stores a hopping pattern in which hopping frequencies are arranged, and a second hopping pattern storing unit that is provided on the second hopping control unit side and stores a hopping pattern identical with the hopping pattern stored in the first hopping pattern storing unit. The wire control unit performs selection of a hopping pattern and setting of an initial phase at the time of start of communication such that hopping patterns and hopping timings of the radio transmission unit and the radio reception unit coincide with each other.

This makes it possible to cause the radio communication terminal to perform hopping control in the radio transmission unit and the radio reception unit separately, and cause frequency hopping sequences of the radio transmission unit and the radio reception unit to coincide with each other by performing selection of a hopping pattern and setting of an initial phase at the time of start of communication. Therefore, it is possible to cause the radio communication terminal to perform frequency hopping in both the radio transmission unit and the radio reception unit stably without performing control by the wire control unit at every hopping timing. Thus, it is possible to control deterioration in a quality of radio communication by the frequency hopping system while coping with high-speed hopping.

According to still another aspect of the invention, the first hopping control unit includes a first hopping pattern generating unit that generates a hopping pattern in which hopping frequencies are arranged. A second hopping control unit includes a second hopping pattern generating unit that generates a hopping pattern identical with the hopping pattern generated by the first hopping pattern generating unit. A wire control unit causes the radio communication terminal to send a reset signal for causing hopping timings of the hopping patterns to coincide with each other between the first hopping control unit and the second hopping control unit.

This makes it possible to cause the radio communication terminal to perform hopping control in the radio transmission unit and the radio reception unit separately, and cause frequency hopping sequences of the radio transmission unit and the radio reception unit to coincide with each other by sending a reset signal by wire at the time of start of communication. Therefore, it is possible to cause the radio communication terminal to perform frequency hopping stably in both the radio transmission unit and the radio reception unit without performing control by the wire control unit at every hopping timing. Thus, it is possible to control deterioration in a quality of radio communication by the frequency hopping system while coping with high-speed hopping.

According to still another aspect of the invention, the radio communication terminal further includes a slot length setting unit that sets a slot length on the basis of an amount of data in data communication. At least one of the first and the second hopping control units changes a hopping frequency at the time of communication on the basis of a slot length set by the slot length setting unit.

This makes it possible to change a slot length while both the radio transmission unit and the radio reception unit share information for causing the radio communication terminal to perform frequency hopping. Therefore, it is possible to cause the radio communication terminal to perform data communication efficiently while making it possible to cause the radio communication terminal to perform frequency hopping stably in both the radio transmission unit and the radio reception unit. Thus, even in an inferior communication environment in which it is impossible to synchronize a frequency with a hopping pattern on a reception side correctly, it is possible to control deterioration in a quality of radio communication by the frequency hopping system. In addition, it is possible to improve communication throughput.

According to still another aspect of the invention, the radio communication terminal further includes an error rate detecting unit that detects an error rate of reception data received by the radio reception unit, and a hopping sequence changing unit that changes the frequency hopping sequence on the basis of an error rate detected by the error rate detecting unit.

This makes it possible to adaptively change a hopping frequency while both the radio transmission unit and the radio reception unit share information for causing the radio communication terminal to perform frequency hopping. Therefore, it is possible to cause the radio communication terminal to perform frequency hopping stably in both the radio transmission unit and the radio reception unit while avoiding a frequency with a poor communication state. Thus, even in an inferior communication environment in which it is impossible to synchronize a frequency with a hopping pattern on a reception side correctly, it is possible to control deterioration in a quality of radio communication by the frequency hopping system. In addition, it is possible to improve communication throughput.

A radio communication terminal according to still another aspect of the invention includes a local oscillator that generates a local oscillation signal, a radio transmission unit that performs transmission processing for radio communication data while receiving supply of the local oscillation signal, a radio reception unit that performs reception processing for radio communication data while receiving supply of the local oscillation signal, and a wire unit that supplies the local oscillation signal to the radio transmission unit and the radio reception unit by wire.

This makes it possible to perform transmission processing and reception processing with an identical local oscillation signal as a reference, and always secure a reproduction clock for a same frequency between the radio transmission unit and the radio reception unit. Therefore, it is possible to prevent occurrence of an error due to stability of an oscillation frequency and frequency accuracy. In addition, it is possible to establish a communication circuit with high stability even when an inexpensive local oscillator is used.

According to still another aspect of the invention, the radio communication terminal further includes a frequency control unit that controls a frequency of a local oscillation signal generated by the local oscillator.

This makes it possible to cause the radio communication terminal to perform spread spectrum radio communication while always synchronizing the radio transmission unit and the radio reception unit with an identical frequency. Thus, it is possible to secure a large number of independent communication channels in a limited frequency band while realizing simplification of a circuit constitution.

A radio communication terminal according to still another aspect of the invention includes a radio transmission unit that performs transmission processing for radio communication data while receiving supply of a local oscillation signal, a radio reception unit that performs reception processing for radio communication data while receiving supply of the local oscillation signal, a local oscillator that generates the local oscillation signal, a control unit that causes the radio communication terminal to perform hopping or chirping for a frequency of a local oscillation signal generated by the local oscillator, and a wire unit that supplies a local oscillation signal. A frequency of the local oscillation signal changes according to the hopping or the chirping, to the radio transmission unit, and the radio reception unit by wire.

This makes it possible for both the radio transmission unit and the radio reception unit to share, by wire, a local oscillation signal, a frequency of which changes according to hopping or chirping. Therefore, even when radio communication of a frequency hopping system or a frequency chirping system is performed, it is possible to cause the radio transmission unit and the radio reception unit to always operate in synchronization with an identical frequency. Thus, it is unnecessary to estimate a hopping pattern or a chirping pattern from a reception signal on the radio reception unit side to perform initial acquisition. In addition, even in an inferior communication environment in which it is impossible to synchronize a frequency with a hopping pattern or a chirping pattern on a reception side correctly, it is possible to cause the radio communication terminal to perform frequency hopping or frequency chirping stably in both the radio transmission unit and the radio reception unit. As a result, it is possible to simplify a circuit constitution of the radio reception unit. In addition, it is unnecessary to output a preamble signal that is required only for synchronizing frequencies. Thus, it is possible to improve communication throughput.

According to still another aspect of the invention, in the radio communication terminal, the radio transmission unit includes a first frequency multiplying circuit that multiplies a frequency of the local oscillation signal to thereby generated first carrier signal. A first mixer mixes the first carrier signal in a base band signal to thereby perform up-convert for the base band signal. The radio reception unit includes a second frequency multiplying circuit that multiplies a frequency of the local oscillation signal to generate a detection signal, and a second mixer that mixes the detection signal in a reception signal to thereby perform down-convert for the reception signal.

Such a configuration makes it possible to perform up-convert and down-convert while changing a frequency in the same manner as in hopping or chirping. Even when radio communication of the frequency hopping system or the frequency chirping system is performed, it is possible to cause the radio transmission unit and the radio reception unit to always operate in synchronization with an identical frequency. Therefore, it is unnecessary to exchange information for causing the radio communication terminal to perform frequency hopping or frequency chirping between a reception side and a transmission side. Thus, even in an inferior environment in which it is impossible to synchronize a frequency with a hopping pattern or a chirping pattern on the reception side correctly, it is possible to control deterioration in a quality of radio communication by the frequency hopping system or the frequency chirping system.

According to still another aspect of the invention, the radio communication terminal further includes an error rate detecting unit that detects an error rate of reception data received by the radio reception unit. The control unit changes a hopping frequency or a chirping frequency at the time of communication on the basis of an error rate detected by the error rate detecting unit.

This makes it possible to adaptively change a hopping frequency or a chirping frequency while both the radio transmission unit and the radio reception unit share, by wire, a local oscillation signal, a frequency of which changes according to hopping or chirping. Therefore, it is possible to cause the radio communication terminal to perform frequency hopping or frequency chirping stably in both the radio transmission unit and the radio reception unit while avoiding a frequency with a poor communication state. Thus, even in an inferior communication environment in which it is impossible to synchronize a frequency with a hopping pattern or a chirping pattern on a reception side correctly, it is possible to control deterioration in a quality of radio communication by the frequency hopping system or the frequency chirping system. In addition, it is possible to improve communication throughput.

According to still another aspect of the invention, in the radio communication terminal, the radio transmission unit and the radio reception unit are arranged in an identical semiconductor chip, on an identical printed board, in an identical housing, in an identical module, in an identical package, or in apparatuses that are used integrally.

This makes it possible to perform data transmission in an identical product by radio, while making it possible for both the first and the second radio transmission units and the first and the second radio reception units to share, by wire, information for causing the radio communication terminal to perform frequency hopping. Thus, it is possible to perform the data transmission in the identical product efficiently.

A radio communication terminal according to still another aspect of the invention includes a first radio transmission unit that performs transmission processing for radio communication data while receiving supply of a first local oscillation signal, a first radio reception unit that performs reception processing for radio communication data while receiving supply of the first local oscillation signal, a first local oscillator that generates the first local oscillation signal, a second radio transmission unit that performs transmission processing for radio communication data while receiving supply of a second local oscillation signal, a second radio reception unit that performs reception processing for radio communication data while receiving supply of the second local oscillation signal, a second local oscillator that generates the second local oscillation signal, a control unit that causes the radio communication terminal to perform hopping or chirping for frequencies of the first and the second local oscillation signals generated by the first and the second local oscillators, respectively, such that frequencies outputted from the first and the second local oscillators do not overlap each other. A first wire unit supplies, by wire, the first local oscillation signal, a frequency of the first local oscillation signal changes according to the hopping or the chirping. The first local oscillation signal is supplied to the first radio transmission unit and the first radio reception unit. A second wire unit supplies, by wire, the second local oscillation signal. A frequency of the second local oscillation signal changes according to the hopping or the chirping. The second local oscillation signal is supplied to the second radio transmission unit and the second radio reception unit.

This makes it possible for both the radio transmission units and the radio reception units to share, by wire, a local oscillation signal, a frequency of which changes according to hopping or chirping, while making it possible to prevent transmission data transmitted from the first radio transmission unit and transmission data transmitted from the second radio transmission unit from colliding with each other in an identical band. Therefore, even in an inferior communication environment in which it is impossible to synchronize a frequency with a hopping pattern or a chirping pattern on a reception side correctly, it is possible to cause the radio communication terminal to perform two-way communication by the frequency hopping system or the frequency chirping system stably.

According to still another aspect of the invention, the radio communication terminal further includes an error rate detecting unit that detects an error rate of reception data received at least one of the first radio reception unit and the second radio reception unit. The control unit changes a hopping frequency or a chirping frequency at the time of communication on the basis of an error rate detected by the error rate detecting unit.

This makes it possible to adaptively change a hopping frequency or a chirping frequency while both the radio transmission units and the radio reception units share, by wire, a local oscillation signal, a frequency of which changes according to hopping or chirping. Therefore, it is possible to cause the radio communication terminal to perform frequency hopping or frequency chirping stably in both the radio transmission units and the radio reception units while avoiding a frequency with a poor communication state. Thus, even in an inferior communication environment in which it is impossible to synchronize a frequency with a hopping pattern or a chirping pattern on a reception side correctly, it is possible to control deterioration in a quality of radio communication by the frequency hopping system or the frequency chirping system. In addition, it is possible to improve communication throughput.

According to still another aspect of the invention, the radio communication terminal further includes a slot length setting unit that sets a slot length on the basis of an amount of data in data communication. The control unit changes a hopping frequency or a chirping frequency at the time of communication on the basis of a slot length set by the slot length setting unit.

This makes it possible to change a slot length while both the radio transmission units and the radio reception units share, by wire, a local oscillation signal, a frequency of which changes according to hopping or chirping. Therefore, it is possible to cause the radio communication terminal to perform data communication efficiently while making it possible to cause the radio communication terminal to perform frequency hopping or frequency chirping stably in both the radio transmission units and the radio reception units. Thus, even in an inferior communication environment in which it is impossible to synchronize a frequency with a hopping pattern or a chirping pattern on a reception side correctly, it is possible to control deterioration in a quality of radio communication by the frequency hopping system or the frequency chirping system. In addition, it is possible to improve communication throughput.

According to still another aspect of the invention, in the radio communication terminal, the first and the second radio transmission units and the first and the second radio reception units are arranged in an identical semiconductor chip, on an identical printed board, in an identical housing, in an identical module, in an identical package, or in apparatuses that are used integrally.

This makes it possible to perform data transmission by radio in an identical product while making it possible for both the radio transmission units and the radio reception units to share, by wire, information for causing the radio communication terminal to perform frequency hopping. Thus, it is possible to perform data transmission in the identical product efficiently.

A radio communication terminal according to still another aspect of the invention includes a first housing unit, a second housing unit coupled to the first housing unit, a coupling unit that couples the first housing unit and the second housing unit such that a positional relation between the first housing unit and the second housing unit can be changed, an antenna for external radio communication mounted on the first housing unit or the second housing unit, an external radio communication control unit that is mounted on the first housing unit and mainly manages control for external radio communication performed via the antenna for external radio communication, a display unit mounted on the second housing unit, a first antenna for internal radio communication mounted on the first housing unit, a second antenna for internal radio communication mounted on the second housing unit, a first internal radio communication control unit that is mounted on the first housing unit and performs internal radio communication processing while receiving supply of a local oscillation signal, a second internal radio communication control unit that is mounted on the second housing unit and performs internal radio communication processing while receiving supply of the local oscillation signal, a local oscillator that generates the local oscillation signal, a control unit that causes the radio communication terminal to perform hopping or chirping for a frequency of a local oscillation signal generated by the local oscillator, and a wire unit that supplies, by wire, a local oscillation signal, a frequency of which changes according to the hopping or the chirping, to both the first and the second internal radio communication control units.

This makes it possible for both a radio transmission unit and a radio reception unit to share, by wire, a local oscillation signal, a frequency of which changes according to hopping or chirping. Therefore, it is unnecessary to send information for causing the radio communication terminal to perform frequency hopping or frequency chirping by radio. Thus, even in an inferior communication environment in which it is impossible to synchronize a frequency with a hopping pattern or a chirping pattern on a reception side correctly, it is possible to control deterioration in a quality of internal radio communication by the frequency hopping system or the frequency chirping system. In addition, it is possible to control an increase in a transmission amount of data sent by wire between the first housing unit and the second housing unit while coping with an increase in a transmission amount of data between the first housing unit and the second housing unit. As a result, it is possible to change a positional relation between the first housing unit and the second housing unit without complicating a structure of the coupling unit. Thus, it is possible to realize a reduction in size and thickness and improvement of reliability of the radio communication terminal while controlling an increase in cost. In addition, it is possible to realize an increase in size of a screen and an increase in functions of the radio communication terminal without spoiling portability of the radio communication terminal.

A radio communication terminal according to still another aspect of the invention includes first and second circuit blocks formed on an identical semiconductor chip, a first antenna for internal radio communication formed on the semiconductor chip in association with the first circuit block, a second antenna for internal radio communication formed on the semiconductor chip in association with the second circuit block, a first internal radio communication control unit that is mounted on the semiconductor chip in association with the first circuit block and performs data transmission between the first and the second circuit blocks through internal radio communication in accordance with a predetermined frequency hopping sequence, a second internal radio communication control unit that is mounted on the semiconductor chip in association with the second circuit block and performs data transmission between the first and the second circuit blocks through internal radio communication in accordance with a predetermined frequency hopping sequence, and a hopping control unit that sends, by wire, information for causing the radio communication terminal to perform frequency hopping in accordance with the frequency hopping sequences to both the first and the second internal radio communication control units.

This makes it possible to cause the radio communication terminal to perform communication by radio between the circuit blocks formed on the identical semiconductor chip while making it possible to cause the radio communication terminal to perform various kinds of processing on the semiconductor chip. Therefore, it is possible to reduce the number of wirings formed on the semiconductor chip. Thus, it is possible to improve the degree of freedom in layout designs for the semiconductor chip. In addition, it is possible to cause the radio communication terminal to exchange a large quantity of data in the semiconductor chip at high speed.

A radio communication terminal according to still another aspect of the invention includes first and second semiconductor chips packaged on a packaging substrate, a first antenna for internal radio communication formed on the first semiconductor chip, a second antenna for internal radio communication formed on the second semiconductor chip, a first internal radio communication control unit that is mounted on the first semiconductor chip and performs data transmission between the first and the second semiconductor chips through internal radio communication in accordance with a predetermined frequency hopping sequence, a second internal radio communication control unit that is mounted on the second semiconductor chip and performs data transmission between the first and the second semiconductor chips through internal radio communication in accordance with a predetermined frequency hopping sequence, and a hopping control unit that sends, by wire, information for causing the radio communication terminal to perform frequency hopping in accordance with the frequency hopping sequences to both the first and the second internal radio communication control units.

This makes it possible to cause the radio communication terminal to perform communication between the semiconductor chips packaged on the packaging substrate by radio and reduce the number of wirings formed on the packaging substrate. Therefore, it is possible to improve the degree for freedom of layout designs of the packaging substrate. In addition, it is possible to cause the radio communication terminal to perform exchange of a large quantity of data on the packaging substrate at high speed.

A radio communication terminal according to still another aspect of the invention includes a first packaging substrate on which a first semiconductor chip is packaged, a second packaging substrate on which a second semiconductor chip is packaged, a first antenna for internal radio communication that is formed on the first packaging substrate and connected to the first semiconductor chip, a second antenna for internal radio communication that is formed on the second packaging substrate and connected to the second semiconductor chip, a first internal radio communication control unit that is mounted on the first semiconductor chip and performs data transmission between the first and the second packaging substrates through internal radio communication in accordance with a predetermined frequency hopping sequence, a second internal radio communication control unit that is mounted on the second semiconductor chip and performs data transmission between the first and the second packaging substrates through internal radio communication in accordance with a predetermined frequency hopping sequence, and a hopping control unit that sends, by wire, information for causing the radio communication terminal to perform frequency hopping in accordance with the frequency hopping sequences to both the first and the second internal radio communication control units.

This makes it possible to cause the radio communication terminal to perform communication between the packaging substrates by radio and reduce the number of wirings formed between the packaging substrates. Therefore, it is possible to improve the degrees of freedom for layout designs of the packaging substrates. In addition, it is possible to cause the radio communication terminal to perform exchange of a large quantity of data between the packaging substrates at high speed.

A radio communication terminal according to still another aspect of the invention includes a first housing unit, a second housing unit coupled to the first housing unit, a coupling unit that couples the first housing unit and the second housing unit such that a positional relation between the first housing unit and the second housing unit can be changed, an antenna for external radio communication mounted on the first housing unit or the second housing unit, an external radio communication control unit that is mounted on the first housing unit and mainly manages control for external radio communication performed via the antenna for external radio communication, a display unit mounted on the second housing unit, a first antenna for internal radio communication mounted on the first housing unit, a second antenna for internal radio communication mounted on the second housing unit, a first internal radio communication control unit that is mounted on the first housing unit and performs internal radio communication processing in accordance with a predetermined frequency hopping sequence, a second internal radio communication control unit that is mounted on the second housing unit and performs internal radio communication processing in accordance with a predetermined frequency hopping sequence; and a hopping control unit that sends, by wire, information for causing the radio communication terminal to perform frequency hopping in accordance with the frequency hopping sequences to both the first and the second internal radio communication control units.

This makes it possible for both the first and the second internal radio communication control units to share information that causes the radio communication terminal to perform frequency hopping. Therefore, it is unnecessary to send information that causes the radio communication terminal to perform frequency hopping by radio. Thus, even in an inferior communication environment in which it is impossible to synchronize a frequency with a hopping pattern on a reception side correctly, it is possible to control deterioration in a quality of internal radio communication by the frequency hopping system. In addition, it is possible to control an increase in a transmission amount of data sent by wire between the first housing unit and the second housing unit while coping with an increase in the increase in a transmission amount of data between the first housing unit and the second housing unit. As a result, it is possible to change a positional relation between the first housing unit and the second housing unit without complicating a structure of the coupling unit. Thus, it is possible to realize a reduction in size and thickness and improvement of reliability of the radio communication terminal while controlling an increase in cost. In addition, it is possible to realize an increase in size of a screen and an increase in functions of the radio communication terminal without spoiling portability of the radio communication terminal.

A radio communication terminal according to still another aspect of the invention includes first and second circuit blocks formed on an identical semiconductor chip, a first antenna for internal radio communication formed on the semiconductor chip in association with the first circuit block, a second antenna for internal radio communication formed on the semiconductor chip in association with the second circuit block, a local oscillator that generates a local oscillation signal, a frequency control unit that causes the radio communication terminal to perform hopping or chirping for a frequency of a local oscillation signal generated by the local oscillator, a first internal radio communication control unit that is mounted on the semiconductor chip in association with the first circuit block and performs data transmission between the first and the second circuit blocks through internal radio communication while receiving supply of a local oscillation signal, a frequency of which is controlled by the frequency control unit, by wire, and a second internal radio communication control unit that is mounted on the semiconductor chip in association with the second circuit block and performs data transmission between the first and the second circuit blocks through internal radio communication while receiving supply of a local oscillation signal, a frequency of which is controlled by the frequency control unit, by wire.

This makes it possible to cause the radio communication terminal to perform communication between the circuit blocks formed on the identical semiconductor chip by radio, while making it possible to cause the radio communication terminal to perform various kinds of processing on the semiconductor chip. Therefore, it is possible to reduce the number of wirings formed on the semiconductor chip and improve the degrees of freedom for layout designs of the semiconductor chip. In addition, it is possible to cause the radio communication terminal to exchange a large quantity of data in the semiconductor chip at high speed.

A radio communication terminal according to still another aspect of the invention includes first and second semiconductor chips packaged on a packaging substrate, a first antenna for internal radio communication formed on the first semiconductor chip, a second antenna for internal radio communication formed on the second semiconductor chip, a local oscillator that generates a local oscillation signal, a frequency control unit that causes the radio communication terminal to perform hopping or chirping for a frequency of a local oscillation signal generated by the local oscillator, a first internal radio communication control unit that is mounted on the first semiconductor chip and performs data transmission between the first and the second semiconductor chips through internal radio communication while receiving supply of a local oscillator signal, a frequency of which is controlled by the frequency control unit, by wire, and a second internal radio communication control unit that is mounted on the second semiconductor chip and performs data transmission between the first and the second semiconductor chips through internal radio communication while receiving supply of a local oscillation signal, a frequency of which is controlled by the frequency control unit, by wire.

This makes it possible to cause the radio communication terminal to communicate between the semiconductor chips packaged on the packaging substrate by radio and reduce the number of wirings formed on the packaging substrate. Therefore, it is possible to improve the degrees of freedom for layout designs of the packaging substrate. In addition, it is possible to cause the radio communication terminal to exchange a large quantity of data on the packaging substrate at high speed.

A radio communication terminal according to still another aspect of the invention includes a first packaging substrate on which a first semiconductor chip is packaged, a second packaging substrate on which a second semiconductor chip is packaged, a first antenna for internal radio communication that is formed on the first packaging substrate and connected to the first semiconductor chip, a second antenna for internal radio communication that is formed on the second packaging substrate and connected to the second semiconductor chip, a local oscillator that generates a local oscillation signal, a frequency control unit that causes the radio communication terminal to perform hopping or chirping for a frequency of a local oscillation signal generated by the local oscillator, a first internal radio communication control unit that is mounted on the first semiconductor chip and performs data transmission between the first and the second packaging substrates through internal radio communication while receiving supply of a local oscillation signal, a frequency of which is controlled by the frequency control unit, by wire, and a second internal radio communication control unit that is mounted on the second semiconductor chip and performs data transmission between the first and the second packaging substrates through internal radio communication while receiving a local oscillation signal, a frequency of which is controlled by the frequency control unit, by wire.

This makes it possible to cause the radio communication terminal to communicate between the packaging substrates by radio and reduce the number of wirings formed between the packaging substrates. Therefore, it is possible to improve the degrees of freedom for layout designs of the packaging substrates. In addition, it is possible to cause the radio communication terminal to exchange a large quantity of data between the packaging substrates at high speed.

A radio communication control method according to still another aspect of the invention includes causing a transmission side and a reception side to perform data transmission of a frequency hopping system while supplying, by wire, information for causing the radio communication terminal to perform frequency hopping in accordance with a predetermined frequency hopping sequence to both the transmission side and the reception side.

This makes it possible for the transmission side and the reception side to share, by wire, information for causing the radio communication terminal to perform frequency hopping. Therefore, it is unnecessary to send information that causes the radio communication terminal to perform frequency hopping by radio. Thus, even in an inferior communication environment in which it is impossible to synchronize a frequency with a hopping pattern on the reception side correctly, it is possible to control deterioration in a quality of radio communication by the frequency hopping system.

A radio communication control method according to still another aspect of the invention includes causing a transmission side and a reception side to perform radio communication of a frequency hopping system or a frequency chirping system between the transmission side and the reception side while supplying, by wire, a local oscillation signal, a frequency of which changes according to hopping or chirping, to both the transmission side and the reception side.

This makes it possible for both the radio transmission unit and the radio reception unit to share, by wire, a local oscillation signal, a frequency of which changes according to hopping or chirping. Therefore, it is unnecessary to send information for causing the radio communication terminal to perform frequency hopping or frequency chirping by radio. Thus, even in an inferior communication environment in which it is impossible to synchronize a frequency with a hopping pattern or a chirping pattern on the reception side, it is possible to control deterioration in a quality of radio communication by the frequency hopping system or the frequency chirping system.

BRIEF DESCRIPTION OF THE DRAWINGS

FIG. 5 is a table showing an example of a constitution of a frequency hopping pattern;

DETAILED DESCRIPTION OF THE PREFERRED EMBODIMENTS

Radio communication terminals according to embodiments of the invention will be hereinafter explained with reference to the drawings.

Figure 1:
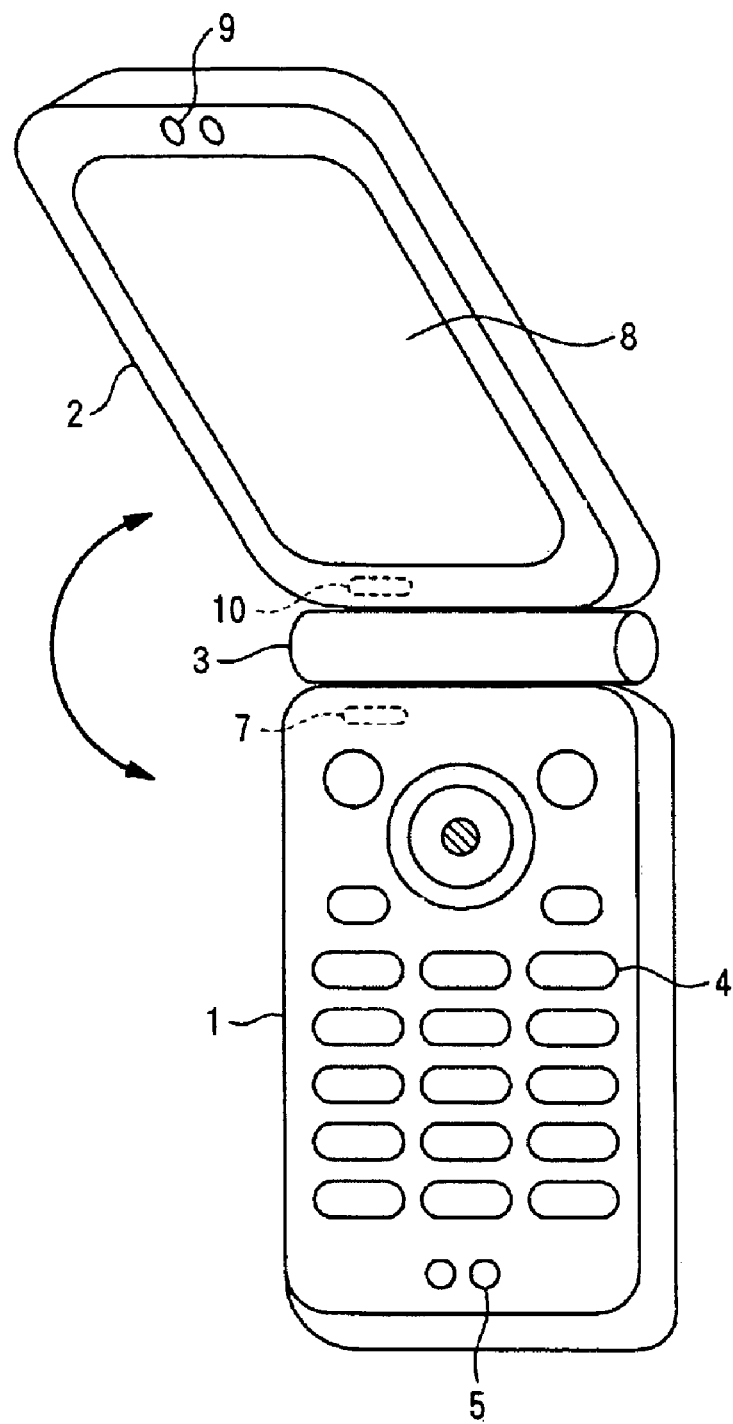
FIG. 1 is a perspective view showing a state in which a clam shell cellular phone, to which a radio communication control method of the invention is applied, is opened.
Figure 2:
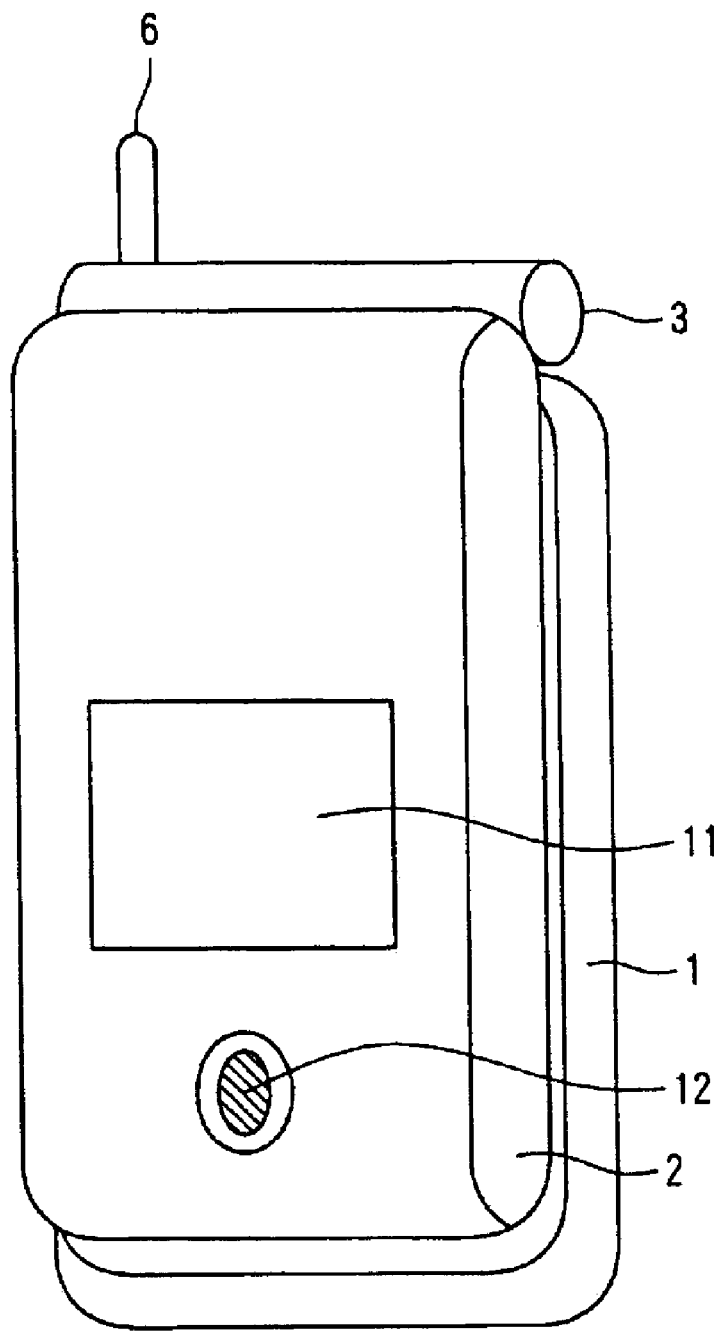
FIG. 2 is a perspective view showing a state in which the clam shell cellular phone, to which a radio communication control method of the invention is applied, is closed.

FIG. 1 is a perspective view showing a state in which a clam shell cellular phone, to which a radio communication control method of the invention is applied, is opened. FIG. 2 is a perspective view showing a state in which the clam shell cellular phone, to which the radio communication control method of the invention is applied, is closed.

In FIGS. 1 and 2, operation buttons 4 are arranged on a surface of a first housing unit 1, and a microphone 5 is provided at a lower end of the first housing unit 1. An antenna for external radio communication 6 is attached to an upper end of the first housing unit 1. A display 8 is provided on a surface of a second housing unit 2, and a speaker 9 is provided at an upper end of the second housing unit 2. A display 11 and an imaging device 12 are provided on a rear surface of the second housing 2. Note that, it is possible to use, for example, a liquid crystal display panel, an organic EL panel, a plasma display panel, or the like as the displays 8 and 11. It is possible to use a CCD, a CMOS sensor, or the like as the imaging device 12. Antennas for internal radio communication 7 and 10, which perform internal radio communication between the first housing unit 1 and the second housing unit 2, are provided in the first housing unit 1 and the second housing unit 2, respectively.

The first housing unit 1 and the second housing unit 2 are coupled via a hinge 3. It is possible to fold the second housing unit 2 onto the first housing unit 1 by rotating the second housing unit 2 with the hinge 3 as a fulcrum. It is possible to protect the operation buttons 4 with the second housing unit 2 and prevent the operation buttons 4 from being operated by mistake when the cellular phone is carried by closing the second housing unit 2 onto the first housing unit 1. It is possible to operate the operation buttons 4 while looking at the display 8, make a call while using the speaker 9 and the microphone 5, and perform imaging while operating the operation buttons 4 by opening the second housing unit 2 from the first housing unit 1.

It is possible to arrange the display 8 over substantially the entire surface of the second housing unit 2 and increase a size of the display 8 without spoiling portability of the cellular phone by using a clam shell structure. This makes it possible to improve visibility.

It is possible to perform data transmission between the first housing unit 1 and the second housing unit 2 through internal radio communication using the antennas for internal radio communication 7 and 10 by providing the antennas for internal radio communication 7 and 10 in the first housing unit 1 and the second housing unit 2, respectively. For example, it is possible to send image data and sound data, which are captured into the first housing unit 1 via the antenna for external radio communication 6, to the second housing unit 2 through the internal radio communication using the antennas for internal radio communication 7 and 10 and cause the display 8 to display an image and cause the speaker 9 to output a sound. It is possible to send imaging data, which is imaged by the imaging device 12, from the second housing unit 2 to the first housing unit 1 through the internal radio communication using the antennas for internal radio communication 7 and 10 and send the imaging data to the outside via the antenna for external radio communication 6.

This makes it unnecessary to perform data transmission between the first housing unit 1 and the second housing unit 2 by wire, and insert a flexible wiring substrate provided with a large number of pins through the hinge 3. Therefore, it is possible to control complication of a structure of the hinge 3 and prevent complication of a packaging process. It is possible to realize a reduction in size and thickness and improvement of reliability of the cellular phone while controlling an increase in cost. Moreover, it is possible to realize an increase in display size and an increase in functions of the cellular phone without spoiling portability of the cellular phone.

Note that, although the antenna for external radio communication 6 is mounted on the first housing unit 1, the antenna for external radio communication 6 may be mounted on the second housing unit 2. In this case, since the antenna for external radio communication 6 is not blocked by the second housing unit 2 when the cellular phone is used, it is possible to expect communication with higher efficiency. In this case, it is possible to feed power from a communication control unit of the cellular phone incorporated in the first housing unit 1 to the antenna for external radio communication 6 through a coaxial cable or the like.

When internal radio communication is performed between the first housing unit 1 and the second housing unit 2, it is possible to use a frequency hopping system. Information for causing the radio communication terminal to perform frequency hopping may be sent to both the first housing unit 1 and the second housing unit 2 by wire. This makes it unnecessary to send the information for causing the radio communication terminal to perform frequency hopping by radio between the first housing unit 1 and the second housing unit 2 and makes it unnecessary to estimate a hopping pattern from a reception signal to perform initial acquisition. In addition, even in an inferior communication environment in which it is impossible to synchronize a frequency with a hopping pattern on a reception side correctly, it is possible to cause the radio communication terminal to perform frequency hopping stably. As a result, it is possible to simplify a circuit constitution of a radio reception unit and it is unnecessary to output a preamble signal that is required only for synchronizing frequencies. Thus, it is possible to improve communication throughput.

A local oscillation signal, a frequency of which changes according to hopping or chirping, may be sent to both the first housing unit 1 and the second housing unit 2 by wire. This makes it possible to avoid various problems involved in an increase in speed of transmission data by transmitting a group of signals, high-speed transmission of which is difficult, by radio, and avoid complication of a system involved in making transmission wireless by transmitting a local oscillation signal necessary for radio transmission by wire.

Figure 3:
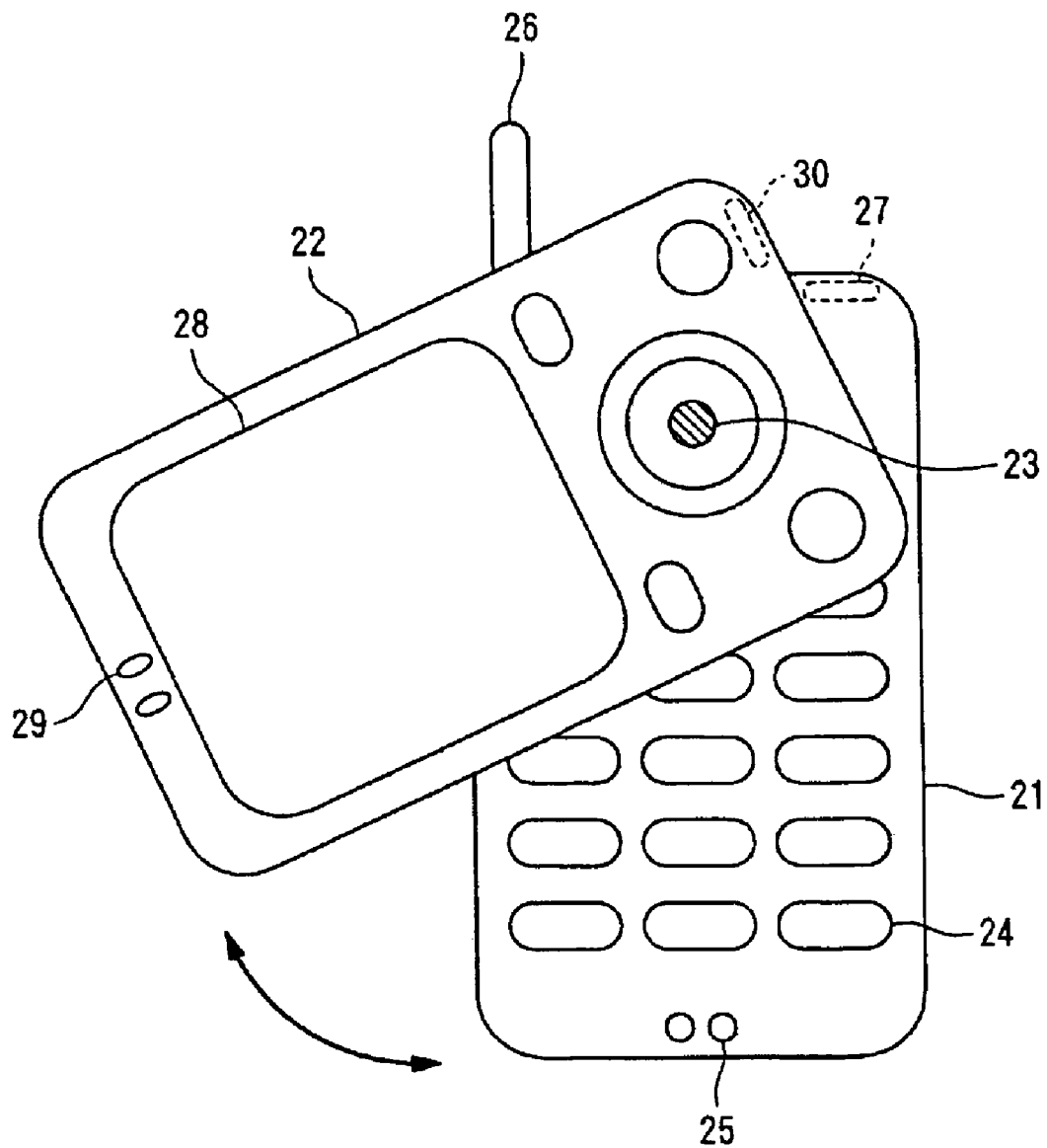
FIG. 3 is a perspective view showing an external appearance of a rotation type cellular phone to which the radio communication control method of the invention is applied.

FIG. 3 is a perspective view showing an external appearance of a rotation type cellular phone to which the radio communication control method of the invention is applied.

In FIG. 3, operation buttons 24 are arranged on a surface of a first housing unit 21 and a microphone 25 is provided at a lower end of the first housing unit 21. An antenna 26 for external radio communication is attached to an upper end of the first housing unit 21. A display 28 is provided on a surface of a second housing unit 22 and a speaker 29 is provided at an upper end of the second housing unit 22. Antennas for internal radio communication 27 and 30, which perform internal radio communication between the first housing unit 21 and the second housing unit 22, are provided in the first housing unit 21 and the second housing unit 22, respectively.

The first housing unit 21 and the second housing unit 22 are coupled via a hinge 23. It is possible to arrange the second housing unit 22 over the first housing unit 21 or shift the second housing unit 22 from the first housing unit 21 by rotating the second housing unit 22 horizontally using the hinge 23 as a fulcrum. By arranging the second housing unit 22 over the first housing unit 21, it is possible to protect the operation buttons 24 with the second housing unit 22, and prevent the operation buttons 24 from being operated by mistake while the cellular phone is carried. It is possible to operate the operation buttons 24 while looking at the display 28 and make a call while using the speaker 29 and the microphone 25 by shifting the second housing unit 22 from the first housing unit 21 by rotating the second housing unit 21 horizontally.

It is possible to perform data transmission between the first housing unit 21 and the second housing unit 22 through internal radio communication using the antennas for internal radio communication 27 and 30 by providing the antennas for internal radio communication 27 and 30 in the first housing unit 21 and the second housing unit 22, respectively. For example, it is possible to send image data and sound data, which are captured into the first housing unit 21 via the antenna for external radio communication 26, to the second housing unit 22 through the internal radio communication using the antennas for internal radio communication 27 and 30 and cause the display 28 to display an image and cause the speaker 29 to output a sound.

This makes it unnecessary to insert a flexible wiring substrate provided with a large number of pins through the hinge 23. Therefore, it is possible to control complication of a structure of the hinge 23 and prevent complication of a packaging process. This makes it possible to realize a reduction in size and thickness and improvement of reliability of the cellular phone, while controlling an increase in cost. Moreover, it is possible to realize an increase in display size and an increase in functions of the cellular phone without spoiling portability of the cellular phone.

Note that, when internal radio communication is performed between the first housing unit 21 and the second housing unit 22, it is possible to use the frequency hopping system. Information that causes the radio communication terminal to perform frequency hopping may be sent to both the first housing unit 21 and the second housing unit 22 by wire. A local oscillation signal, a frequency of which changes according to hopping or chirping, may be sent to both the first housing unit 21 and the second housing unit 22 by wire.

In the embodiments described above, cellular phones are explained as examples. However, it is also possible to apply the invention to a video camera, a PDA (Personal Digital Assistant), a notebook personal computer, and the like.

Figure 4:
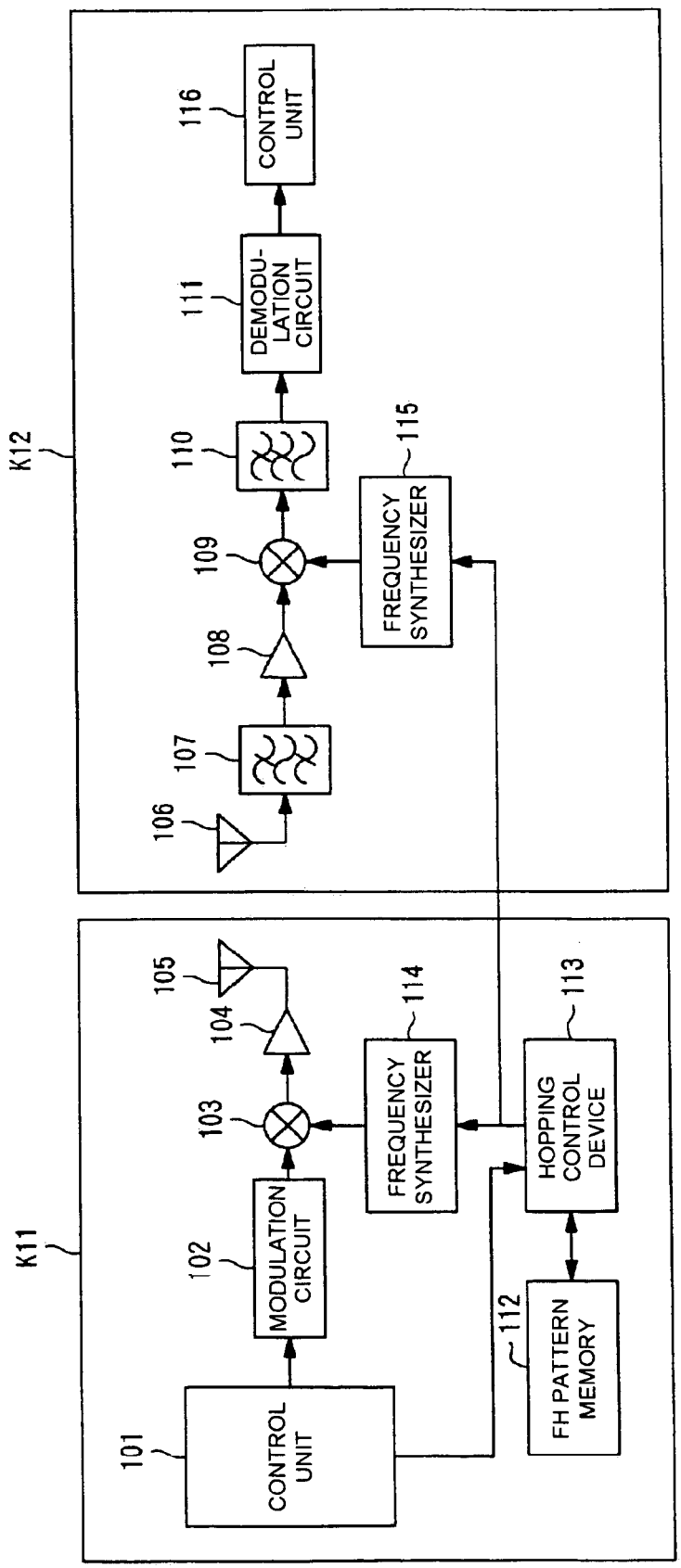
FIG. 4 is a block diagram showing a schematic structure of a radio communication terminal according to a first embodiment of the invention.

FIG. 4 is a block diagram showing a schematic structure of a radio communication terminal according to a first embodiment of the invention.

In FIG. 4, a first housing unit K11 includes a control unit 101 that controls the entire communication processing between the first housing unit K11 and a second housing unit K12, a frequency hopping pattern memory 112 that stores a frequency hopping pattern, a hopping control device 113 that sends a frequency designation signal to frequency synthesizers 114 and 115 by wire in accordance with control from the control unit 101, a modulation circuit 102 that converts transmission data to a base band signal, a frequency synthesizer 114 that generates a local oscillation signal on the basis of a frequency designation signal sent from the hopping control device 113, a mixer 103 that mixes a local oscillation signal outputted from the frequency synthesizer 114 in a base band signal outputted from the modulation circuit 102, an amplifier 104 that amplifies a signal outputted from the mixer 103, and an antenna for internal radio communication 105 that performs transmission of a radio wave for internal radio communication on the first housing unit K11 side.

The second housing unit K12 includes an antenna for internal radio communication 106 that receives a radio wave for internal radio communication on the second housing unit K12 side, a band-pass filter 107 that attenuates an unnecessary frequency component included in a reception signal received by the antenna for internal radio communication 106, a low-noise amplifier 108 that amplifies a reception signal outputted from the band-pass filter 107, a frequency synthesizer 115 that generates a local oscillation signal on the basis of a frequency designation signal sent from the hopping control device 113, a mixer 109 that mixes a local oscillation signal outputted from the frequency synthesizer 115 in a reception signal outputted from the low-noise amplifier 108, a low-pass filter 110 that attenuates an unnecessary high-frequency component included in an output signal from the mixer 109, a demodulation circuit 111 that performs demodulation processing for a reception signal outputted from the low-pass filter 110, and a control unit 116 that performs processing for a signal outputted from the demodulation circuit 111.

FIG. 5 is a table showing an example of a constitution of a frequency hopping pattern.

In FIG. 5, a plurality of hopping patterns P1 to PN are stored in the frequency hopping pattern memory 112. Hopping frequency sequences are set for the respective hopping patterns P1 to PN. For example, a hopping frequency sequence f1, f10, f27, f7, f9, f12, . . . , and f22 is set for the hopping pattern P1. A hopping frequency sequence f14; f22, f31, f5, f24, f7, . . . . , and f3 is set for the hopping pattern P2.

When the control unit 101 sends transmission data to the modulation circuit 102, the modulation circuit 102 converts the transmission data into a base band signal and outputs the base band signal to the mixer 103. The control unit 101 sends information specifying a predetermined frequency hopping sequence to the hopping control device 113. Note that, as the information specifying a predetermined frequency hopping sequence, information for selecting the hopping patterns P1 to PN in FIG. 5, information indicating hopping timing, and the like can be included. When the hopping control device 113 receives the information specifying a frequency hopping sequence, the hopping control device 113 selects one hopping pattern out of the hopping patterns P1 to PN in FIG. 5. Then, the hopping control device 113 reads out a hopping frequency sequence included in the selected hopping pattern and sends the hopping frequency sequence to the frequency synthesizers 114 and 115 as a frequency designation signal by wire at a predetermined period. The frequency synthesizers 114 and 115 generate local oscillation signals of a frequency specified by the frequency designation signal, respectively, and output the local oscillation signals to the mixers 103 and 109, respectively.

The mixer 103 mixes the base band signal outputted from the modulation circuit 102 and the local oscillation signal supplied from the frequency synthesizer 114 and superimposes the base band signal outputted from the modulation circuit 102 on a carrier wave to thereby perform up-convert for the transmission data. When the base band signal outputted from the modulation circuit 102 is superimposed on the carrier wave, the base band signal is amplified by the amplifier 104, and then sent via the antenna for internal radio communication 105. When transmission data is transmitted via the antenna for internal radio communication 105, the transmission data is received via the antenna for internal radio communication 106.

A reception signal received via the antenna for internal radio communication 106 is amplified by the low-noise amplifier 108 after an unnecessary frequency component of the reception signal is attenuated by the band-pass filter 107. The reception signal amplified by the low-noise amplifier 108 is sent to the mixer 109. The mixer 109 mixes the reception signal sent from the low-noise amplifier 108 and the local oscillation signal supplied from the frequency synthesizer 115 to perform down-convert for the reception signal.

A signal outputted from the mixer 109 is sent to the demodulation circuit 111 after an unnecessary high-frequency component of the signal is attenuated by the low-pass filter 110. After demodulation processing is applied to the signal by the demodulation circuit 111, it is possible to apply various kinds of processing such as display processing and storage processing to the signal via the control unit 116.

Since the hopping frequency sequence read out from the frequency hopping pattern memory 112 is sent to the frequency synthesizers 114 and 115 as the frequency designation signal by wire at the predetermined period, it is possible for both a transmission side and a reception side to share information for causing the radio communication terminal to perform frequency hopping. Therefore, it is unnecessary to send information for causing the radio communication terminal to perform frequency hopping by radio. Thus, even in an inferior communication environment in which it is impossible to synchronize a frequency with a hopping pattern on the reception side correctly, it is possible to cause the radio communication terminal to perform frequency hopping on both the transmission side and the reception side.

Since it is unnecessary to estimate a hopping pattern from a reception signal on the reception side, it is unnecessary to perform initial acquisition. Thus, it is possible to simplify a constitution of a reception circuit. Moreover, only centering time of the frequency synthesizers 114 and 115 is required as synchronization time. An output of a preamble signal required only for synchronizing frequencies is unnecessary. Thus, it is possible to improve communication throughput.

Note that, in the embodiment described above, the method of providing the frequency hopping pattern memory 112 and the hopping control device 113 in the first housing unit K11 is explained. However, the frequency hopping pattern memory 112 and the hopping control device 13 may be provided in the second housing unit K12. In addition, in the present embodiment, the method of providing the frequency hopping pattern memory 112 to allow the hopping control device 113 to acquire the hopping patterns P1 to PN is explained. However, a hopping pattern generating circuit for generating specific hopping patterns may be provided. Moreover, in the present embodiment, the method in which the hopping control device 113 causes the radio communication terminal to perform frequency hopping at a fixed period is explained. However, the hopping control device 113 may cause the radio communication terminal to perform frequency hopping at random.

Figure 6:
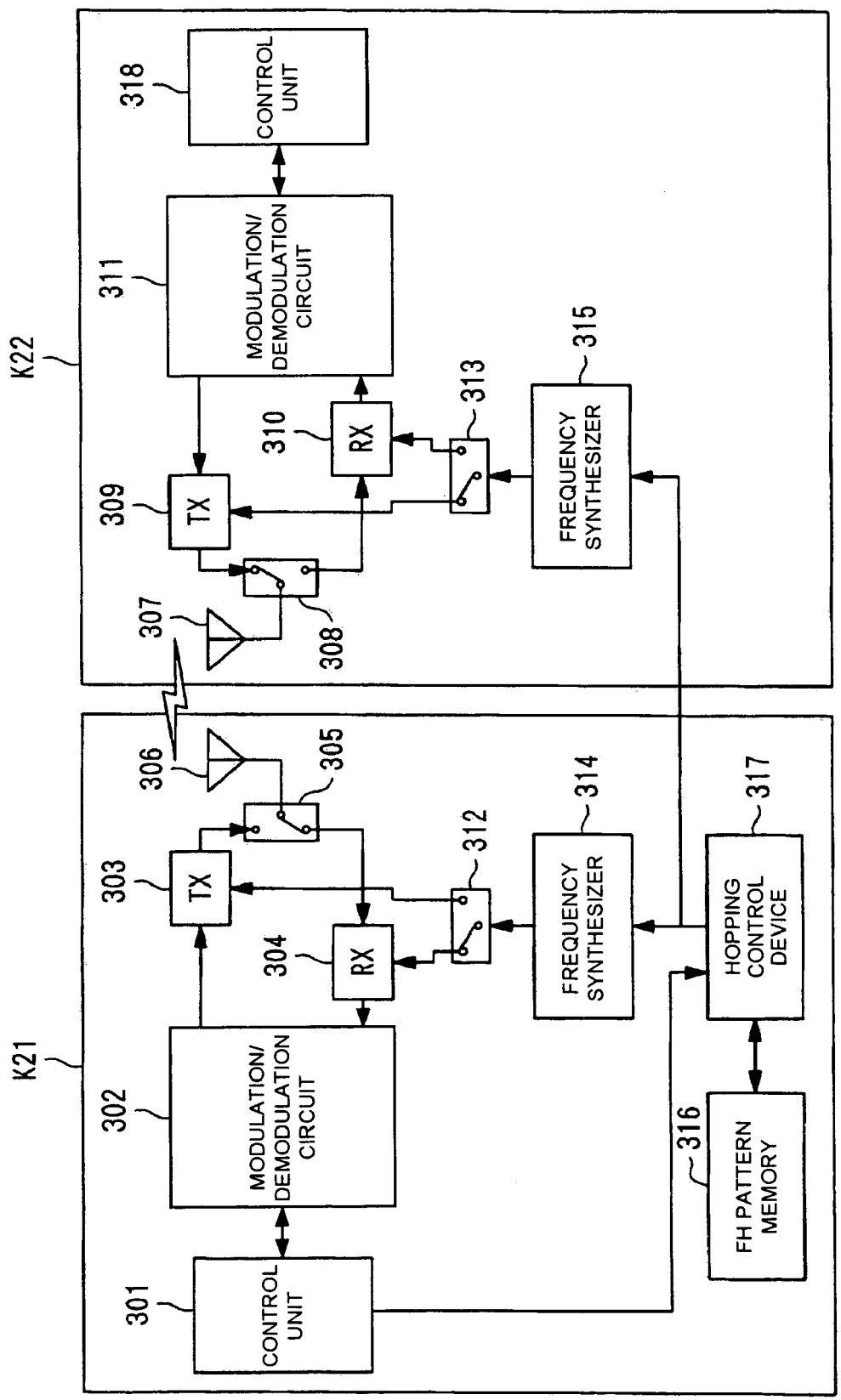
FIG. 6 is a block diagram showing a schematic structure of a radio communication terminal according to a second embodiment of the invention.

FIG. 6 is a block diagram showing a schematic structure of a radio communication terminal according to a second embodiment of the invention.

In FIG. 6, a first housing unit K21 includes a control unit 301 that controls the entire communication processing between the first housing unit K21 and a second housing unit K22, a frequency hopping pattern memory 316 that stores a frequency hopping pattern, a hopping control device 317 that sends a frequency designation signal to frequency synthesizers 314 and 315 by wire in accordance with control from the control unit 301, a modulation/demodulation circuit 302 that converts transmission data into a base band signal and performs demodulation processing for a reception signal, a frequency synthesizer 314 that generates a local oscillation signal on the basis of a frequency designation signal sent from the hopping control device 317, a transmission unit 303 that manages control for radio transmission performed via an antenna for internal radio communication 306, a reception unit 304 that manages control for radio reception performed via the antenna for internal radio communication 306, the antenna for internal radio communication 306 that transmits and receives a radio wave for internal radio communication on the first housing unit K21 side, a switch 305 that switches the antenna for internal radio communication 306 between the transmission unit 303 and the reception unit 304, and a switch 312 that switches the frequency synthesizer 314 between the transmission unit 303 and the reception unit 304.

The second housing unit K22 includes an antenna for internal radio communication 307 that transmits and receives a radio wave for internal radio communication on the second housing unit K22 side, a frequency synthesizer 315 that generates a local oscillation signal on the basis of a frequency designation signal sent from the hopping control device 317, a transmission unit 309 that manages control for radio transmission performed via the antenna for internal radio communication 307, a reception unit 310 that manages control for radio reception performed via the antenna for internal radio communication 307, a switch 308 that switches the antenna for internal radio communication 307 between the transmission unit 309 and the reception unit 310, a switch 313 that switches the frequency synthesizer 315 between the transmission unit 309 and the reception unit 310, a modulation/demodulation circuit 311 that converts transmission data into a base band signal and performs demodulation processing for a reception signal, and a control unit 318 that performs processing for a signal outputted from the modulation/demodulation circuit 311.

When the radio communication terminal performs data transmission from the first housing unit K21 to the second housing unit K22, the radio communication terminal changes over the switches 305 and 312 to the transmission unit 303 side and changes over the switches 308 and 313 to the reception unit 310 side. Transmission data outputted from the control unit 301 is converted into a base band signal by the modulation/demodulation circuit 302 and sent to the transmission unit 303.

The control unit 301 sends information specifying a predetermined frequency hopping sequence to the hopping control device 317. When the hopping control device 317 receives the information specifying a frequency hopping sequence, the hopping control device 317 selects a specific hopping pattern. Then, the hopping control device 317 reads out a hopping frequency sequence arranged in the selected hopping pattern from the frequency hopping pattern memory 316 and sends the hopping frequency sequence to the frequency synthesizers 314 and 315 as a frequency designation signal by wire. The frequency synthesizers 314 and 315 generate local oscillation signals of a frequency specified by the frequency designation signal, respectively, and output the local oscillation signals to the transmission unit 303 and the reception unit 310 via the switches 312 and 313, respectively.

The transmission unit 303 mixes the base band signal outputted from the modulation/demodulation circuit 302 and the local oscillation signal supplied from the frequency synthesizer 314 and superimposes the base band signal outputted from the modulation/demodulation circuit 302 on a carrier wave to thereby perform up-convert for the transmission data. When the base band signal outputted from the modulation/demodulation circuit 302 is superimposed on the carrier wave, the transmission unit 303 sends the base band signal to the antenna for internal radio communication 306 via the switch 305 and sends the base band signal via the antenna for internal radio communication 306. When transmission data is transmitted via the antenna for internal radio communication 306, the transmission data is received via the antenna for internal radio communication 307.

A reception signal received by the antenna for internal radio communication 307 is sent to the reception unit 310 via the switch 308. The reception unit 310 mixes the reception signal received by the antenna for internal radio communication 307 and the local oscillation signal supplied from the frequency synthesizer 315 to perform down-convert for the reception signal. A signal outputted from the reception unit 310 is sent to the modulation/demodulation circuit 311. After demodulation processing is applied to the signal by the modulation/demodulation circuit 311, it is possible to apply various kinds of processing such as display processing and storage processing to the signal via the control unit 318.

On the other hand, when radio communication terminal performs data transmission from the second housing unit K22 to the first housing unit K21, the radio communication terminal changes over the switches 305 and 312 to the reception unit 304 side and changes over the switches 308 and 313 to the transmission unit 309 side. The transmission data outputted from the control unit 318 is converted into a base band signal by the modulation/demodulation circuit 311 and sent to the transmission unit 309.

The control unit 301 sends the information specifying a predetermined frequency hopping sequence to the hopping control device 317. When the hopping control device 317 receives the information specifying a predetermined frequency hopping sequence, the hopping control device 317 selects a specific hopping pattern. Then, the control unit 301 reads out a hopping frequency sequence arranged in the selected hopping pattern from the frequency hopping pattern memory 316 and sends the hopping frequency sequence to the frequency synthesizers 314 and 315 as a frequency designation signal by wire. The frequency synthesizers 314 and 315 generate local oscillation signals of a frequency specified by the frequency designation signal, respectively, and output the local oscillation signals to the transmission unit 309 and the reception unit 304 via the switches 312 and 313, respectively.

The transmission unit 309 mixes the base band signal outputted from the modulation/demodulation circuit 311 and the local oscillation signal supplied from the frequency synthesizer 315 and superimposes the base band signal outputted from the modulation/demodulation circuit 311 on a carrier wave to thereby perform up-convert for the transmission data. When the base band signal outputted from the modulation/demodulation circuit 311 is superimposed on the carrier wave, the transmission unit 309 sends the base band signal to the antenna for internal radio communication 307 via the switch 308 and sends the base band signal via the antenna for internal radio communication 307. When transmission data is transmitted via the antenna for internal radio communication 307, the transmission data is received via the antenna for internal radio communication 306.

A reception signal received by the antenna for internal radio communication 306 is sent to the reception unit 304 via the switch 305. The reception unit 304 mixes the reception signal received by the antenna for internal radio communication 306 and the local oscillation signal supplied from the frequency synthesizer 314 to perform down-convert for the reception signal. A signal outputted from the reception unit 304 is sent to the modulation/demodulation circuit 302. After demodulation processing is applied to the signal by the modulation/demodulation circuit 302, it is possible to apply various kinds of processing such as display processing and storage processing to the signal via the control unit 301.

This makes it possible for the frequency synthesizers 314 and 315 to share the hopping control device 317 even when the transmission units 303 and 309 are provided in the first housing unit K21 and the second housing unit K22, respectively, and the reception units 304 and 310 are provided in the first housing unit K21 and the second housing unit K22, respectively. Therefore, even in an inferior communication environment in which it is impossible to synchronize a frequency with a hopping pattern on the reception side correctly, it is possible to cause the radio communication terminal to perform frequency hopping stably on both the transmission side and the reception side while making it possible to perform two-way communication between the first housing unit K21 and the second housing unit K22.

Figure 7:
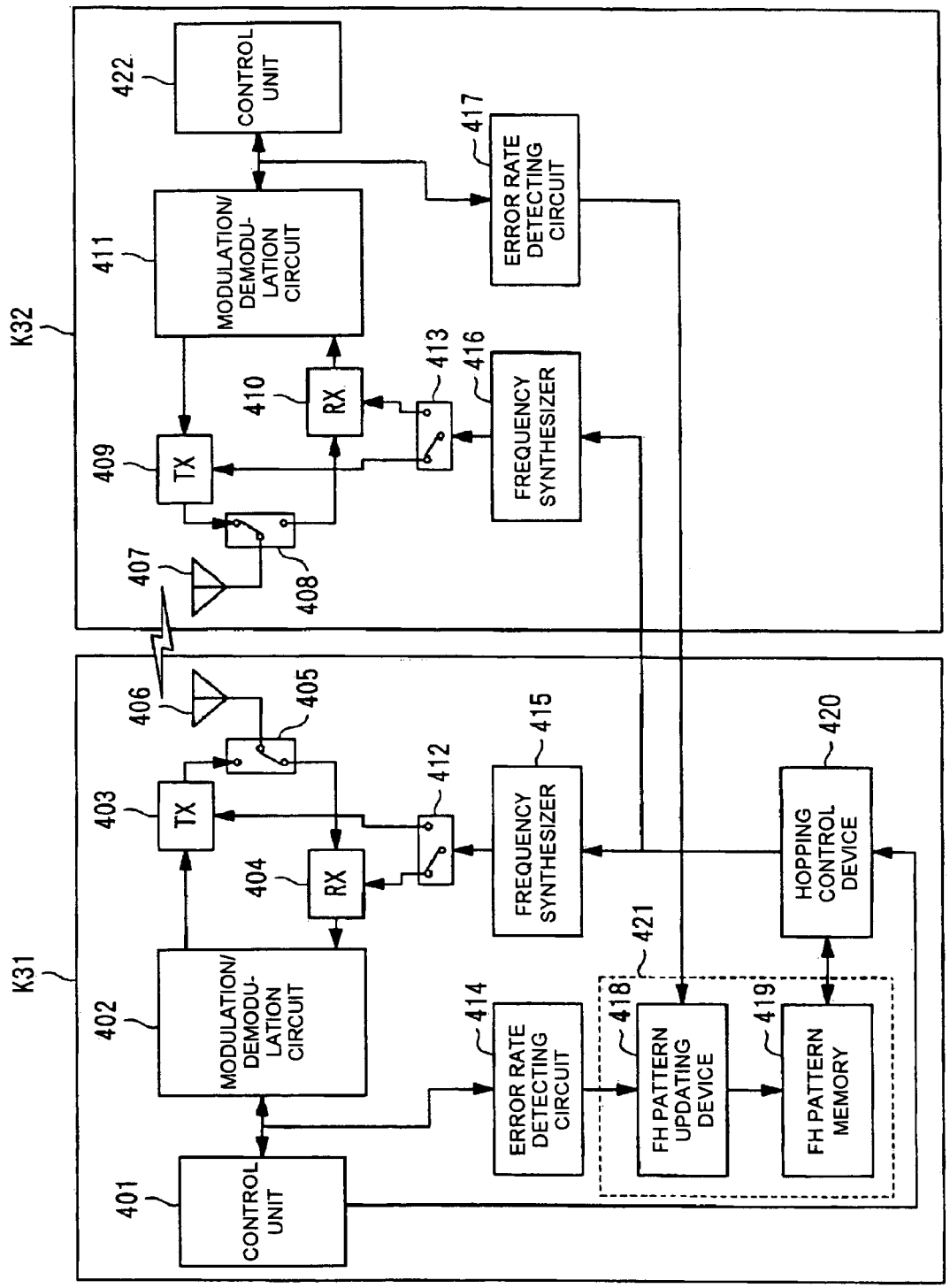
FIG. 7 is a block diagram showing a schematic structure of a radio communication terminal according to a third embodiment of the invention.

FIG. 7 is a block diagram showing a schematic structure of a radio communication terminal according to a third embodiment of the invention.

In FIG. 7, a first housing unit K31 includes a control unit 401, a modulation/demodulation circuit 402, a hopping control device 420, a frequency synthesizer 415, a transmission unit 403, a reception unit 404, an antenna for internal radio communication 406, switches 405 and 412, an error rate detecting circuit 414 that detects an error rate of a reception signal received by the reception unit 404, and a hopping pattern control unit 421. The hopping pattern control unit 421 includes a frequency hopping pattern updating device 418 that updates a hopping pattern on the basis of an error rate detected by the error rate detecting circuit 414, and a frequency hopping pattern memory 419.

A second housing unit K32 includes an antenna for internal radio communication 407, a frequency synthesizer 416, a transmission unit 409, a reception unit 410, switches 408 and 413, an error rate detecting circuit 417 that detects an error rate of a reception signal received by the reception unit 410, a modulation/demodulation circuit 411, and a control unit 422.

When the radio communication terminal performs data transmission from the first housing unit K31 to the second housing unit K32, the radio communication terminal changes over the switches 405 and 412 to the transmission unit 403 side and changes over the switches 408 and 413 to the reception unit 410. Transmission data outputted from the control unit 401 is converted into a base band signal by the modulation/demodulation circuit 402 and sent to the transmission unit 403.

The control unit 401 sends information specifying a predetermined frequency hopping sequence to the hopping control device 420. When the hopping control device 420 receives the information specifying a frequency hopping sequence, the hopping control device 420 selects a specific hopping pattern. Then, the hopping control device 420 reads out a hopping frequency sequence included in the selected hopping pattern from the frequency hopping pattern memory 419 and sends the hopping frequency sequence to the frequency synthesizers 415 and 416 as a frequency designation signal by wire. The frequency synthesizers 415 and 416 generate local oscillation signals of a frequency specified by the frequency designation signal, respectively, and outputs the local oscillation signals to the transmission unit 403 and the reception unit 410 via the switches 412 and 413, respectively.

The transmission unit 403 mixes the base band signal outputted from the modulation/demodulation circuit 402 and the local oscillation signal supplied from the frequency synthesizer 414 and superimposes the base band signal outputted from the modulation/demodulation circuit 402 on a carrier wave to thereby perform up-convert for the transmission data. When the base band signal outputted from the modulation/demodulation circuit 402 is superimposed on the carrier wave, the transmission unit 403 sends the base band signal to the antenna for internal radio communication 406 via the switch 405 and sends the base band signal via the antenna for internal radio communication 406. When transmission data is transmitted via the antenna for internal radio communication 406, the transmission data is received via the antenna for internal radio communication 407.

A reception signal received by the antenna for internal radio communication 407 is sent to the reception unit 410 via the switch 408. The reception unit 410 mixes the reception signal received from the antenna for internal radio communication 407 and the local oscillation signal supplied from the frequency synthesizer 416 to perform down-convert for the reception signal. A signal outputted from the reception unit 410 is sent to the modulation/demodulation circuit 411. After demodulation processing is applied to the signal by the modulation/demodulation circuit 411, it is possible to apply various kinds of processing such as display processing and storage processing to the signal via the control unit 422.

The error rate detecting circuit 417 detects an error rate of the reception signal on the basis of the signal subjected to the demodulation processing by the modulation/demodulation circuit 411 and outputs the detected error rate to the hopping pattern updating device 418. Note that, it is possible to use, for example, a BER or a PER as an error rate. A reception quality of a radio wave such as RSSI may be used instead of the error rate.

When the frequency hopping pattern updating device 418 receives the error rate from the error rate detecting circuit 417, the frequency hopping pattern updating device 418 updates a hopping pattern stored in the frequency hopping pattern memory 419 on the basis of the error rate. For example, when the error rate of the reception signal is equal to or higher than a predetermined value, the frequency hopping pattern updating device 418 can set a flag on a hopping frequency used for the current communication and store the flag in the frequency hopping pattern memory 419. When the hopping control device 420 reads out a hopping frequency from the hopping pattern stored in the frequency hopping pattern memory 419, the hopping control device 420 judges whether a flag is set on the hopping frequency. It is possible to send a hopping frequency sequence of the hopping pattern to the frequency synthesizers 415 and 416 as a frequency designation signal by wire while skipping hopping frequencies on which flags are set.

On the other hand, when the radio communication terminal performs data transmission from the second housing unit K32 to the first housing unit K31, the radio communication terminal changes over the switches 405 and 412 to the reception unit 404 side and changes over the switches 408 and 413 to the transmission unit 409 side. Transmission data outputted from the control unit 422 is converted into a base band signal by the modulation/demodulation circuit 411 and is sent to the transmission unit 409.

The control unit 401 sends information specifying a predetermined frequency hopping sequence to the hopping control device 420. When the hopping control device 420 receives the information specifying a frequency hopping sequence, the hopping control device 420 selects a specific hopping pattern. Then, the hopping control device 420 reads out a hopping frequency sequence arranged in the selected hopping pattern from the frequency hopping pattern memory 419 and sends the hopping frequency sequence to the frequency synthesizers 415 and 416 as a frequency designation signal by wire. The frequency synthesizers 415 and 416 generate local oscillation signals of a frequency specified by the frequency designation signal, respectively, and output the local oscillation signals to the transmission unit 409 and the reception unit 404 via the switches 412 and 413, respectively.

The transmission unit 409 mixes the base band signal outputted from the modulation/demodulation circuit 411 and the local oscillation signal supplied from the frequency synthesizer 416 and superimposes the base band signal outputted from the modulation/demodulation circuit 411 on a carrier wave to thereby perform up-convert for the transmission data. When the base band signal outputted from the modulation/demodulation circuit 411 is superimposed on the carrier wave, the transmission unit 409 sends the base band signal to the antenna for internal radio communication 407 via the switch 408 and sends the base band signal via the antenna for internal radio communication 407. When transmission data is transmitted via the antenna for internal radio communication 407, the transmission data is received via the antenna for internal radio communication 406.

A reception signal received by the antenna for internal radio communication 406 is sent to the reception unit 404 via the switch 405. The reception unit 404 mixes the reception signal received by the antenna for internal radio communication 406 and the local oscillation signal supplied from the frequency synthesizer 415 to perform down-convert for the reception signal. A signal outputted from the reception unit 404 is sent to the modulation/demodulation circuit 402. After demodulation processing is applied to the signal by the modulation/demodulation circuit 402, it is possible to apply various kinds of processing such as display processing and storage processing to the signal via the control unit 401.

The error rate detecting circuit 414 detects an error rate of the reception signal on the basis of the signal subjected to the demodulation processing by the modulation/demodulation circuit 402 and outputs the detected error rate to the frequency hopping pattern updating device 418. When the frequency hopping pattern updating device 418 receives an error rate from the error rate detecting circuit 414, the frequency hopping pattern updating device 418 updates the hopping pattern stored in the frequency hopping pattern memory 419 on the basis of the error rate. The hopping control device 420 reads out the updated hopping pattern from the hopping pattern memory 419 and sends a hopping frequency sequence of the hopping pattern to the frequency synthesizers 415 and 416 as a frequency designation signal by wire.

This makes it possible to adaptively change a hopping frequency according to a present communication environment while both the transmission side and the reception side share information for causing the radio communication terminal to perform frequency hopping. Therefore, it is possible to cause the radio communication terminal to perform frequency hopping stably on both the transmission side and the reception side, while avoiding a frequency with a poor communication state. Thus, even in an inferior communication environment in which it is impossible to synchronize a frequency with a hopping pattern on the reception side correctly, it is possible to control the deterioration in quality of a radio communication by the frequency hopping system. In addition, it is possible to improve communication throughput.

Note that, in the present embodiment described above, the method of providing the error rate detecting circuits 414 and 417 in the first housing unit K31 and the second housing unit K32, respectively, is explained. However, the error rate detecting circuit 414 may be provided only on the first housing unit K31 side. The embodiment in FIG. 7 is explained with the two-way communication as an example. However, the invention may be applied to single-way communication. It is also possible that logs of information such as hopping frequencies and BERs used in communication in the past are stored. A hopping frequency with a low BER is preferably used. A fixed number of usable hopping frequencies may be secured in order from a hopping frequency with a lower BER.

Figure 8:
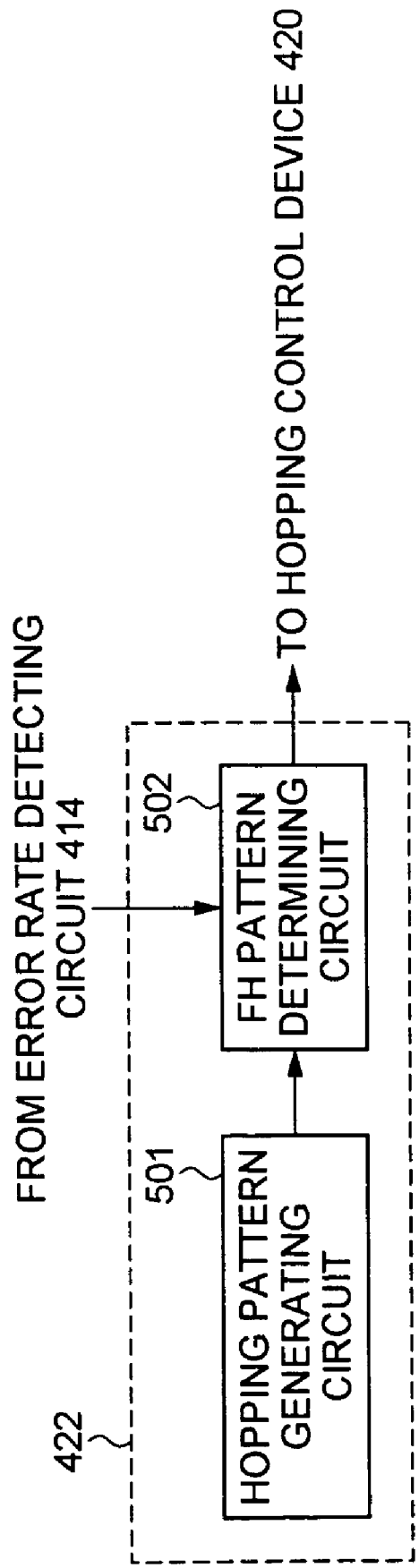
FIG. 8 is a block diagram showing another example of a structure of a hopping pattern control unit in FIG. 7.

FIG. 8 is a block diagram showing another example of a structure of the hopping pattern control unit 421 in FIG. 7.

In FIG. 8, a hopping pattern generating circuit 501 and a hopping pattern determining circuit 502 are provided in the frequency hopping pattern control unit 422. The hopping pattern control unit 421 in FIG. 7 may be replaced with the hopping pattern control unit 422 in FIG. 8.

The hopping pattern generating circuit 501 generates a specific hopping pattern and outputs the generated hopping pattern to the frequency hopping pattern determining circuit 502. The frequency hopping pattern determining circuit 502 can determine whether a hopping frequency of the hopping pattern generated by the hopping pattern generating circuit 501 is used on the basis of error rates detected by the error rate detecting circuits 414 and 417.

Note that, in the present embodiment described above, it is possible to determine time (a slot length) in advance during which communication continues at one frequency. It is possible to perform communication at the same frequency in this section. For example, in Bluetooth, one slot is set as 625 us. Communication is performed in a slot in which a master and a slave are set according to TDD.

Figure 9:
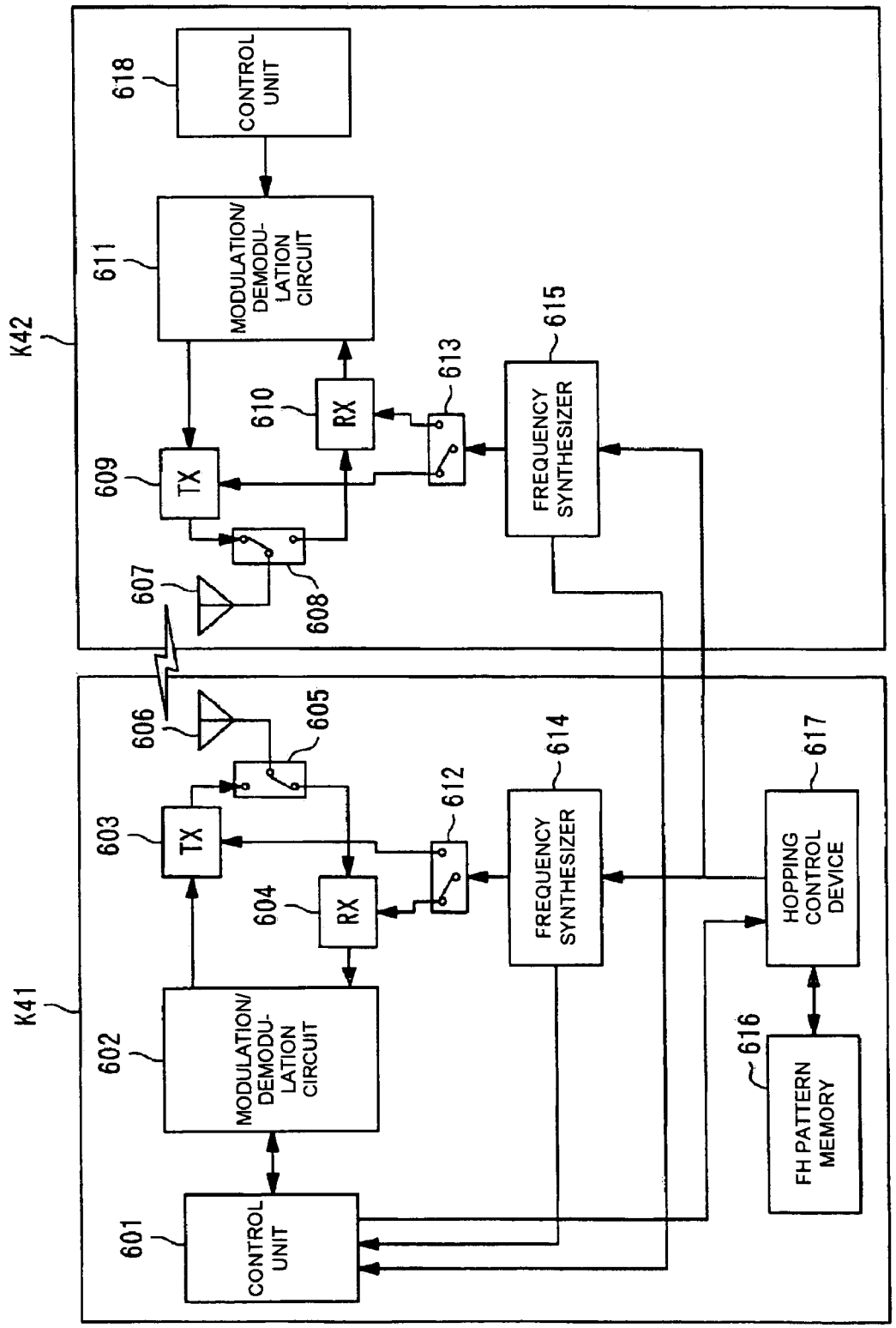
FIG. 9 is a block diagram showing a schematic structure of a radio communication terminal according to a fourth embodiment of the invention.

FIG. 9 is a block diagram showing a schematic structure of a radio communication terminal according to a fourth embodiment of the invention.

In FIG. 9, a first housing unit K41 includes a control unit 601, a frequency hopping pattern memory 616, a modulation/demodulation circuit 602, a hopping control device 617, a frequency synthesizer 614, a transmission unit 603, a reception unit 604, an antenna for internal radio communication 606, and switches 605 and 612.

A second housing unit K42 includes an antenna for internal radio communication 607, a frequency synthesizer 615, a transmission unit 609, a reception unit 610, switches 608 and 613, a modulation/demodulation circuit 611, and a control unit 618.

When the radio communication terminal performs data transmission from the first housing unit K41 to the second housing unit K42, the radio communication terminal changes the switches 605 and 612 over to the transmission unit 603 side, and changes the switches 608 and 613 over to the reception unit 610 side.

The control unit 601 sets a slot length on the basis of an amount of data of transmission data to be transmitted, and sends a hopping timing corresponding to the slot length to the hopping control device 617. The hopping control device 617 selects a specific hopping pattern from the frequency hopping pattern memory 616 and sends a hopping frequency sequence included in the selected hopping pattern to the frequency synthesizers 614 and 615 as a frequency designation signal by wire, in accordance with the hopping timing designated by the control unit 601. The frequency synthesizers 614 and 615 generate local oscillation signals of a frequency specified by the frequency designation signal, respectively, and output the local oscillation signals to the transmission unit 603 and the reception unit 610 via the switches 612 and 613, respectively.

The frequency synthesizers 614 and 615 detect whether the frequency of the local oscillation signals is locked to a specific frequency. When the frequency of the local oscillation signals is locked, the frequency synthesizers 614 and 615 send lock detection signals to the control unit 601, respectively. When the control unit 601 receives the lock detection signals from the frequency synthesizers 614 and 615, the control unit 601 sends transmission data to the modulation/demodulation circuit 602. The modulation/demodulation circuit 60 converts the transmission data into a base band signal and sends the base band signal to the transmission unit 603.

The transmission unit 603 mixes a base band signal outputted from the modulation/demodulation circuit 602 and the local oscillation signal supplied from the frequency synthesizer 614 and superimposes the base band signal outputted from the modulation/demodulation circuit 602 on a carrier wave to thereby perform up-convert for the transmission data. When the base band signal outputted from the modulation/demodulation circuit 602 is superimposed on the carrier wave, the transmission unit 603 sends the base band signal to the antenna for internal radio communication 606 via the switch 605 and sends the base band signal via the antenna for internal radio communication 606. When transmission data is transmitted via the antenna for internal radio communication 606, the transmission data is received via the antenna for internal radio communication 607.

A reception signal received by the antenna for internal radio communication 607 is sent to the reception unit 610 via the switch 608. The reception unit 610 mixes the reception signal received by the antenna for internal radio communication 607 and the local oscillation signal supplied from the frequency synthesizer 615 to perform down-convert for the reception signal. A signal outputted from the reception unit 610 is sent to the modulation/demodulation circuit 611. After demodulation processing is applied to the signal by the modulation/demodulation circuit 611, it is possible to apply various kinds of processing such as display processing and storage processing to the signal via the control unit 618.

This makes it possible to change a slot length while both the transmission side and the reception side share information for causing the radio communication terminal to perform frequency hopping. Therefore, it is possible to cause the radio communication terminal to perform data communication efficiently while making it possible to cause the radio communication terminal to perform frequency hopping stably on both the transmission side and the reception side. Thus, even in an inferior communication environment in which it is impossible to synchronize a frequency with a hopping pattern on the reception side correctly, it is possible to control deterioration in a quality of radio communication by the frequency hopping system. In addition, it is possible to improve communication throughput.

Since it is possible to change a slot length according to a load state of data communication, it is possible to set a long slot length when the amount of data is large and a short slot length when the amount of data is small. Therefore, it is unnecessary to add dummy data in the data and send the data when the amount of data is small. Thus, it is possible to prevent the waste of power consumption.

On the other hand, when the radio communication terminal performs data transmission from the second housing unit K42 to the first housing unit K41, the radio communication terminal changes over the switches 605 and 612 to the reception unit 604 side and changes over the switches 608 and 613 to the transmission unit 609 side. The transmission data outputted from the control unit 618 is converted into a base band signal by the modulation/demodulation circuit 611 and sent to the transmission unit 609.

The control unit 601 sends information specifying a predetermined frequency hopping sequence to the hopping control device 617. When the hopping control device 617 receives the information specifying a frequency hopping sequence, the hopping control device 617 selects a specific hopping pattern. Then, the hopping control device 617 reads out a hopping frequency sequence arranged in the selected hopping pattern from the frequency hopping pattern memory 616 and sends the hopping frequency sequence to the frequency synthesizers 614 and 615 as a frequency designation signal by wire. The frequency synthesizers 614 and 615 generate local oscillation signals of a frequency specified by the frequency designation signal, respectively, and output the local oscillation signals to the transmission unit 609 and the reception unit 604 via the switches 612 and 613, respectively.

The transmission unit 609 mixes the base band signal outputted from the modulation/demodulation circuit 611 and the local oscillation signal supplied from the frequency synthesizer 615 and superimposes the base band signal outputted from the modulation/demodulation circuit 611 on a carrier wave to thereby perform up-convert for the transmission data. When the base band signal outputted from the modulation/demodulation circuit 611 is superimposed on the carrier wave, the transmission unit 609 sends the base band signal to the antenna for internal radio communication 607 via the switch 608 and sends the base band signal via the antenna for internal radio communication 607. When transmission data is transmitted via the antenna for internal radio communication 607, the transmission data is received via the antenna for internal radio communication 606.

A reception signal received by the antenna for internal radio communication 606 is sent to the reception unit 604 via the switch 605. The reception unit 604 mixes the reception signal received by the antenna for internal radio communication 606 and the local oscillation signal supplied from the frequency synthesizer 614 to perform down-convert for the reception signal. A signal outputted from the reception unit 604 is sent to the modulation/demodulation circuit 602. After demodulation processing is applied to the signal by the modulation/demodulation circuit 602, it is possible to apply various kinds of processing such as display processing and storage processing to the signal via the control unit 601.

Note that, in the embodiment described above, the method of sending lock detection signals outputted from the frequency synthesizers 614 and 615 only to the control unit 601 side is explained. However, lock detection signals outputted from the frequency synthesizers 614 and 615 may also be sent to the control unit 618 such that a slot length can also be changed when the radio communication terminal performs data transmission from the second housing unit K42 to the first housing unit K41.

In the above embodiment, the method described in which the control unit 601 starts data transmission after receiving lock detection signals outputted from the frequency synthesizers 614 and 615 is explained. However, the control unit 601 may start data transmission after waiting for time set in advance.

Figure 10:
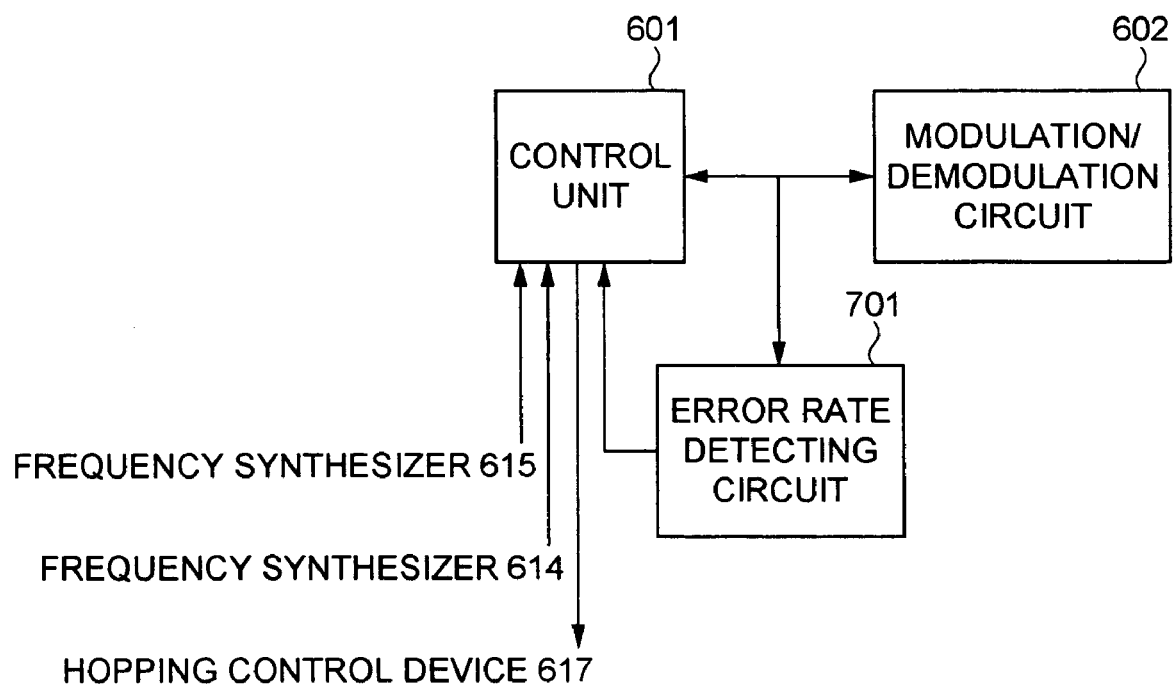
FIG. 10 is a block diagram showing a modification of the radio communication terminal in FIG. 9.

FIG. 10 is a block diagram showing a modification of the radio communication terminal in FIG. 9.

In FIG. 10, an error rate detecting circuit 701 for detecting an error rate of a reception signal received by the reception unit 604 is provided. The control unit 601 can set a slot length on the basis of an error rate detected by the error rate detecting circuit 701. For example, the error rate detecting circuit 701 can monitor an error rate of a specific frequency and the control unit 601 instructs the hopping control device 617 to hop to the next frequency immediately when an error rate is high. This makes it possible to reduce time during which communication continues at frequency with a high error rate and improve communication quality. In that case, the error rate detecting circuit 701 may judge the hopping to the next frequency according to only an error rate in one direction or may feed back an error rate in the other direction to the control unit 601. The error rate detecting circuit 701 may judge the hopping to the next frequency not only from an error rate but also from a reception quality of a radio wave such as RSSI.

Figure 11:
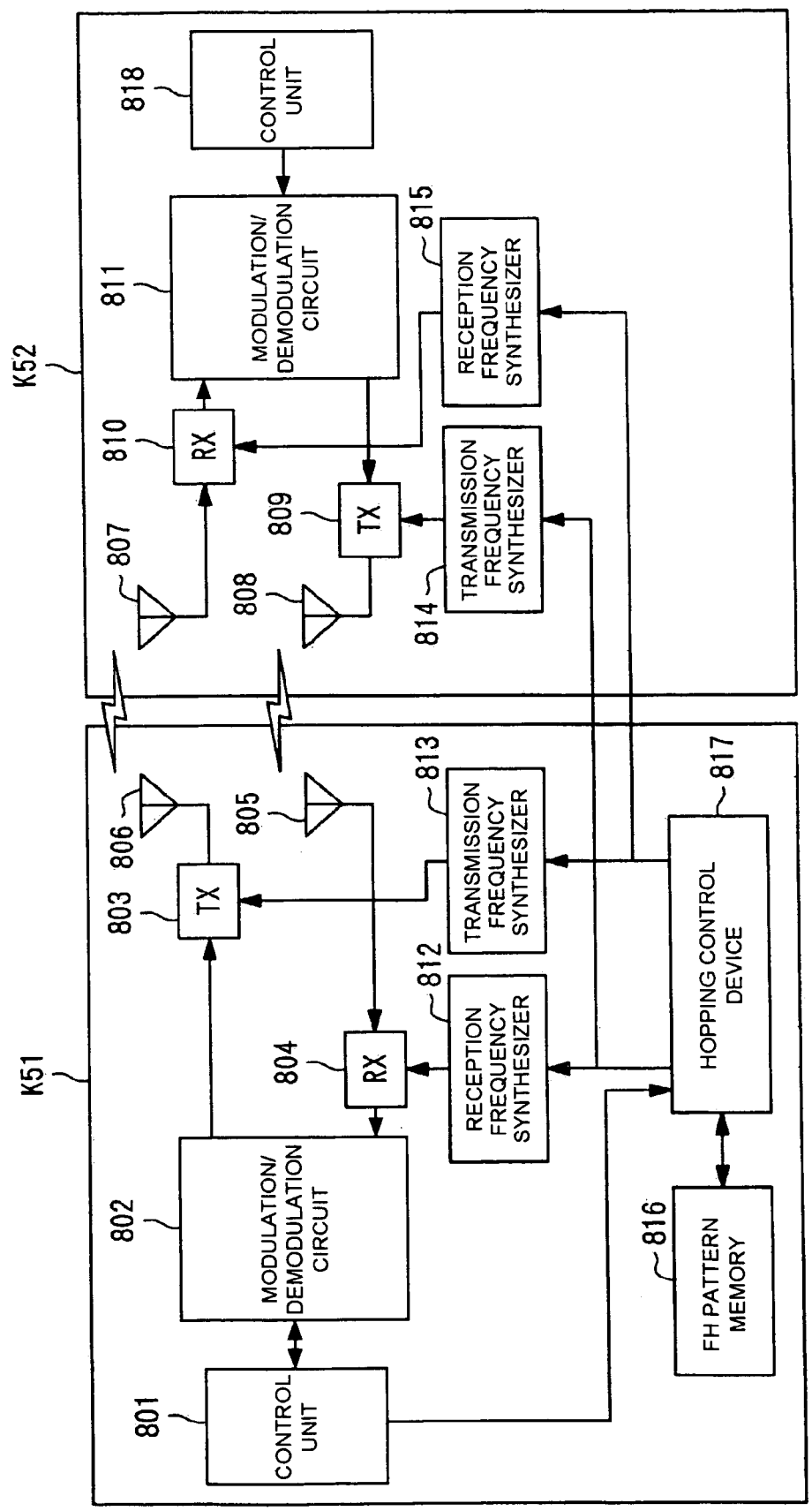
FIG. 11 is a block diagram showing a schematic structure of a radio communication terminal according to a fifth embodiment of the invention.

FIG. 11 is a block diagram showing a schematic structure of a radio communication terminal according to a fifth embodiment of the invention.

In FIG. 11, a first housing unit K51 includes a control unit 801, a frequency hopping pattern memory 816, a modulation/demodulation circuit 802, a hopping control device 817, a reception frequency synthesizer 812, a transmission frequency synthesizer 813, a transmission unit 803, a reception unit 804, and antennas for internal radio communication 805 and 806.

A second housing unit K52 includes antennas for internal radio communication 807 and 808, a transmission unit 809, a reception unit 810, a transmission frequency synthesizer 814, a reception frequency synthesizer 815, a modulation/demodulation circuit 811, and a control unit 818.

When the control units 801 and 818 perform two-way communication between the first housing unit K51 and the second housing unit K52, the control units 801 and 818 output transmission data to the modulation/demodulation circuits 802 and 810, respectively. The transmission data outputted from the control units 801 and 818 are converted into base band signals by the modulation/demodulation circuits 802 and 810, respectively, and sent to the transmission units 803 and 809, respectively.

The control unit 801 sends information specifying a predetermined frequency hopping sequence to the hopping control device 817. When the hopping control device 817 receives the information specifying a frequency hopping sequence, the hopping control device 817 selects a specific hopping pattern. Then, the hopping control device 817 reads out a hopping frequency sequence included in the selected hopping pattern from the frequency hopping pattern memory 816 and sends the hopping frequency sequence to the transmission frequency synthesizers 813 and 814 and the reception frequency synthesizers 812 and 815 as a frequency designation signal by wire. The transmission frequency synthesizers 813 and 814 and the reception frequency synthesizers 812 and 815 generate local oscillation signals of a frequency specified by the frequency designation signal, respectively, and output the local oscillation signals to the transmission units 803 and 809 and the reception units 804 and 810, respectively.

The transmission units 803 and 809 mix the base band signals outputted from the modulation/demodulation circuits 802 and 811, respectively, and the local oscillation signals supplied from the transmission frequency synthesizers 813 and 814, respectively, and superimpose the base band signals outputted from the modulation/demodulation circuits 802 and 811, respectively, on carrier waves to thereby perform up-convert for the transmission data. When the base band signals outputted from the modulation/demodulation circuits 802 and 811, respectively, are superimposed on the carrier waves, the base band signals are sent via the antennas for internal radio communication 806 and 808, respectively. When transmission data is transmitted via the antennas for internal radio communication 806 and 808, respectively, the transmission data is received via the antennas for internal radio communication 807 and 805, respectively.

Reception signals received by the antennas for internal radio communication 807 and 805 are sent to the reception units 810 and 804, respectively. The reception units 810 and 804 mix the reception signals received by the antennas for internal radio communication 807 and 805, respectively, and the local oscillation signals supplied from the reception frequency synthesizers 815 and 812, respectively, to perform down-convert for the respective reception signals. Signals outputted from the reception units 810 and 804 are sent to the modulation/demodulation circuits 811 and 802, respectively. After demodulation processing is applied to the signals by the modulation/demodulation circuits 811 and 802, it is possible to apply various kinds of processing such as display processing and storage processing to the signals via the control units 818 and 801.

It is possible to store a hopping pattern, which is set such that hopping frequencies in a hopping frequency sequence do not overlap one another, in the frequency hopping pattern memory 816. The hopping control device 817 can output a specific hopping pattern read out from the frequency hopping pattern memory 816 to the transmission frequency synthesizer 813 and the reception frequency synthesizer 815. In addition, the hopping control device 817 can output a hopping pattern, which is different from a hopping pattern outputted to the transmission frequency synthesizer 813 and the reception frequency synthesizer 815, to the transmission frequency synthesizer 814 and the reception frequency synthesizer 812.

This makes it possible for both the transmission units 803 and 809 and the reception units 804 and 810 to share information for causing the radio communication terminal to perform frequency hopping while making it possible to prevent transmission data transmitted from the transmission unit 803 and transmission data transmitted from the transmission unit 809 from colliding with each other in an identical band. Therefore, even in an inferior communication environment in which it is impossible to synchronize a frequency with a hopping pattern on the reception side correctly, it is possible to cause the radio communication terminal to perform two-way communication by the frequency hopping system stably. Since a mechanism for performing initial acquisition is unnecessary, it is possible to simplify a circuit constitution of a radio reception unit. In addition, it is possible to improve transmission efficiency by eliminating a preamble for synchronizing frequencies.

Figure 12:
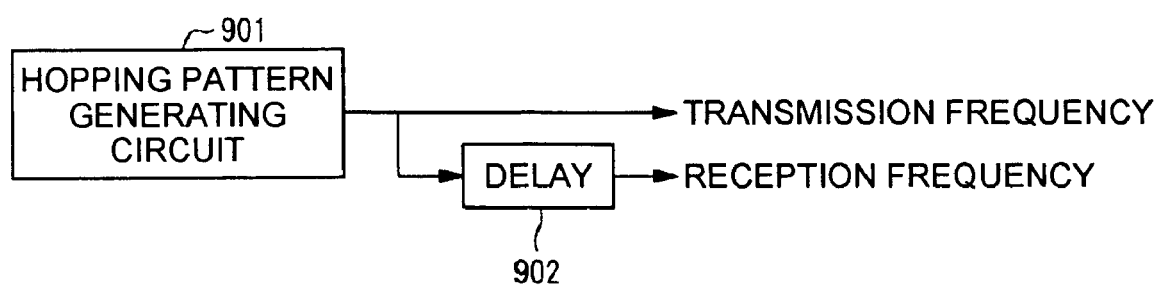
FIG. 12 is a block diagram showing a modification of the radio communication terminal in FIG. 11.

FIG. 12 is a block diagram showing a modification of the radio communication terminal in FIG. 11.

In FIG. 12, a hopping pattern generating circuit 901 and a hopping pattern delaying unit 902 are provided. The hopping pattern generating circuit 901 can generate a hopping pattern consisting of a hopping frequency sequence that is arranged such that hopping frequencies do not overlap one another. The hopping pattern delaying unit 902 can delay an output of a hopping frequency included in a hopping pattern by one slot.

The hopping control device 817 can output a hopping pattern generated by the hopping pattern generating circuit 901 to the transmission frequency synthesizer 813 and the reception frequency synthesizer 815. In addition, the hopping control device 817 can output the hopping pattern generated by the hopping pattern generating circuit 901 to the transmission frequency synthesizer 814 and the reception frequency synthesizer 812 via the hopping pattern delaying unit 902.

This makes it possible to prevent an identical hopping frequency from being allocated to the transmission units 803 and 809 simultaneously while realizing simplification of a circuit constitution. Therefore, it is possible to prevent transmission data transmitted from the transmission unit 803 and transmission data transmitted from the transmission unit 809 from colliding with each other in an identical band. In addition, it is possible to cause the radio communication terminal to perform two-way communication by the frequency hopping system stably.

Figure 13:
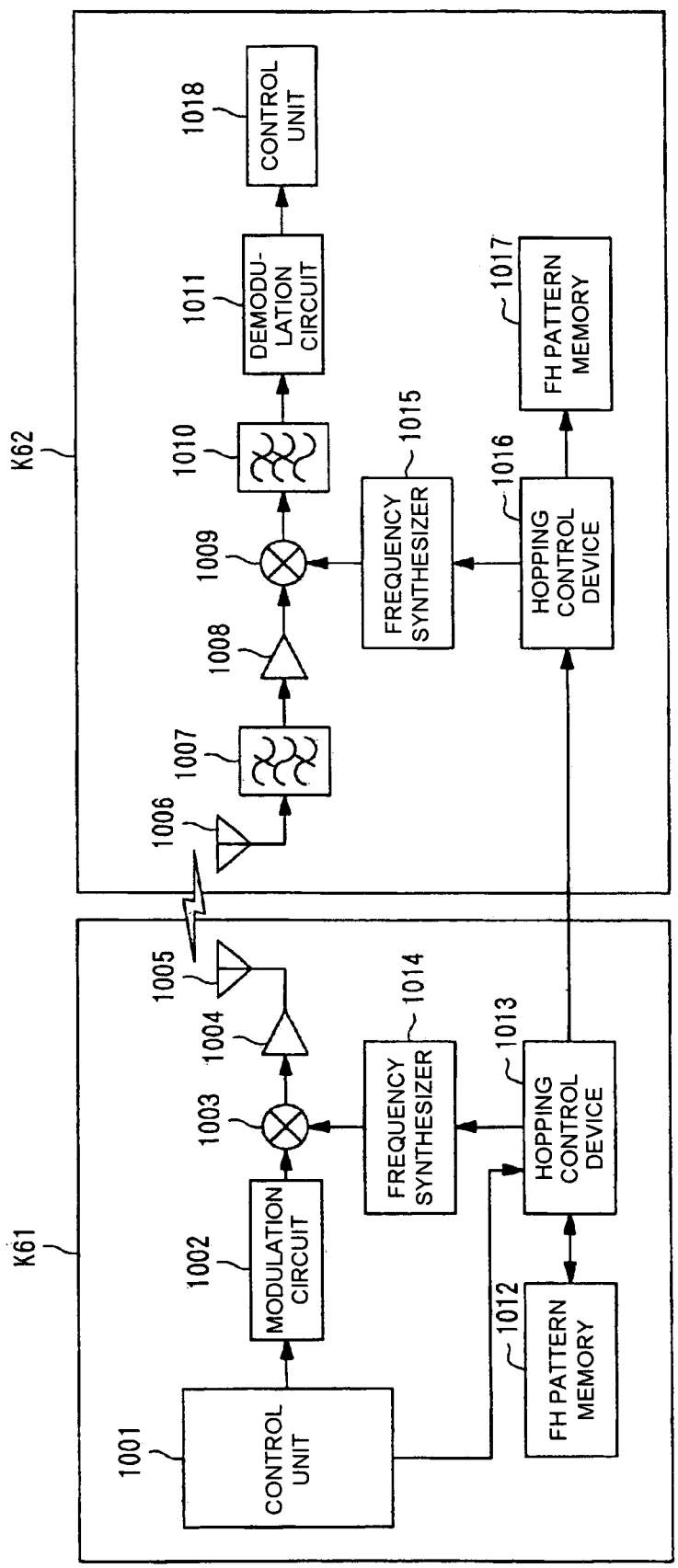
FIG. 13 is a block diagram showing a schematic structure of a radio communication terminal according to a sixth embodiment of the invention.

FIG. 13 is a block diagram showing a schematic structure of a radio communication terminal according to a sixth embodiment of the invention.

In FIG. 13, a first housing unit K61 includes a control unit 1001, a frequency hopping pattern memory 1012, a hopping control device 1013, a modulation circuit 1002, a frequency synthesizer 1014, a mixer 1003, an amplifier 1004, and an antenna for internal radio communication 1005.

A second housing unit K62 includes an antenna for internal radio communication 1006, a frequency hopping pattern memory 1017, a hopping control device 1016, a band-pass filter 1007, a low-noise amplifier 1008, a frequency synthesizer 1015, a mixer 1009, a low-pass filter 1010, a demodulation circuit 1011, and a control unit 1018.

When the control unit 1001 sends transmission data to the modulation circuit 1002, the modulation circuit 1002 converts the transmission data into a base band signal and outputs the base band signal to the mixer 1003. The control unit 1001 sends information specifying a predetermined frequency hopping sequence to the hopping control device 1013. When the hopping control device 1013 receives the information specifying a frequency hopping sequence, the hopping control device 1013 selects a specific hopping pattern. Then, the hopping control device 1013 reads out a hopping frequency sequence included in the selected hopping pattern from the frequency hopping pattern memory 1012 and sends the hopping frequency sequence to the frequency synthesizer 1014 as a frequency designation signal at a predetermined period.

In addition, when the hopping control device 1013 receives the information specifying a frequency hopping sequence from the control unit 1001, the hopping control device 1013 sends information for causing the radio communication terminal to perform selection of a specific hopping pattern and setting of an initial phase to the hopping control device 1016 by wire. When the hopping control device 1016 receives information for causing the radio communication terminal to perform selection of a specific hopping pattern and setting of an initial phase from the hopping control device 1013, the hopping control device 1016 reads out a hopping frequency sequence included in the hopping pattern from the frequency hopping pattern memory 1017 and sends the hopping frequency sequence to the frequency synthesizer 1015 as a frequency designation signal at a predetermined period.

The frequency synthesizers 1014 and 1015 generate local oscillation signals of a frequency specified by the frequency designation signal, respectively, and output the local oscillation signals to the mixers 1003 and 1009, respectively.

The mixer 1003 mixes the base band signal outputted from the modulation circuit 1002 and the local oscillation signal supplied from the frequency synthesizer 1014 and superimposes the base band signal outputted from the modulation circuit 1002 on a carrier wave to thereby perform up-convert for the transmission data. When the base band signal outputted from the modulation circuit 1002 is superimposed on the carrier wave, the base band signal is amplified by the amplifier 1004, and then sent via the antenna for internal radio communication 1005. When transmission data is transmitted via the antenna for internal radio communication 1005, the transmission data is received via the antenna for internal radio communication 1006.

A reception signal received via the antenna for internal radio communication 1006 is amplified by the low-noise amplifier 1008 after an unnecessary frequency component of the reception signal is attenuated by the band-pass filter 1007. Then, the reception signal amplified by the low-noise amplifier 1008 is sent to the mixer 1009. The mixer 1009 mixes the reception signal sent from the low-noise amplifier 1008 and the local oscillation signal supplied from the frequency synthesizer 1015 to perform down-convert for the reception signal.

A signal outputted from the mixer 1009 is sent to the demodulation circuit 1011 after an unnecessary high-frequency component of the signal is attenuated by the low-pass filter 1010. After demodulation processing is applied to the signal by the demodulation circuit 1011, it is possible to apply various kinds of processing such as display processing and storage processing to the signal via the control unit 1018.

This makes it possible to cause the radio communication terminal to perform hopping control on the transmission side and the reception side separately. In addition, since the selection of a hopping pattern and the setting of an initial phase are performed at the time of start of communication, it is possible to cause frequency hopping sequences on the transmission side and the reception side to coincide with each other. Therefore, it is possible to cause the radio communication terminal to perform frequency hopping stably on both the transmission side and the reception side without performing exchange of information by wire between the hopping control devices 1013 and 1016 at every hopping timing. Thus, it is possible to control deterioration in a quality of radio communication by the frequency hopping system while coping with high-speed hopping.

Since a mechanism for performing initial acquisition is unnecessary, it is possible to simplify a circuit constitution of a radio reception unit. In addition, it is possible to improve transmission efficiency by eliminating a preamble for synchronizing frequencies. In particular, when a high-speed hopping system is used, again, time for correlating signals is unnecessary and a plurality of circuits for correlating signals are unnecessary. Thus, it is possible to realize simplification of a circuit constitution of a receiver and obtain a satisfactory characteristic with respect to frequency selective fading such as multi-pass fading without deteriorating transmission efficiency.

Note that, the present embodiment is explained using single-way communication as an example. However, the invention may be applied to two-way communication.

Figure 14:
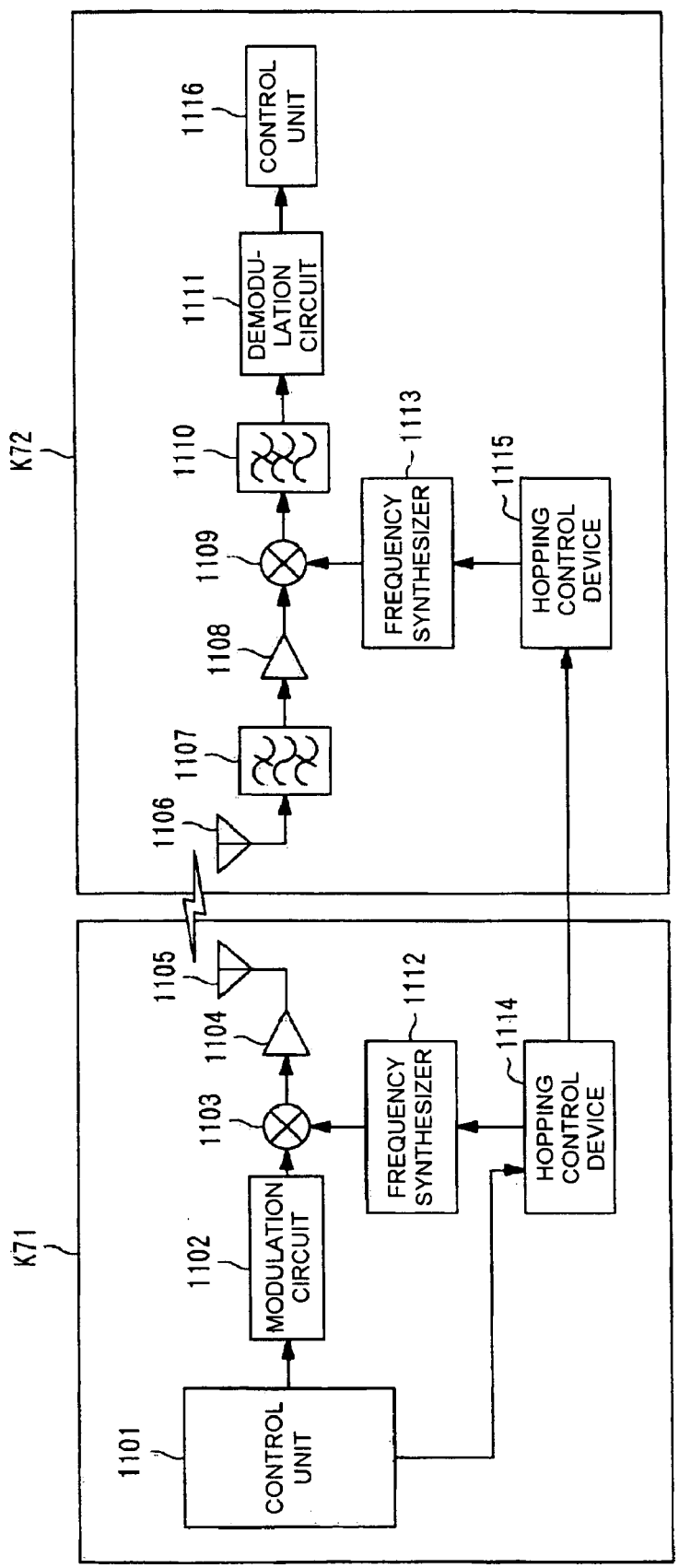
FIG. 14 is a block diagram showing a schematic structure of a radio communication terminal according to a seventh embodiment of the invention.

FIG. 14 is a block diagram showing a schematic structure of a radio communication terminal according to a seventh embodiment of the invention.

In FIG. 14, a first housing unit K71 includes a control unit 1101, a hopping control device 1114, a modulation circuit 1102, a frequency synthesizer 1112, a mixer 1103, an amplifier 1104, and an antenna for internal radio communication 1105.

A second housing unit K72 includes an antenna for internal radio communication 1106, a hopping control device 1115, a band-pass filter 1107, a low-noise amplifier 1108, a frequency synthesizer 1113, a mixer 1109, a low-pass filter 1110, a demodulation circuit 1111, and a control unit 1116. The hopping control devices 1114 and 1115 can generate hopping patterns having a common hopping frequency sequence.

When the control unit 1101 sends transmission data to the modulation circuit 1102, the modulation circuit 1102 converts the transmission data into a base band signal and outputs the base band signal to the mixer 1103. The control unit 1101 sends a reset signal for determining an initial phase of frequency hopping to the hopping control device 1114. When the hopping control device 1114 receives the reset signal, the hopping control device 1114 generates a specific hopping pattern and sends a hopping frequency sequence included in the hopping pattern to the frequency synthesizer 1112 as a frequency designation signal at a predetermined period.

When the hopping control device 1114 receives the reset signal for determining an initial phase of frequency hopping from the control unit 1101, the hopping control device 1114 sends the signal to the hopping control device 1115 by wire. When the hopping control device 1115 receives the reset signal from the hopping control device 1114, the hopping control device 1115 sends, while generating a hopping pattern identical with the hopping pattern generated by the hopping control device 1114, a hopping frequency sequence included in the hopping pattern to the frequency synthesizer 1113 as a frequency designation signal at a predetermined period.

The frequency synthesizers 1112 and 1113 generate local oscillation signals of a frequency specified by the frequency designation signal, respectively, and output the local oscillation signals to the mixers 1103 and 1109, respectively.

The mixer 1103 mixes the base band signal outputted from the modulation circuit 1102 and the local oscillation signal supplied from the frequency synthesizer 1112 and superimposes the base band signal outputted from the modulation circuit 1102 on a carrier wave to thereby perform up-convert for the transmission data. When the base band signal outputted from the modulation circuit 1102 is superimposed on the carrier wave, the base band signal is amplified by the amplifier 1104 and, then, sent via the antenna for internal radio communication 1105. When transmission data is transmitted via the antenna for internal radio communication 1105, the transmission data is received via the antenna for internal radio communication 1106.

A reception signal received via the antenna for internal radio communication 1106 is amplified by the low-noise amplifier 1108 after an unnecessary frequency component of the reception signal is attenuated by the band-pass filter 1107. The reception signal amplified by the low-noise amplifier 1108 is sent to the mixer 1109. The mixer 1109 mixes the reception signal sent from the low-noise amplifier 1108 and the local oscillation signal supplied from the frequency synthesizer 1113 to perform down-convert for the reception signal.

A signal outputted from the mixer 1109 is sent to the demodulation circuit 1111 after an unnecessary high-frequency component of the signal is attenuated by the low-pass filter 1110. After demodulation processing is applied to the signal by the demodulation circuit 1111, it is possible to apply various kinds of processing such as display processing and storage processing to the signal via the control unit 1116.

This makes it possible to cause the radio communication terminal to perform hopping control on the transmission side and the reception side separately. In addition, it is possible to cause phases of frequency hopping sequences on the transmission side and the reception side to coincide with each other by sending a reset signal at the time of start of communication by wire. Therefore, it is possible to cause the radio communication terminal to perform frequency hopping stably on both the transmission side and the reception side without performing exchange of information by wire between the hopping control devices 1114 and 1115 at every hopping timing. Thus, it is possible to control deterioration in a quality of radio communication by the frequency hopping system while coping with high-speed hopping.

Since a mechanism for performing initial acquisition is unnecessary, it is possible to simplify a circuit constitution of a radio reception unit. In addition, it is possible to improve transmission efficiency by eliminating a preamble for synchronizing frequencies. In particular, even when the high-speed hopping system is used, again, time for correlating signals is unnecessary and a plurality of circuits for correlating signals are unnecessary. Thus, it is possible to simplify a circuit constitution for a receiver. In addition, it is possible to obtain a satisfactory characteristic with respect to frequency selective fading such as multi-path fading without deteriorating transmission efficiency.

Figure 15:
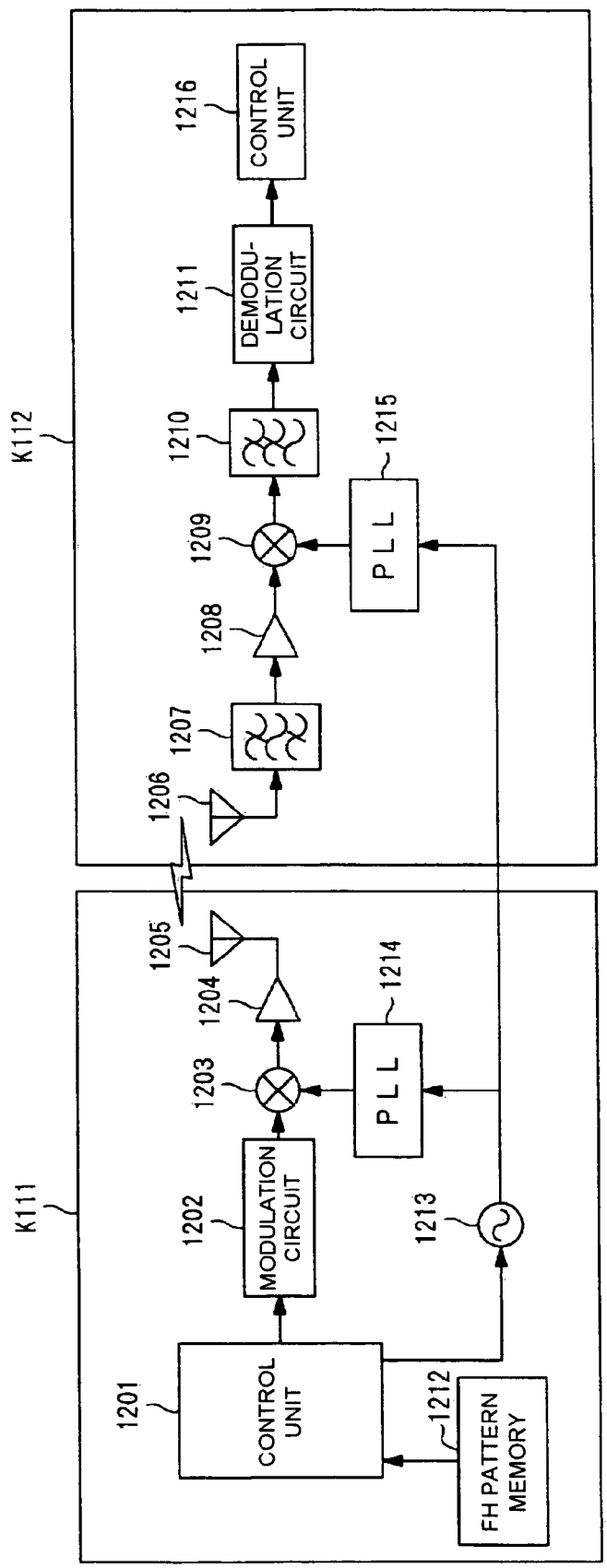
FIG. 15 is a block diagram showing a schematic structure of a radio communication terminal according to an eighth embodiment of the invention.

FIG. 15 is a block diagram showing a schematic structure of a radio communication terminal according to an eighth embodiment of the invention.

In FIG. 15, a first housing unit K111 includes a control unit 1201 that controls entire communication processing between the first housing unit K111 and a second housing unit K112, a frequency hopping pattern memory 1212 that stores a frequency hopping pattern, a local oscillator 1213 that sends a local oscillation signal to PLL (Phase Locked Loop) circuits 1214 and 1215 by wire while hopping a frequency in accordance with control from the control unit 1201, a modulation circuit 1202 that converts transmission data into a base band signal, the PLL circuit 1214 that generates a carrier signal by multiplying a local oscillation signal sent from the local oscillator 1213 by wire, a mixer 1203 that mixes a carrier signal outputted from the PLL circuit 1214 in a base band signal outputted from the modulation circuit 1202, an amplifier 1204 that amplifies a signal outputted from the mixer 1203, and an antenna for internal radio communication 1205 that performs transmission of a radio wave for internal radio communication on the first housing unit K111 side.

The second housing unit K112 includes an antenna for internal radio communication 1206 that performs reception of a radio wave for internal radio communication on the second housing unit K112 side, a band-pass filter 1207 that attenuates an unnecessary frequency component included in a reception signal received by the antenna for internal radio communication 1206, a low-noise amplifier 1208 that amplifies a reception signal outputted from the band-pass filter 1207, a PLL circuit 1215 that generates a detection signal by multiplying a local oscillating signal sent from the local oscillator 1213 by wire, a mixer 1209 that mixes a detection signal outputted from the PLL circuit 1215 in a reception signal outputted from the low-noise amplifier 1208, a low-pass filter 1210 that attenuates an unnecessary high-frequency component included in an output signal from the mixer 1209, a demodulation circuit 1211 that performs demodulation processing for a reception signal outputted from the low-pass filter 1210, and a control unit 1216 that performs processing for a signal outputted from the demodulation circuit 1211. Note that it is possible to use the same constitution as FIG. 5 as a frequency hopping pattern.

When the control unit 1201 sends transmission data to the modulation circuit 1202, the modulation circuit 1202 converts the transmission data into a base band signal and outputs the base band signal to the mixer 1203. The control unit 1201 selects one hopping pattern out of the hopping patterns P1 to PN in FIG. 5, reads out a hopping frequency sequence included in the selected hopping pattern from the frequency hopping pattern memory 1212, and sends the hopping frequency sequence to the local oscillator 1213 as a frequency designation signal at a predetermined period. The local oscillator 1213 generates local oscillation signals of a frequency specified by the frequency designation signal and sends the local oscillation signals to the PLL circuits 1214 and 1215 by wire, respectively. When the PLL circuits 1214 and 1215 receive the local oscillation signals from the local oscillator 1213, the PLL circuits 1214 and 1215 multiply the local oscillation signals, respectively, and output the local oscillation signals to the mixers 1203 and 1209, respectively.

The mixer 1203 mixes the base band signal outputted from the modulation circuit 1202 and the signal supplied from the PLL circuit 1214 and superimposes the base band signal outputted from the modulation circuit 1202 on a carrier wave to thereby perform up-convert for the transmission data. When the base band signal outputted from the modulation circuit 1202 is superimposed on the carrier wave, the base band signal is amplified by the amplifier 1204 and, then, sent via the antenna for internal radio communication 1205. When transmission data is transmitted via the antenna for internal radio communication 1205, the transmission data is received via the antenna for internal radio communication 1206.

A reception signal received via the antenna for internal radio communication 1206 is amplified by the low-noise amplifier 1208 after an unnecessary frequency component of the reception signal is attenuated by the band-pass filter 1207.

The reception signal amplified by the low-noise amplifier 1208 is sent to the mixer 1209. The mixer 1209 mixes the reception signal sent from the low-noise amplifier 1208 and the signal supplied from the PLL circuit 1215 to perform down-convert for the reception signal.

A signal outputted from the mixer 1209 is sent to the demodulation circuit 1211 after an unnecessary high-frequency component of the signal is attenuated by the low-pass filter 1210. After demodulation processing is applied to the signal by the demodulation circuit 1211, it is possible to apply various kinds of processing such as display processing and storage processing to the signal via the control unit 1216.

It is possible to, for both the first housing unit K111 and the second housing unit K112, share a local oscillation signal generated by the identical local oscillator 1213 by sending a local oscillation signal, a frequency of which changes according to hopping, to the PLL circuits 1214 and 1215 by wire. Therefore, it is possible to use a completely synchronized local oscillation signal between the first housing unit K111 and the second housing unit K112. Thus, even when there is a frequency error in an output of the local oscillator 1213, it is possible to obtain a satisfactory reception performance. It is unnecessary to send information for causing the radio communication terminal to perform frequency hopping by radio. Thus, even in an inferior communication environment in which it is impossible to synchronize a frequency with a hopping pattern on the reception side correctly, it is possible to cause the radio communication terminal to perform frequency hopping stably on both the transmission side and the reception side.

Since it is unnecessary to assume a hopping pattern from a reception signal on the reception side, it is unnecessary to perform initial acquisition. Thus, it is possible to simplify a constitution of a reception circuit. Moreover, only centering time of the PLL circuits 1214 and 1215 is required as synchronization time. An output of a preamble signal required only for synchronizing frequencies is unnecessary. Thus, it is possible to improve communication throughput.

Note that, in the embodiment described above, the method of providing the frequency hopping pattern memory 1212 and the local oscillator 1213 in the first housing unit K111 is explained. However, the frequency hopping pattern memory 1212 and the local oscillator 1213 may be provided in the second housing unit K112. In addition, in the embodiment, the method of providing the frequency hopping pattern memory 1212 to allow the control unit 1201 to acquire the hopping patterns P1 to PN is explained. However, a hopping pattern generating circuit for generating specific hopping patterns may be provided. Moreover, in the above embodiment, the method in which the local oscillator 1213 causes the radio communication terminal to perform frequency hopping at a fixed period is explained. However, the local oscillator 1213 may cause the radio communication terminal to perform frequency hopping at random.

Figure 16:
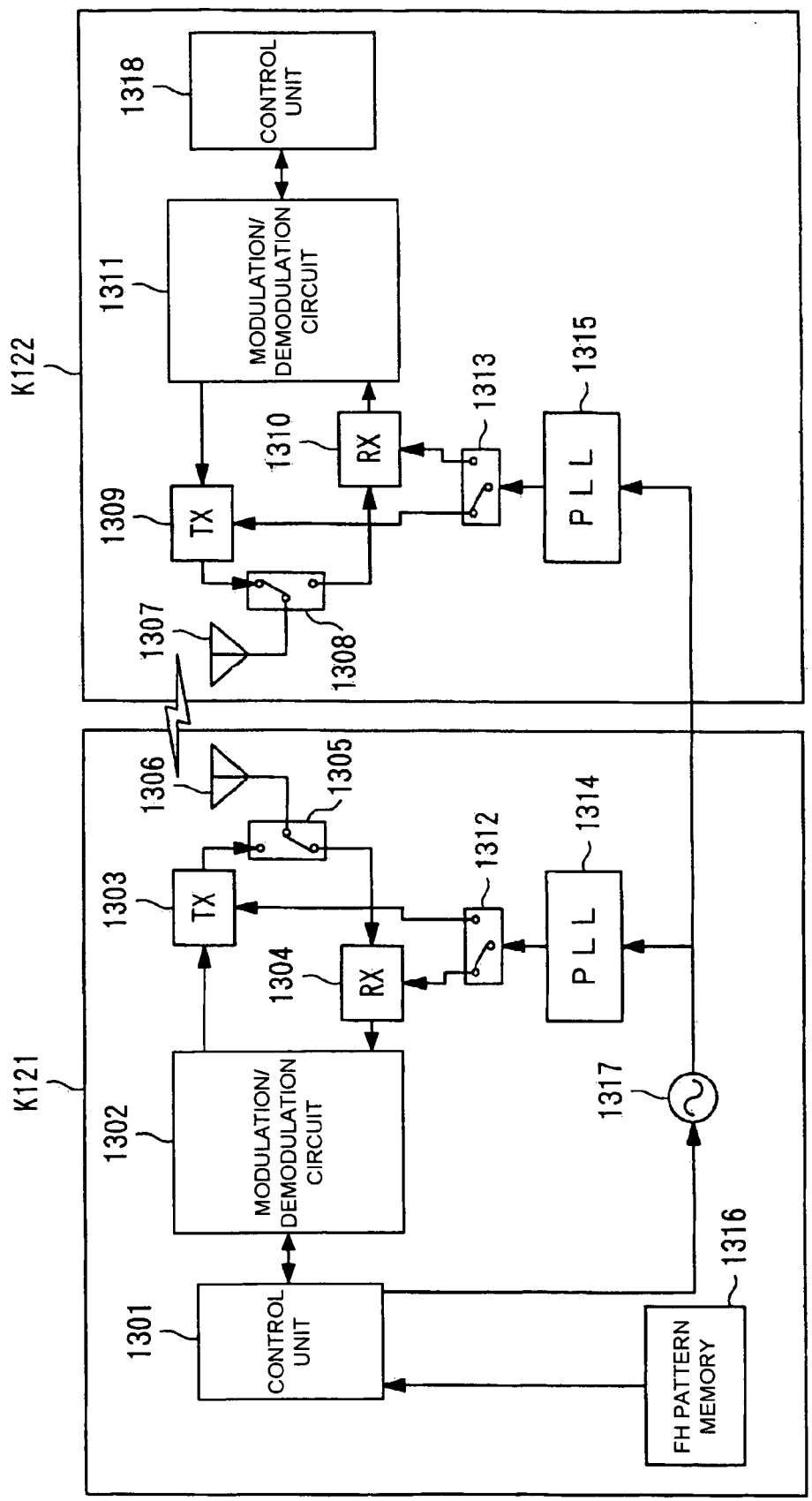
FIG. 16 is a block diagram showing a schematic structure of a radio communication terminal according to a ninth embodiment of the invention.

FIG. 16 is a block diagram showing a schematic structure of a radio communication terminal according to a ninth embodiment of the invention.

In FIG. 16, a first housing unit K121 includes a control unit 1301 that controls entire communication processing between the first housing unit K121 and a second housing unit K122, a frequency hopping pattern memory 1316 that stores a frequency hopping pattern, a local oscillator 1317 that sends a local oscillation signal to PLL circuits 1314 and 1315 by wire while hopping a frequency in accordance with control from the control unit 1301, a modulation/demodulation circuit 1302 that converts transmission data into a base band signal and performs demodulation processing for a reception signal, the PLL circuit 1314 that generates a carrier signal by multiplying a local oscillation signal sent from the local oscillator 1317 by wire, a transmission unit 1303 that manages control for radio transmission performed via an antenna for internal radio communication 1306, a reception unit 1304 that manages control for radio reception performed via the antenna for internal radio communication 1306, the antenna for internal radio communication 1306 that performs transmission and reception of a radio wave for internal radio communication on the first housing unit K121 side, a switch 1305 that performs switching to the antenna for internal radio communication 1306 between the transmission unit 1303 and the reception unit 1304, and a switch 1312 that performs switching to the PLL circuit 1314 between the transmission unit 1303 and the reception unit 1304.

The second housing unit K122 includes an antenna for internal radio communication 1307 that performs transmission and reception of a radio wave for internal radio communication on the second housing unit K122 side, a PLL circuit 1315 that generates a detection signal by multiplying a local oscillation signal sent from the local oscillator 1317 by wire, a transmission unit 1309 that manages control for radio transmission performed via the antenna for internal radio communication 1307, a reception unit 1310 that manages control for radio reception performed via the antenna for internal radio communication 1307, a switch 1308 that performs switching to the antenna for internal radio communication 1307 between the transmission unit 1309 and the reception unit 1310, a switch 1313 that performs switching to the PLL circuit 1315 between the transmission unit 1309 and the reception unit 1310, a modulation/demodulation circuit 1311 that converts transmission data into a base band signal and performs demodulation processing for a reception signal, and a control unit 1318 that performs processing for a signal outputted from the modulation/demodulation circuit 1311.

When the radio communication terminal performs data transmission from the first housing unit K121 to the second housing unit K122, the radio communication terminal changes over the switches 1305 and 1312 to the transmission unit 1303 side and changes over the switches 1308 and 1313 to the reception unit 1310 side. Transmission data outputted from the control unit 1301 is converted into a base band signal by the modulation/demodulation circuit 1302 and sent to the transmission unit 1303.

The control unit 1301 reads out a hopping frequency sequence included in a hopping pattern from the frequency hopping pattern memory 1316 and sends the hopping frequency sequence to the local oscillator 1317 as a frequency designation signal at a predetermined period. The local oscillator 1317 generates local oscillation signals of a frequency specified by the frequency designation signal and sends the local oscillation signal to the PLL circuits 1314 and 1315 by wire. When the PLL circuits 1314 and 1315 receive the local oscillation signals from the local oscillator 1317, respectively, the PLL circuits 1314 and 1315 multiply the local oscillation signals, respectively, and output the local oscillation signals to the transmission unit 1303 and the reception unit 1310 via the switches 1312 and 1313, respectively.

The transmission unit 1303 mixes the base band signal outputted from the modulation/demodulation circuit 1302 and a carrier signal supplied from the PLL circuit 1314 and superimposes the base band signal outputted from the modulation/demodulation circuit 1302 on a carrier wave to thereby perform up-convert for the transmission data. When the base band signal outputted from the modulation/demodulation circuit 1302 is superimposed on the carrier wave, the transmission unit 1303 sends the base band signal to the antenna for internal radio communication 1306 via the switch 1305 and sends the base band signal via the antenna for internal radio communication 1306. When transmission data is transmitted via the antenna for internal radio communication 1306, the transmission data is received via the antenna for internal radio communication 1307.

A reception signal received by the antenna for internal radio communication 1307 is sent to the reception unit 1310 via the switch 1308. The reception unit 1310 mixes the reception signal received by the antenna for internal radio communication 1307 and a detection signal supplied from the PLL circuit 1315 to perform down-convert for the reception signal. A signal outputted from the reception unit 1310 is sent to the modulation/demodulation circuit 1311. After demodulation processing is applied to the signal by the modulation/demodulation circuit 1311, it is possible to apply various kinds of processing such as display processing and storage processing to the signal via the control unit 1318.

On the other hand, when the radio communication terminal performs data transmission from the second housing unit K122 to the first housing unit K121, the radio communication terminal changes over the switches 1305 and 1312 to the reception unit 1304 side and changes over the switches 1308 and 1313 to the transmission unit 1309 side. The transmission data outputted from the control unit 1318 is converted into a base band signal by the modulation/demodulation circuit 1311 and sent to the transmission unit 1309.

The control unit 1301 reads out a hopping frequency sequence included in a hopping pattern from the frequency hopping pattern memory 1316 and sends the hopping frequency sequence to the local oscillator 1317 as a frequency designation signal at a predetermined period. The local oscillator 1317 generates local oscillation signals of a frequency specified by the frequency designation signal and sends the local oscillation signals to the PLL circuits 1314 and 1315 by wire. When the PLL circuits 1314 and 1315 receive the local oscillation signals from the local oscillator 1317, respectively, the PLL circuits 1314 and 1315 multiply the local oscillation signals, respectively, and output the local oscillation signals to the transmission unit 1309 and the reception unit 1304 via the switches 1312 and 1313, respectively.

The transmission unit 1309 mixes the base band signal outputted from the modulation/demodulation circuit 1311 and a carrier signal supplied from the PLL circuit 1315 and superimposes the base band signal outputted from the modulation/demodulation circuit 1311 on a carrier wave to thereby perform up-convert for the transmission data. When the base band signal outputted from the modulation/demodulation circuit 1311 is superimposed on the carrier wave, the transmission unit 1309 sends the base band signal to the antenna for internal radio communication 1307 via the switch 1308 and sends the base band signal via the antenna for internal radio communication 1307. When transmission data is transmitted via the antenna for internal radio communication 1307, the transmission data is received via the antenna for internal radio communication 1306.

A reception signal received by the antenna for internal radio communication 1306 is sent to the reception unit 1304 via the switch 1305. The reception signal 1304 mixes the reception signal received by the antenna for internal radio communication 1306 and a detection signal supplied from the PLL circuit 1314 to perform down-convert for the reception data. A signal outputted from the reception unit 1304 is sent to the modulation/demodulation circuit 1302. After demodulation processing is applied to the signal by the modulation/demodulation circuit 1302, it is possible to apply various kinds of processing such as display processing and storage processing to the signal via the control unit 1301.

This makes it possible for the PLL circuits 1314 and 1315 to share the local oscillator 1317 even when the transmission units 1303 and 1309 are provided in the first housing unit K121 and the second housing unit K122, respectively, and the reception units 1304 and 1310 are provided in the first housing unit K121 and the second housing unit K122, respectively. Therefore, even in an inferior communication environment in which it is impossible to synchronize a frequency with a hopping pattern on the reception side correctly, it is possible to cause the radio communication terminal to perform frequency hopping stably on both the transmission side and the reception side while making it possible to perform two-way communication between the first housing unit K121 and the second housing unit K122.

Figure 17:
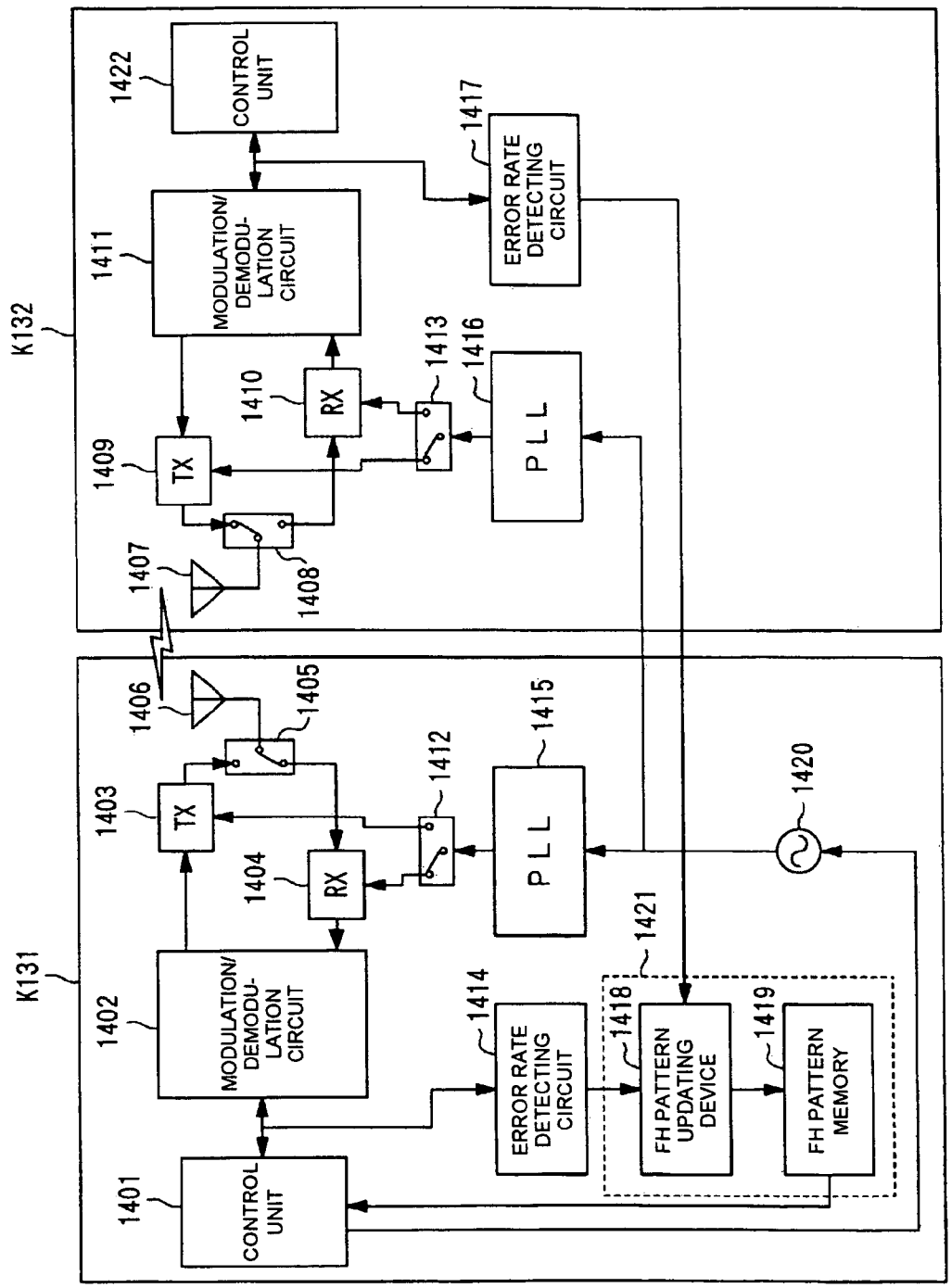
FIG. 17 is a block diagram showing a schematic structure of a radio communication terminal according to a tenth embodiment of the invention.

FIG. 17 is a block diagram showing a schematic structure of a radio communication terminal according to a tenth embodiment of the invention.

In FIG. 17, a first housing unit K131 includes a control unit 1401, a modulation/demodulation circuit 1402, a local oscillator 1420, a PLL circuit 1415, a transmission unit 1403, a reception unit 1404, an antenna for internal radio communication 1406, switches 1405 and 1412, an error rate detecting circuit 1414 that detects an error rate of a reception signal received by the reception unit 1404, and a hopping pattern control unit 1421. The hopping pattern control unit 1421 includes a frequency hopping pattern updating device 1418 that updates a hopping pattern on the basis of an error rate detected by the error rate detecting circuit 414, and a frequency hopping pattern memory 1419.

A second housing unit K132 includes an antenna for internal radio communication 1407, a PLL circuit 1416, a transmission unit 1409, a reception unit 1410, switches 1408 and 1413, an error rate detecting circuit 1417 that detects an error rate of a reception signal received by the reception unit 1410, a modulation/demodulation circuit 1411, and a control unit 1422. The local oscillator 1420 is connected to both the PLL circuits 1415 and 1416 by wire.

When the radio communication terminal performs data transmission from the first housing unit K131 to the second housing unit K132, the radio communication terminal changes over the switches 1405 and 1412 to the transmission unit 1403 side and changes over the switches 1408 and 1413 to the reception unit 1410 side. Transmission data outputted from the control unit 1401 is converted into a base band signal by the modulation/demodulation circuit 1402 and sent to the transmission unit 1403.

The control unit 1401 reads out a hopping frequency sequence included in a hopping pattern from the frequency hopping pattern memory 1419 and sends the hopping frequency sequence to the local oscillator 1420 as a frequency designation signal at a predetermined period. The local oscillator 1420 generates local oscillation signals of a frequency specified by the frequency designation signal, respectively, and sends the local oscillation signals to the PLL circuits 1415 and 1416 by wire. When the PLL circuits 1415 and 1416 receive the local oscillation signals from the local oscillator 1420, respectively, the PLL circuits 1415 and 1416 multiply the local oscillation signals, respectively, and output the local oscillation signals to the transmission unit 1403 and the reception unit 1410 via the switches 1412 and 1413, respectively.

The transmission unit 1403 mixes the base band signal outputted from the modulation/demodulation circuit 1402 and a carrier signal supplied from the PLL circuit 1415 and superimposes the base band signal outputted from the modulation/demodulation circuit 1402 on a carrier wave to thereby perform up-convert for the transmission data. When the base band signal outputted from the modulation/demodulation circuit 1402 is superimposed on the carrier wave, the transmission unit 1403 sends the base band signal to the antenna for internal radio communication 1406 via the switch 1405 and sends the base band signal via the antenna for internal radio communication 1406. When transmission data is transmitted via the antenna for internal radio communication 1406, the transmission data is received via the antenna for internal radio communication 1407.

A reception signal received by the antenna for internal radio communication 1407 is sent to the reception unit 1410 via the switch 1408. The reception unit 1410 mixes the reception signal received from the antenna for internal radio communication 1407 and a detection signal supplied from the PLL circuit 1416 to perform down-convert for the reception signal. A signal outputted from the reception unit 1410 is sent to the modulation/demodulation circuit 1411. After demodulation processing is applied to the signal by the modulation/demodulation circuit 1411, it is possible to apply various kinds of processing such as display processing and storage processing to the signal via the control unit 1422.

The error rate detecting circuit 1417 detects an error rate of the reception signal on the basis of the signal subjected to the demodulation processing by the modulation/demodulation circuit 1411 and outputs the detected error rate to the frequency hopping pattern updating device 1418. Note that, it is possible to use, for example, a BER or a PER as an error rate. A reception quality of a radio wave such as RSSI may be used instead of the error rate.

When the frequency hopping pattern updating device 1418 receives the error rate from the error rate detecting circuit 1417, the frequency hopping pattern updating device 1418 updates a hopping pattern stored in the frequency hopping pattern memory 1419 on the basis of the error rate. For example, when the error rate of the reception signal is equal to or higher than a predetermined value, the frequency hopping pattern updating device 1418 can set a flag on a hopping frequency used for the current communication and store the flag in the frequency hopping pattern memory 1419. When the control unit 401 reads out a hopping frequency from the hopping pattern stored in the frequency hopping pattern memory 1419, the control unit 401 judges whether a flag is set on the hopping frequency. It is possible to send a hopping frequency sequence of the hopping pattern to the local oscillator 1420 as a frequency designation signal while skipping hopping frequencies on which flags are set.

On the other hand, when the radio communication terminal performs data transmission from the second housing unit K132 to the first housing unit K131, the radio communication terminal changes over the switches 1405 and 1412 to the reception unit 1404 side and changes over the switches 1408 and 1413 to the transmission unit 1409 side. Transmission data outputted from the control unit 1422 is converted into a base band signal by the modulation/demodulation circuit 1411 and sent to the transmission unit 1409.

The control unit 1401 reads out a hopping frequency sequence included in a hopping pattern from the frequency hopping pattern memory 1419 and sends the hopping frequency sequence to the local oscillator 1420 as a frequency designation signal at a predetermined period. The local oscillator 1420 generates local oscillation signals of a frequency specified by the frequency designation signal and sends the local oscillation signals to the PLL circuits 1415 and 1416 by wire. When the PLL circuits 1415 and 1416 receive the local oscillation signals from the local oscillator 1420, respectively, the PLL circuits 1415 and 1416 multiply the local oscillation signals, respectively, and output the local oscillation signals to the transmission unit 1409 and the reception unit 1404 via the switches 1412 and 1413, respectively.

The transmission unit 1409 mixes the base band signal outputted from the modulation/demodulation circuit 1411 and the local oscillation signal supplied from the PLL circuit 1416 and superimposes the base band signal outputted from the modulation/demodulation circuit 1411 on a carrier wave to thereby perform up-convert for the transmission data. When the base band signal outputted from the modulation/demodulation circuit 1411 is superimposed on the carrier wave, the transmission unit 1409 sends the base band signal to the antenna for internal radio communication 1407 via the switch 1408 and sends the base band signal via the antenna for internal radio communication 1407. When transmission data is transmitted via the antenna for internal radio communication 1407, the transmission data is received via the antenna for internal radio communication 1406.

A reception signal received by the antenna for internal radio communication 1406 is sent to the reception unit 1404 via the switch 1405. The reception unit 1404 mixes the reception signal received by the antenna for internal radio communication 1406 and the local oscillation signal supplied from the PLL circuit 1415 to perform down-convert for the reception signal. A signal outputted from the reception unit 1404 is sent to the modulation/demodulation circuit 1402. After demodulation processing is applied to the signal by the modulation/demodulation circuit 1402, it is possible to apply various kinds of processing such as display processing and storage processing to the signal via the control unit 1401.

The error rate detecting circuit 1414 detects an error rate of the reception signal on the basis of the signal subjected to the demodulation processing by the modulation/demodulation circuit 1402 and outputs the detected error rate to the frequency hopping pattern updating device 1418. When the frequency hopping pattern updating device 1418 receives an error rate from the error rate detecting circuit 1414, the frequency hopping pattern updating device 1418 updates the hopping pattern stored in the frequency hopping pattern memory 1419 on the basis of the error rate. The control unit 1401 reads out the updated hopping pattern from the frequency hopping pattern memory 1419 and sends a hopping frequency sequence of the hopping pattern to the local oscillator 1420 as a frequency designation signal by wire.

This makes it possible to adaptively change a hopping frequency according to a present communication environment while both the transmission side and the reception side share a local oscillation signal, a frequency of which changes according to hopping. Therefore, it is possible to cause the radio communication terminal to perform frequency hopping stably on both the transmission side and the reception side while avoiding a frequency with a poor communication state. Thus, even in an inferior communication environment in which it is impossible to synchronize a frequency with a hopping pattern on the reception side correctly, it is possible to control deterioration in a quality of radio communication by the frequency hopping system. In addition, it is possible to improve communication throughput.

Note that, in the embodiment described above, the method of providing the error rate detecting circuits 1414 and 1417 in the first housing unit K131 and the second housing unit K132, respectively, is explained. However, the error rate detecting circuit 1414 may be provided only on the first housing unit K131 side. The embodiment in FIG. 17 is explained with the two-way communication as an example. However, the invention may be applied to single-way communication. It is also possible that logs of information such as hopping frequencies and BERs used in communication in the past are stored and a hopping frequency with a low BER is used preferentially. A fixed number of usable hopping frequencies may be secured in the order from a hopping frequency with a lower BER.

Figure 18:
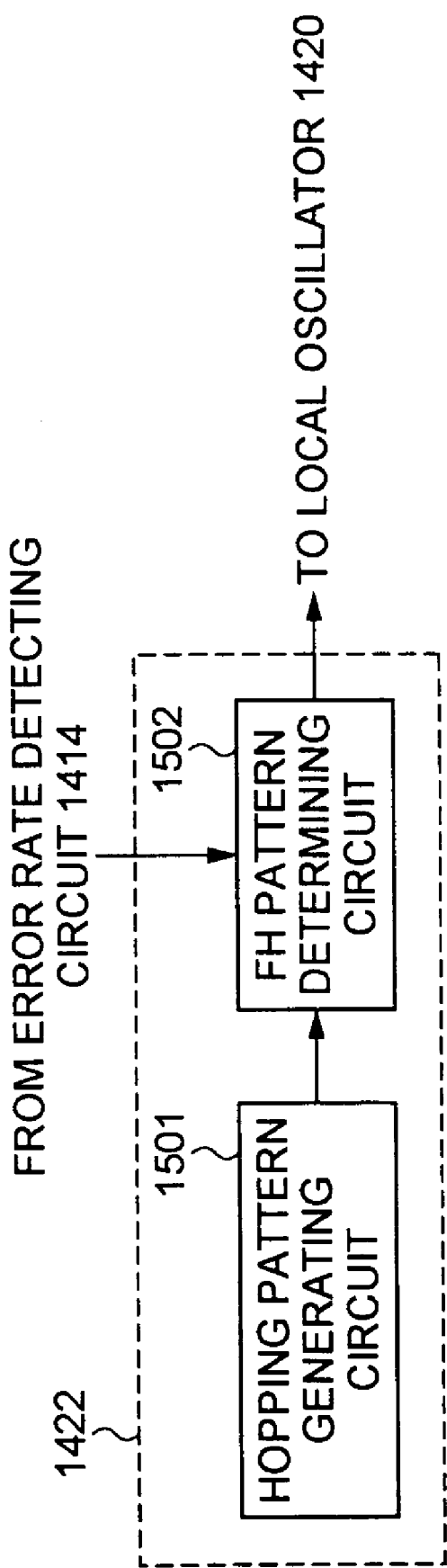
FIG. 18 is a block diagram showing another example of a structure of a hopping pattern control unit in FIG. 17.

FIG. 18 is a block diagram showing another example of a structure of the hopping pattern control unit 1421 in FIG. 17.

In FIG. 18, a hopping pattern generating circuit 1501 and a frequency hopping pattern determining circuit 1502 are provided in the hopping pattern control unit 1422. The hopping pattern control unit 1421 in FIG. 17 may be replaced with the hopping pattern control unit 1422 in FIG. 18.

The hopping pattern generating circuit 1501 generates a specific hopping pattern and outputs the generated hopping pattern to the frequency hopping pattern determining circuit 1502. The frequency hopping pattern determining circuit 1502 can determine whether a hopping frequency of the hopping pattern generated by the hopping pattern generating circuit 1501 is used on the basis of error rates detected by the error rate detecting circuits 1414 and 1417.

Note that, in the embodiment described above, it is possible to determine time (a slot length) in advance during which communication continues at one frequency. It is possible to perform communication at the same frequency in this section. For example, in Bluetooth, one slot is set as 625 us. Communication is performed in a slot in which a master and a slave are set according to TDD.

Figure 19:
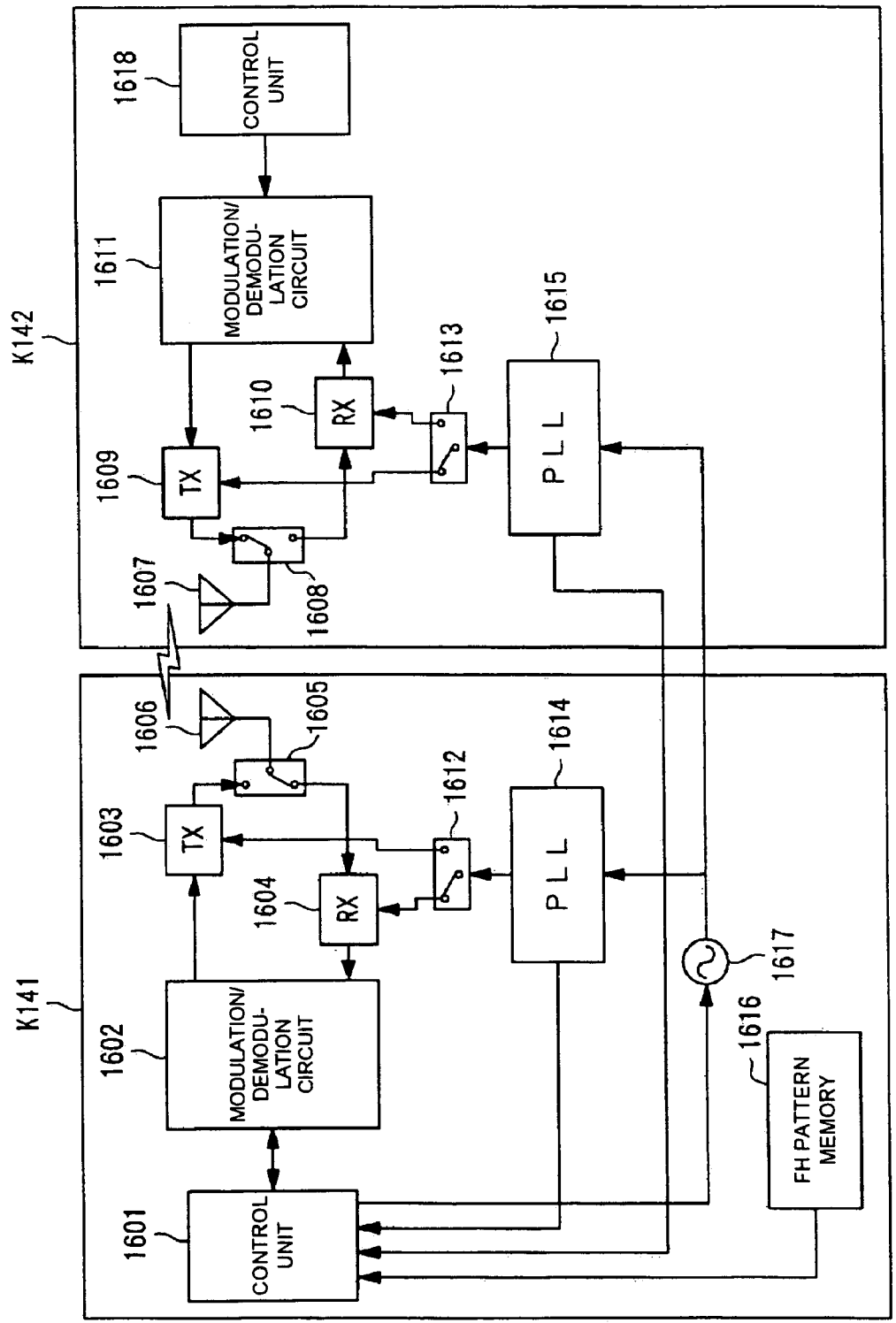
FIG. 19 is a block diagram showing a structure of a radio communication terminal according to an eleventh embodiment of the invention.

FIG. 19 is a block diagram showing a schematic structure of a radio communication terminal according to an eleventh embodiment of the invention.

In FIG. 19, a first housing unit K141 includes a control unit 1601, a frequency hopping pattern memory 1616, a modulation/demodulation circuit 1602, a local oscillator 1617, a PLL circuit 1614, a transmission unit 1603, a reception unit 1604, an antenna for internal radio communication 1606, and switches 1605 and 1612. A second housing unit K142 includes an antenna for internal radio communication 1607, a PLL circuit 1615, a transmission unit 1609, a reception unit 1610, switches 1608 and 1613, a modulation/demodulation circuit 1611, and a control unit 1618. The local oscillator 1617 is connected to both the PLL circuits 1614 and 1615 by wire.

When the radio communication terminal performs data transmission from the first housing unit K141 to the second housing unit K142, the radio communication terminal changes over the switches 1605 and 1612 to the transmission unit 1603 side and changes over the switches 1608 and 1613 to the reception unit 1610 side.

The control unit 1601 sets a slot length on the basis of an amount of data of transmission data to be transmitted this time and sets hopping timing corresponding to the slot length. The control unit 1601 reads out a hopping frequency sequence included in a hopping pattern from the frequency hopping pattern memory 1616 and sends the hopping frequency sequence to the local oscillator 1617 as a frequency designation signal. The local oscillator 1617 generates local oscillation signals of a frequency specified by the frequency designation signal and sends the local oscillation signals to the PLL circuits 1614 and 1615. When the PLL circuits 1614 and 1615 receive the local oscillation signals from the local oscillator 1617, respectively, the PLL circuits 1614 and 1615 multiply the local oscillation signals, respectively, and output the local oscillation signals to the transmission unit 1603 and the reception unit 1610 via the switches 1612 and 1613, respectively.

The PLL circuits 1614 and 1615 detect whether a frequency of a carrier signal is locked to a specific frequency. When the frequency of the carrier signal is locked, the PLL circuits 1614 and 1615 send lock detection signals to the control unit 1601, respectively. When the control unit 1601 receives the lock detection signals from the PLL circuits 1614 and 1615, the control unit 1601 sends transmission data to the modulation/demodulation circuit 1602. The modulation/demodulation circuit 1602 converts the transmission data into a base band signal and sends the base band signal to the transmission unit 1603.

The transmission unit 1603 mixes a base band signal outputted from the modulation/demodulation circuit 1602 and a carrier signal supplied from the PLL circuit 1614 and superimposes the base band signal outputted from the modulation/demodulation circuit 1602 on a carrier wave to thereby perform up-convert for the transmission data. When the base band signal outputted from the modulation/demodulation circuit 1602 is superimposed on the carrier wave, the transmission unit 1603 sends the base band signal to the antenna for internal radio communication 1606 via the switch 1605 and sends the base band signal via the antenna for internal radio communication 1606. When transmission data is transmitted via the antenna for internal radio communication 1606, the transmission data is received via the antenna for internal radio communication 1607.

A reception signal received by the antenna for internal radio communication 1607 is sent to the reception unit 1610 via the switch 1608. The reception unit 1610 mixes the reception signal received by the antenna for internal radio communication 1607 and a detection signal supplied from the PLL circuit 1615 to perform down-convert for the reception signal. A signal outputted from the reception unit 1610 is sent to the modulation/demodulation circuit 1611. After demodulation processing is applied to the signal by the modulation/demodulation circuit 1611, it is possible to apply various kinds of processing such as display processing and storage processing to the signal via the control unit 1618.

This makes it possible to change a slot length while both the transmission side and the reception side share a local oscillation signal, a frequency of which changes according to hopping. Therefore, it is possible to cause the radio communication terminal to perform data communication efficiently while making it possible to cause the radio communication terminal to perform frequency hopping stably on both the transmission side and the reception side. Thus, even in an inferior communication environment in which it is impossible to synchronize a frequency with a hopping pattern on the reception side correctly, it is possible to control deterioration in a quality of radio communication by the frequency hopping system. In addition, it is possible to improve communication throughput.

Since it is possible to change a slot length according to a load state of data communication, it is possible to set a long slot length when the amount of data is large and set a short slot length when the amount of data is small. Therefore, it is unnecessary to add dummy data to the data and send the data when the amount of data is small. Thus, it is possible to prevent waste of power consumption.

On the other hand, when the radio communication terminal performs data transmission from the second housing unit K142 to the first housing unit K141, the radio communication terminal changes over the switches 1605 and 1612 to the reception unit 1604 side and changes over the switches 1608 and 1613 to the transmission unit 1609 side. The transmission data outputted from the control unit 1618 is converted into a base band signal by the modulation/demodulation circuit 1611 and sent to the transmission unit 1609.

The control unit 1601 reads out a hopping frequency sequence included in a hopping pattern from the frequency hopping pattern memory 1616 and sends the hopping frequency sequence to the local oscillator 1617 as a frequency designation signal at a predetermined period. The local oscillator 1617 generates local oscillation signals of a frequency specified by the frequency designation signal and sends the local oscillation signals to the PLL circuits 1614 and 1615 by wire. When the PLL circuits 1614 and 1615 receive the local oscillation signals from the local oscillator 1617, respectively, the PLL circuits 1614 and 1615 multiply the local oscillation signals, respectively, and output the local oscillation signals to the transmission unit 1609 and the reception unit 1604 via the switches 1612 and 1613, respectively.

The transmission unit 1609 mixes the base band signal outputted from the modulation/demodulation circuit 1611 and a carrier signal supplied from the PLL circuit 1615 and superimposes the base band signal outputted from the modulation/demodulation circuit 1611 on a carrier wave to thereby perform up-convert for the transmission data. When the base band signal outputted from the modulation/demodulation circuit 1611 is superimposed on the carrier wave, the transmission unit 1609 sends the base band signal to the antenna for internal radio communication 1607 via the switch 1608 and sends the base band signal via the antenna for internal radio communication 1607. When transmission data is transmitted via the antenna for internal radio communication 1607, the transmission data is received via the antenna for internal radio communication 1606.

A reception signal received by the antenna for internal radio communication 1606 is sent to the reception unit 1604 via the switch 1605. The reception unit 1604 mixes the reception signal received by the antenna for internal radio communication 1606 and a detection signal supplied from the PLL circuit 1614 to perform down-convert for the reception signal. A signal outputted from the reception unit 1604 is sent to the modulation/demodulation circuit 1602. After demodulation processing is applied to the signal by the modulation/demodulation circuit 1602, it is possible to apply various kinds of processing such as display processing and storage processing to the signal via the control unit 1601.

Note that, in the embodiment described above, the method of sending lock detection signals outputted from the PLL circuits 1614 and 1615 only to the control unit 1601 side is explained. However, lock detection signals outputted from the PLL circuits 1614 and 1615 may also be sent to the control unit 1618 such that a slot length can also be changed when the radio communication terminal performs data transmission from the second housing unit K142 to the first housing unit K141.

In the embodiment, the method in which the control unit 1601 starts data transmission after receiving lock detection signals outputted from the PLL circuits 1614 and 1615 is explained. However, the control unit 1601 may start data transmission after waiting for time set in advance.

Figure 20:
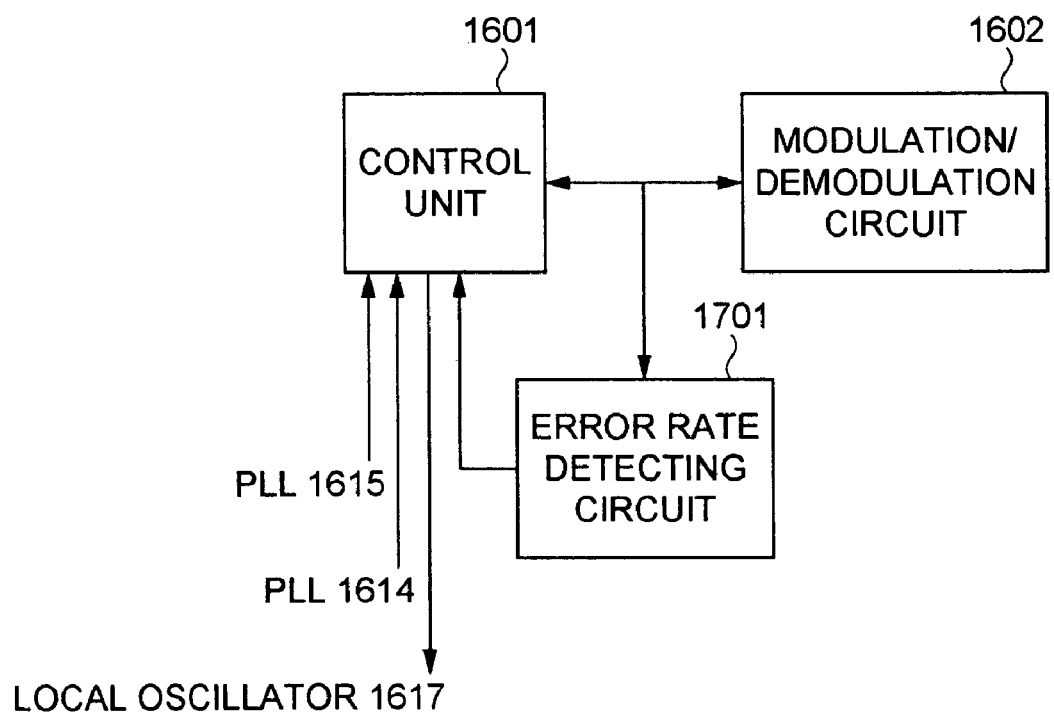
FIG. 20 is a block diagram showing a modification of the radio communication terminal in FIG. 19.

FIG. 20 is a block diagram showing a modification of the radio communication terminal in FIG. 19.

In FIG. 20, an error rate detecting circuit 1701 for detecting an error rate of a reception signal received by the reception unit 1604 is provided. The control unit 1601 in FIG. 19 can set a slot length on the basis of an error rate detected by the error rate detecting circuit 1701. For example, the error rate detecting circuit 1701 can monitor an error rate of a specific frequency and the control unit 1601 instructs the local oscillator 1617 to hop to the next frequency immediately when an error rate is high. This makes it possible to reduce time during which communication continues at a frequency with a high error rate and improve communication quality. In that case, the error rate detecting circuit 1701 may judge the hopping to the next frequency according to only an error rate in one direction or may feed back an error rate in the other direction to the control unit 1601. The error rate detecting circuit 1701 may judge the hopping to the next frequency not only from an error rate but also from a reception quality of a radio wave such as RSSI.

Figure 21:
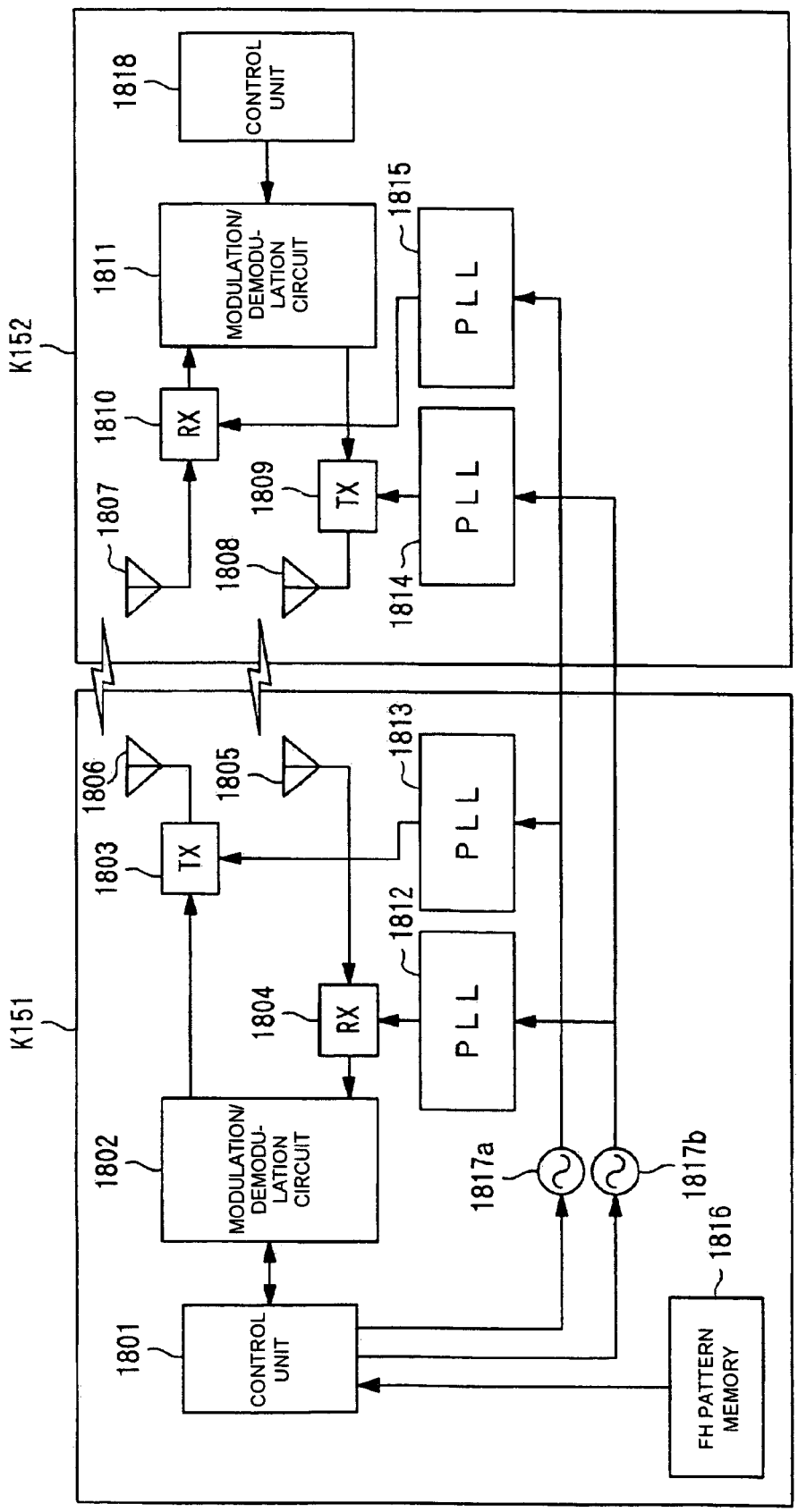
FIG. 21 is a block diagram showing a structure of a radio communication terminal according to a twelfth embodiment of the invention.

FIG. 21 is a block diagram showing a schematic structure of a radio communication terminal according to a twelfth embodiment of the invention.

In FIG. 21, a first housing unit K151 includes a control unit 1801, a frequency hopping pattern memory 1816, a modulation/demodulation circuit 1802, local oscillators 1817a and 1817b, PLL circuits 1812 and 1813, a transmission unit 1803, a reception unit 1804, and antennas for internal radio communication 1805 and 1806. A second housing unit K152 includes antennas for internal radio communication 1807 and 1808, a transmission unit 1809, a reception unit 1810, PLL circuits 1814 and 1815, a modulation/demodulation circuit 1811, and a control unit 1818. The local oscillator 1817a is connected to both the PLL circuits 1813 and 1815 by wire. The local oscillator 1817b is connected to both the PLL circuits 1812 and 1814 by wire.

When the radio communication terminal performs two-way communication between the first housing unit K151 and the second housing unit K152, the control units 1801 and 1818 output transmission data to the modulation/demodulation circuits 1802 and 1811, respectively. The transmission data outputted from the control units 1801 and 1818 are converted into base band signals by the modulation/demodulation circuits 1802 and 1811, respectively, and sent to the transmission units 1803 and 1809, respectively.

The control unit 1801 reads out a hopping frequency sequence included in a hopping pattern from the frequency hopping pattern memory 1816 and sends the hopping frequency sequence to the local oscillators 1817a and 1817b as a frequency designation signal, respectively, at a predetermined period. The local oscillators 1817a and 1817b generate local oscillation signals of a frequency specified by the frequency designation signal, respectively, and send the local oscillation signals to the PLL circuits 1813 and 1815 and the PLL circuits 1812 and 1814, respectively, by wire. When the PLL circuits 1813 and 1815 and the PLL circuits 1812 and 1814 receive the local oscillation signals from the local oscillators 1817a and 1817b, respectively, the PLL circuits 1813 and 1815 and the PLL circuits 1812 and 1814 multiply the local oscillation signals, respectively. The PLL circuits 1813 and 1815 output carrier signals to the transmission unit 1803 and the reception unit 1810, respectively. The PLL circuits 1814 and 1812 output carrier signals to the transmission unit 1809 and the reception unit 1804, respectively.

The transmission units 1803 and 1809 mix the base band signals outputted from the modulation/demodulation circuits 1802 and 1811, respectively, and carrier signals supplied from the PLL circuits 1813 and 1814, respectively, and superimpose the base band signals outputted from the modulation/demodulation circuits 1802 and 1811, respectively, on carrier waves to thereby perform up-convert for the transmission data. When the base band signals outputted from the modulation/demodulation circuits 1802 and 1811, respectively, are superimposed on the carrier waves, the base band signals are sent via the antennas for internal radio communication 1806 and 1809, respectively. When transmission data is transmitted via the antennas for internal radio communication 1806 and 1809, respectively, the transmission data is received via the antennas for internal radio communication 1807 and 1805, respectively.

Reception signals received by the antennas for internal radio communication 1807 and 1805 are sent to the reception units 1810 and 1804, respectively. The reception units 1810 and 1804 mix the reception signals received by the antennas for internal radio communication 1807 and 1805, respectively, and detection signals supplied from the PLL circuits 1815 and 1821, respectively, to perform down-convert for the respective reception signals. Signals outputted from the reception units 1810 and 1804 are sent to the modulation/demodulation circuits 1811 and 1802, respectively. After demodulation processing is applied to the signals by the modulation/demodulation circuits 1811 and 1802, it is possible to apply various kinds of processing such as display processing and storage processing to the signals via the control units 1818 and 1801.

It is possible to store a hopping pattern, which is set such that hopping frequencies in a hopping frequency sequence do not overlap one another, in the frequency hopping pattern memory 1816. The control unit 1801 can output a specific hopping pattern read out from the frequency hopping pattern memory 1816 to the local oscillator 1817a. In addition, the control unit 1801 can output a hopping pattern, which is different from a hopping pattern outputted to the local oscillator 1817, to the local oscillator 1817b.

This makes it possible for both the PLL circuits 1813 and 1815 to share a local oscillation signal outputted from the local oscillator 1817a while making it possible to prevent transmission data transmitted from the transmission unit 1803 and transmission data transmitted from the transmission unit 1809 from colliding with each other in an identical band. In addition, it is possible for the PLL circuits 1812 and 1814 to share a local oscillation signal outputted from the local oscillator 1817b. Therefore, even in an inferior communication environment in which it is impossible to synchronize a frequency with a hopping pattern on the reception side correctly, it is possible to cause the radio communication terminal to perform two-way communication by the frequency hopping system stably. Since a mechanism for performing initial acquisition is unnecessary, it is possible to simplify a circuit structure of a radio reception unit. In addition, it is possible to improve transmission efficiency by eliminating a preamble for synchronizing frequencies.

Note that, in the embodiment described above, the method of using a PLL circuit in order to multiply a local oscillation signal is explained. However, a DLL (Delay Locked Loop) circuit may be used.

In addition, in the embodiment, the method of hopping a local oscillation signal in order to spread a spectrum of radio communication data is explained. However, a frequency of a local oscillation signal may be changed continuously by chirping the local oscillation signal. This makes it possible to obtain an effect of controlling an influence of interference from other stations in the same manner as the frequency hopping system. In addition, it is unnecessary to change a frequency sharply at every fixed period as in frequency hopping. Since unnecessary radiation in changing a frequency is reduced, there is an effect in a reduction of EMC and EMI.

Figure 22:
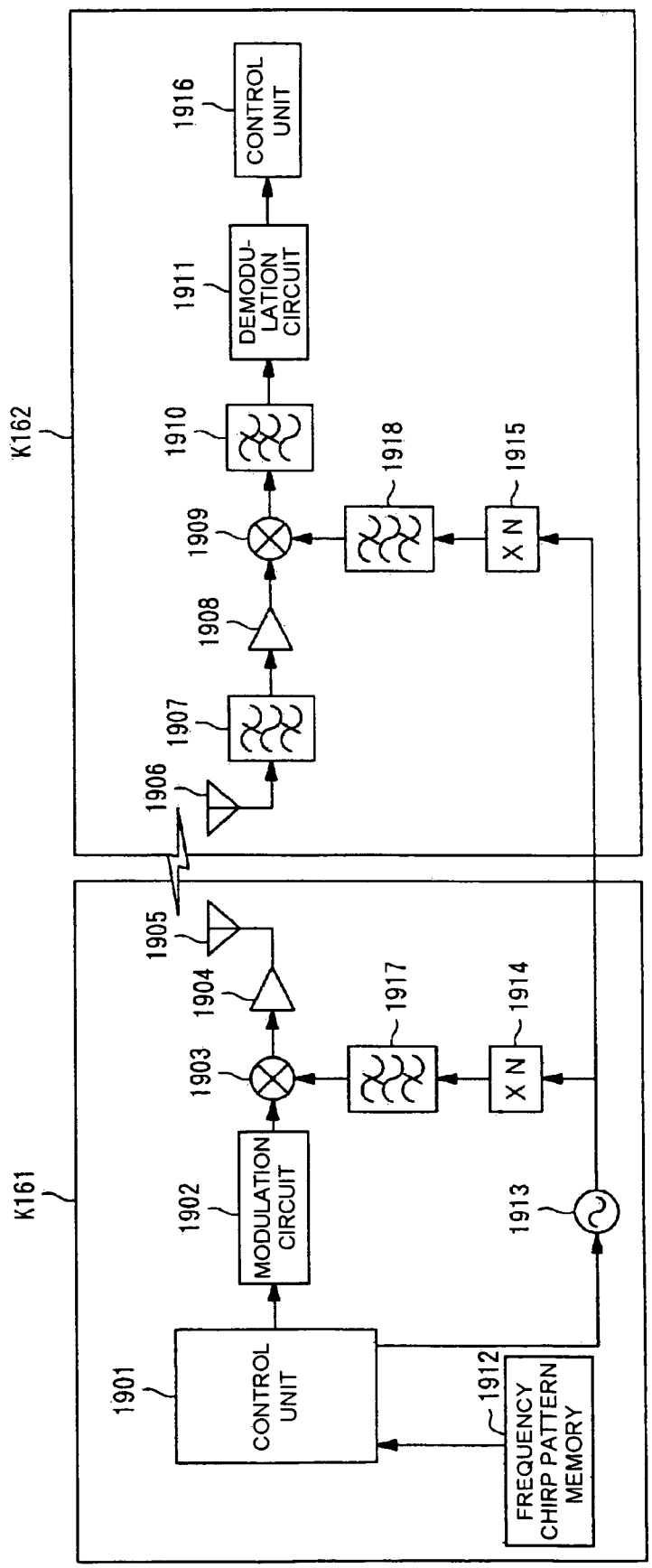
FIG. 22 is a block diagram showing a structure of a radio communication terminal according to a thirteenth embodiment of the invention.

FIG. 22 is a block diagram showing a schematic structure of a radio communication terminal according to a thirteenth embodiment of the invention.

In FIG. 22, a first housing unit K161 includes a control unit 1901 that controls entire communication processing between the first housing unit K161 and a second housing unit K162, a frequency chirp pattern memory 1912 that stores a frequency chirp pattern, a local oscillator 1913 that sends a local oscillation signal to N-multiplying circuits 1914 and 1915 by wire while chirping a frequency in accordance with control from the control unit 1901, a modulation circuit 1902 that converts transmission data into a base band signal, the N-multiplying circuit 1914 that generates a carrier signal by N (N is a positive integer)-multiplying a local oscillation signal sent from the local oscillator 1913 by wire, a band-pass filter 1917 that attenuates an unnecessary frequency component of a signal outputted from the N-multiplying circuit 1914, a mixer 1903 that mixes a carrier signal outputted from the N-multiplying circuit 1914 in a base band signal outputted from the modulation circuit 1902, an amplifier 1904 that amplifies a signal outputted from the mixer 1903, and an antenna for internal radio communication 1905 that performs transmission of a radio wave for internal radio communication on the first housing unit K161 side.

A second housing unit K162 includes an antenna for internal radio communication 1906 that performs reception of a radio wave for internal radio communication on the second housing unit K162 side, a band-pass filter 1907 that attenuates an unnecessary frequency component included in a reception signal received by the antenna for internal radio communication 1906, a low-noise amplifier 1908 that amplifies a reception signal outputted from the band-pass filter 1907, an N-multiplying circuit 1915 that generates a detection signal by N-multiplying a local oscillation signal sent from the local oscillator 1913 by wire, a band-pass filter 1918 that attenuates an unnecessary frequency component of a signal outputted from the N-multiplying circuit 1915, a mixer 1909 that mixes a detection signal outputted from the N-multiplying circuit 1915 in a reception signal outputted from the low-noise amplifier 1908, a low-pass filter 1910 that attenuates an unnecessary high-frequency component included in an output signal from the mixer 1909, a demodulation circuit 1911 that performs demodulation processing for a reception signal outputted from the low-pass filter 1910, and a control unit 1916 that performs processing for a signal outputted from the modulation circuit 1911.

Figure 23:
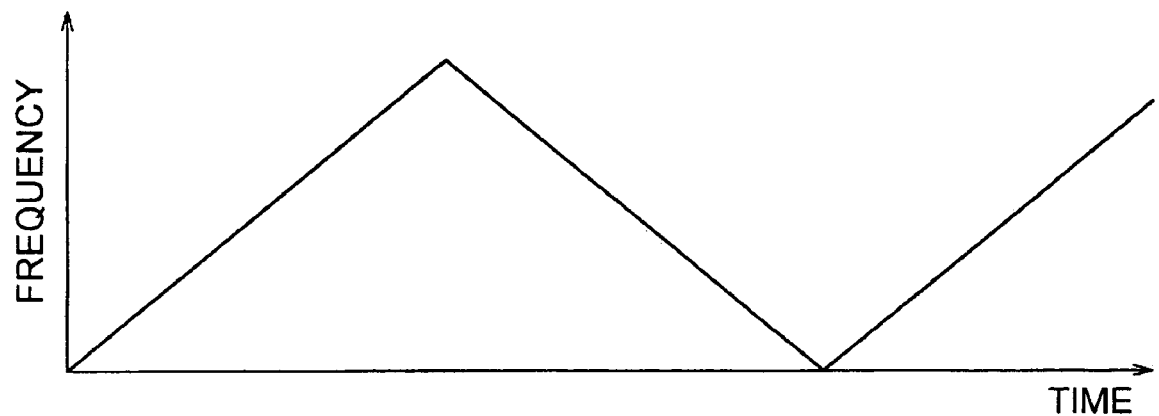
FIG. 23 is a graph showing an example of a form of a frequency chirp pattern.

FIG. 23 is a diagram showing an example of a form of a frequency chirp pattern according to an embodiment of the invention.

In FIG. 23, a frequency chirp pattern for continuously changing a frequency is stored in the frequency chirp pattern memory 1912.

In FIG. 22, when the control unit 1901 sends transmission data to the modulation circuit 1902, the modulation circuit 1902 converts the transmission data into a base band signal and outputs the base band signal to the mixer 1903. The control unit 1901 reads out a frequency chirp pattern from the frequency chirp pattern memory 1912 and sends a control signal for designating a frequency specified by the frequency chirp pattern to the local oscillator 1913. The local oscillator 1913 generates a local oscillation signal of a frequency designated by the control signal sent from the control unit 1901 and sends the local oscillation signal to the N-multiplying circuits 1914 and 1915 by wire. When the N-multiplying circuits 1914 and 1915 receive local oscillation signals from the local oscillator 1913, respectively, the N-multiplying circuits 1914 and 1915 N-multiply the local oscillation signals, respectively, remove unnecessary frequency components of the local oscillation signals with the band-pass filters 1917 and 1918, and, then, output the local oscillation signals to the mixers 1903 and 1909, respectively. It is possible to set time until an N-multiplied high-frequency signal stabilizes extremely short by fixing the multiplication number N of the N-multiplying circuits 1914 and 1915.

The mixer 1903 mixes the base band signal outputted from the modulation circuit 1902 and a signal supplied from the N-multiplying circuit 1914 and superimposes the base band signal outputted from the modulation circuit 1902 on a carrier wave to thereby perform up-convert for the transmission data. When the base band signal outputted from the modulation circuit 1902 is superimposed on the carrier wave, the signal is amplified by the amplifier 1904 and, then, sent via the antenna for internal radio communication 1905. When transmission data is sent via the antenna for internal radio communication 1905, the transmission data is received via the antenna for internal radio communication 1906.

A reception signal received via the antenna for internal radio communication 1906 is amplified by the low-noise amplifier 1908 after an unnecessary frequency component of the reception signal is attenuated by the band-pass filter 1907. The reception signal amplified by the low-noise amplifier 1908 is sent to the mixer 1909. The mixer 1909 mixes the reception signal sent from the low-noise amplifier 1908 and a signal supplied from the N-multiplying circuit 1915 to perform down-convert for the reception signal.

A signal outputted from the mixer 1909 is sent to the demodulation circuit 1911 after an unnecessary high-frequency component of the signal is attenuated by the low-pass filter 1910. After demodulation processing is applied to the signal by the demodulation circuit 1911, it is possible to apply various kinds of processing such as display processing and storage processing to the signal via the control unit 1916.

Figure 24:
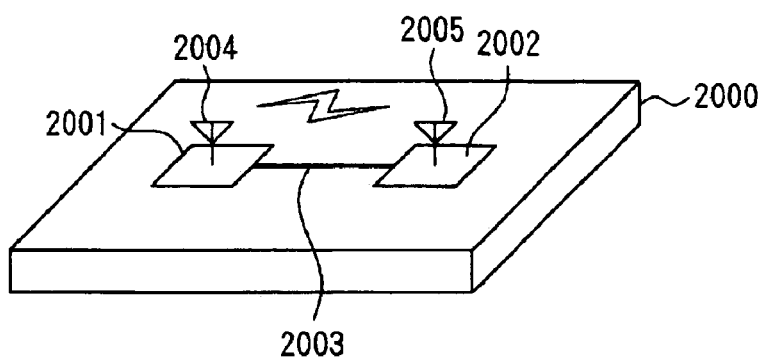
FIG. 24 is a perspective view showing a radio communication system according to a fourteenth embodiment of the invention.

FIG. 24 is a perspective view showing a radio communication system according to a fourteenth embodiment of the invention.

In FIG. 24, semiconductor chips 2001 and 2002 are packaged on a packaging substrate 2000. Integrated circuits are formed on the semiconductor chips 2001 and 2002, respectively. A method of packaging the semiconductor chips 2001 and 2002 on the packaging substrate 2000 may be face-down packaging or face-up packaging. An antenna for internal radio communication 2004 is formed on the semiconductor chip 2001. In addition, an internal radio communication control unit, which performs data transmission between the semiconductor chips 2001 and 2002 through internal radio communication in accordance with a predetermined frequency hopping sequence, is mounted on the semiconductor chip 2001. An antenna for internal radio communication 2005 is formed on the semiconductor chip 2002. In addition, an internal radio communication control unit, which performs data transmission between the semiconductor chips 2001 and 2002 through internal radio communication in accordance with a predetermined frequency hopping sequence, is mounted on the semiconductor chip 2002. Moreover, a wiring 2003, which sends information for causing the radio communication terminal to perform frequency hopping in accordance with a frequency hopping sequence to both the semiconductor chips 2001 and 2002 by wire, is formed on the packaging substrate 2000. It is possible to store the information for causing the radio communication terminal to perform frequency hopping in one of the semiconductor chips 2001 and 2002. The information for causing the radio communication terminal to perform frequency hopping is transmitted to the other one of the semiconductor chips 2001 and 2002. This makes it possible for both the semiconductor chips 2001 and 2002 to share the information for causing the radio communication terminal to perform frequency hopping.

When a radio communication terminal performs data transmission between the semiconductor chips 2001 and 2002, it is possible to perform radio communication between the semiconductor chips 2001 and 2002 via the antennas for internal radio communication 2004 and 2005 while exchanging the information for causing the radio communication terminal to perform frequency hopping between the semiconductor chips 2001 and 2002 via the wiring 2003.

This makes it possible to perform radio communication between the semiconductor chips 2001 and 2002 packaged on the packaging substrate 2000 in the frequency hopping system without sending the information for causing the radio communication terminal to perform frequency hopping by radio. Therefore, it is possible to reduce the number of wirings formed on the packaging substrate 2000. In addition, it is possible to cause the radio communication terminal to perform exchange of a large quantity of data between the semiconductor chips 2001 and 2002 at high speed while realizing simplification of a reception circuit.

Note that, in the embodiment in FIG. 24, the method of sending information for causing the radio communication terminal to perform frequency hopping to both the semiconductor chips 2001 and 2002 by wire is explained. However, a local oscillation signal, a frequency of which changes according to hopping or chirping, may be sent to both the semiconductor chips 2001 and 2002 by wire. This makes it possible to avoid various problems involved in an increase in speed of transmission data by transmitting a group of signals, high-speed transmission of which is difficult, by radio, and avoid complication of a system involved in making transmission wireless by transmitting a local oscillation signal necessary for radio transmission by wire.

Figure 25:
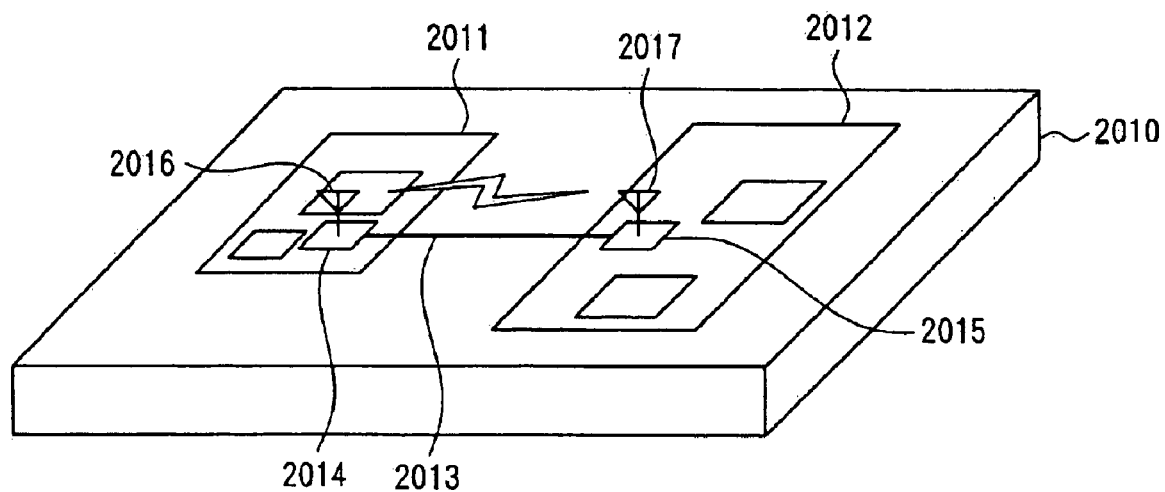
FIG. 25 is a perspective view showing a radio communication system according to a fifteenth embodiment of the invention.

FIG. 25 is a perspective view showing a radio communication system according to a fifteenth embodiment of the invention.

In FIG. 25, semiconductor modules 2011 and 2012 are packaged on a packaging substrate 2010. Electronic components such as semiconductor chips 2014 and 2015 are mounted on the semiconductor modules 2011 and 2012, respectively. Integrated circuits are formed on the semiconductor chips 2014 and 2015. An antenna for internal radio communication 2016 is formed on the semiconductor chip 2014. In addition, an internal radio communication control unit, which performs data transmission between the semiconductor modules 2011 and 2012 through internal radio communication in accordance with a predetermined frequency hopping sequence, is mounted on the semiconductor chip 2014. An antenna for internal radio communication 2017 is formed on the semiconductor chip 2015. In addition, an internal radio communication control unit, which performs data transmission between the semiconductor modules 2011 and 2012 through internal radio communication in accordance with a predetermined frequency hopping sequence, is mounted on the semiconductor chip 2015. Moreover, a wiring 2013, which sends information for causing the radio communication terminal to perform frequency hopping in accordance with a frequency hopping sequence to both the semiconductor chips 2014 and 2015 by wire, is formed on the packaging substrate 2010. It is possible to store the information for causing the radio communication terminal to perform frequency hopping in one of the semiconductor chips 2014 and 2015. The information for causing the radio communication terminal to perform frequency hopping is transmitted to the other one of the semiconductor chips 2014 and 2015 via the wiring 2013. This makes it possible for both the semiconductor chips 2014 and 2015 to share the information for causing the radio communication terminal to perform frequency hopping.

When a radio communication terminal performs data transmission between the semiconductor modules 2011 and 2012, it is possible to perform radio communication between the semiconductor chips 2014 and 2015 via the antennas for internal radio communication 2016 and 2017 while exchanging information for causing the radio communication terminal to perform frequency hopping between the semiconductor chips 2014 and 2015 via the wiring 2013. This makes it possible to cause the radio communication terminal to perform radio communication between the semiconductor modules 2011 and 2012 packaged on the packaging substrate 2010 in the frequency hopping system without sending information for causing the radio communication terminal to perform frequency hopping by radio. Thus, it is possible to reduce the number of wirings formed on the packaging substrate 2010.

Note that, in the embodiment in FIG. 25, the method of sending information for causing the radio communication terminal to perform frequency hopping to both the semiconductor chips 2014 and 2015 by wire is explained. However, a local oscillation signal, a frequency of which changes according to hopping or chirping, may be sent to both the semiconductor chips 2014 and 2015 by wire.

Figure 26:
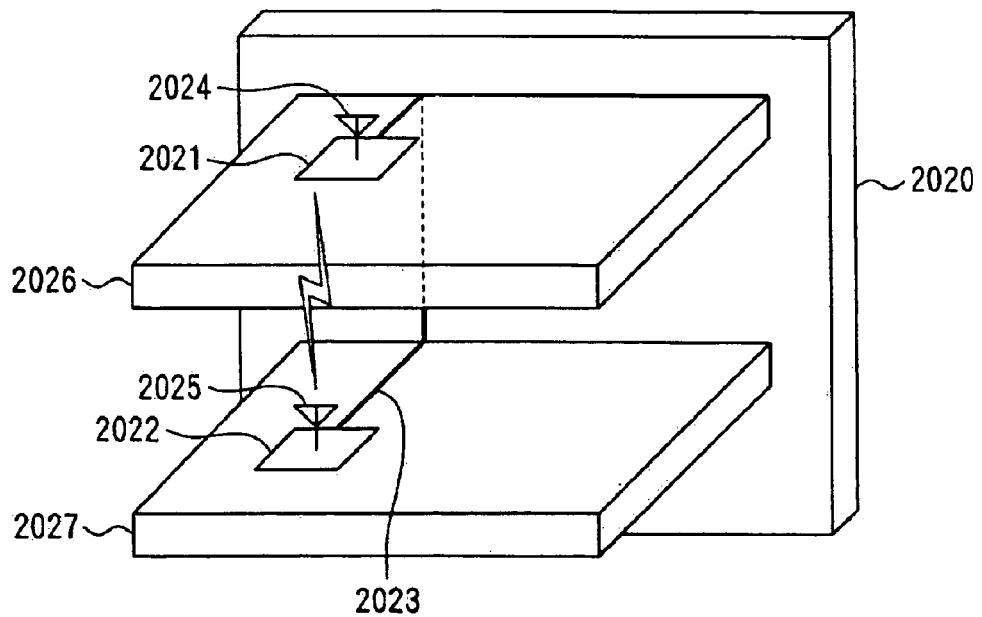
FIG. 26 is a perspective view showing a radio communication system according to a sixteenth embodiment of the invention.

FIG. 26 is a perspective view showing a radio communication system according to a sixteenth embodiment of the invention.

In FIG. 26, semiconductor chips 2021 and 2022 are packaged on packaging substrates 2026 and 2027, respectively. Integrated circuits are formed on the semiconductor chips 2021 and 2022, respectively. Ends of the packaging substrates 2026 and 2027 are connected to a packaging substrate 2020. The packaging substrates 2026 and 2027 are stacked while being supported by the packaging substrate 2020. An antenna for internal radio communication 2024 is formed on the semiconductor chip 2021. In addition, an internal radio communication control unit, which performs data transmission between the packaging substrates 2026 and 2027 through internal radio communication in accordance with a predetermined frequency hopping sequence, is mounted on the semiconductor chip 2021. An antenna for internal radio communication 2025 is formed on the semiconductor chip 2022. In addition, an internal radio communication control unit, which performs data transmission between the packaging substrates 2026 and 2027 through internal radio communication in accordance with a predetermined frequency hopping sequence, is mounted on the semiconductor chip 2022. Moreover, a wiring 2023, which sends information for causing the radio communication terminal to perform frequency hopping in accordance with a frequency hopping sequence to both the semiconductor chips 2021 and 2022 by wire, is formed on the packaging substrates 2020, 2026, and 2027. Note that it is possible to store the information for causing the radio communication terminal to perform frequency hopping in one of the semiconductor chips 2021 and 2022. The information for causing the radio communication terminal to perform frequency hopping is transmitted to the other one of the semiconductor chips 2021 and 2022. This makes it possible for both the semiconductor chips 2021 and 2022 to share the information for causing the radio communication terminal to perform frequency hopping.

When a radio communication terminal performs data transmission among the packaging substrates 2020, 2026, and 2027, it is possible to perform radio communication between the semiconductor chips 2021 and 2022 via the antennas for internal radio communication 2024 and 2025 while exchanging the information for causing the radio communication terminal to perform frequency hopping between the semiconductor chips 2021 and 2022 via the wiring 2023. This makes it possible to cause the radio communication terminal to perform radio communication between the packaging substrates 2026 and 2027, on which the semiconductor chips 2021 and 2022 are packaged, respectively, in the frequency hopping system without sending the information for causing the radio communication terminal to perform frequency hopping by radio. Thus, it is possible to reduce the number of wirings formed on the packaging substrates 2020, 2026, and 2027.

Note that, in the embodiment in FIG. 26, the method of sending the information for causing the radio communication terminal to perform frequency hopping to both the semiconductor chips 2021 and 2022 by wire is explained. However, a local oscillation signal, a frequency of which changes according to hopping or chirping, may be sent to both the semiconductor chips 2021 and 2022 by wire.

FIG. 27 is a perspective view showing a radio communication system according to a seventeenth embodiment of the invention in comparison with a conventional example.

Figure 27A:
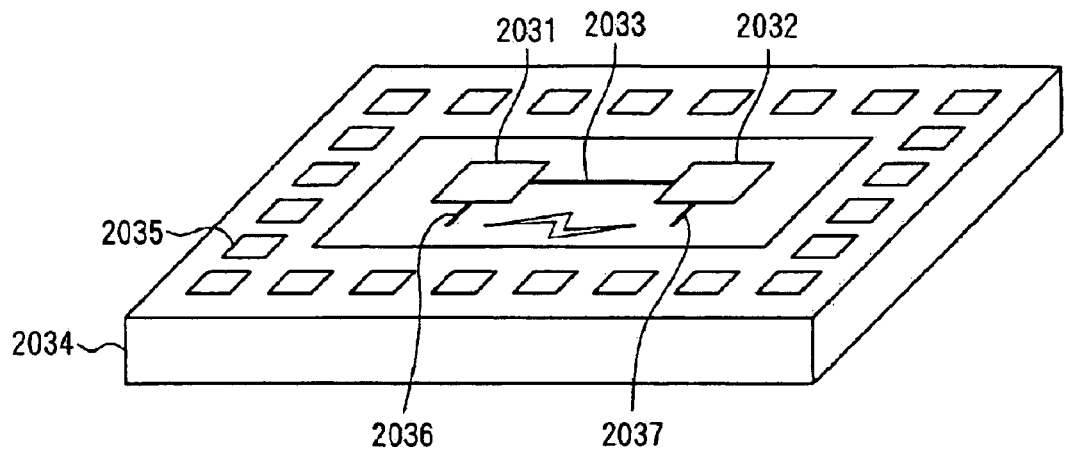
FIG. 27 is a perspective view showing a radio communication system according to a seventeenth embodiment of the invention.

In FIG. 27A, circuit blocks 2031 and 2032 are formed on a semiconductor chip 2034. Pad electrodes 2035 are arranged around the circuit blocks 2031 and 2032. An antenna for internal radio communication 2036 is formed on the semiconductor chip 2034 in association with the circuit block 2031. In addition, an internal radio communication control unit, which performs data transmission between the circuit blocks 2031 and 2032 through internal radio communication in accordance with a predetermined frequency hopping sequence, is mounted on the semiconductor chip 2034. An antenna for internal radio communication 2037 is formed on the identical semiconductor chip 2034 in association with the circuit block 2032. In addition, an internal radio communication control unit, which performs data transmission between the circuit blocks 2031 and 2032 through internal radio communication in accordance with a predetermined frequency hopping sequence, is mounted on the semiconductor chip 2034. Moreover, a wiring 2033, which sends information for causing the radio communication terminal to perform frequency hopping in accordance with a frequency hopping sequence to both the circuit blocks 2031 and 2032 by wire, is formed on the semiconductor chip 2034. Note that it is possible to store the information for causing the radio communication terminal to perform frequency hopping in one of the circuit blocks 2031 and 2032. The information for causing the radio communication terminal to perform frequency hopping is transmitted to the other one of the circuit blocks 2031 and 2032 via the wiring 2033. This makes it possible for both the circuit blocks 2031 and 2032 to share the information for causing the radio communication terminal to perform frequency hopping.

When a radio communication terminal performs data transmission between circuit blocks 2031 and 2032, it is possible to perform radio communication between the circuit blocks 2031 and 2032 via the antennas for internal radio communication 2036 and 2037 while exchanging the information for causing the radio communication terminal to perform frequency hopping between the circuit blocks 2031 and 2032 via the wiring 2033. This makes it possible to cause the radio communication terminal to perform radio communication between the circuit blocks 2031 and 2032 formed on the identical semiconductor chip 2034 in the frequency hopping system without sending the information for causing the radio communication terminal to perform frequency hopping by radio. Thus, it is possible to reduce the number of wirings formed on the semiconductor chip 2034.

Note that, in the embodiment in FIG. 27A, the method of sending information for causing the radio communication terminal to perform frequency hopping to both the circuit blocks 2031 and 2302 by wire is explained. However, a local oscillation signal, a frequency of which changes according to hopping or chirping, may be sent to both the circuit blocks 2031 and 2302 by wire.

Figure 27B:
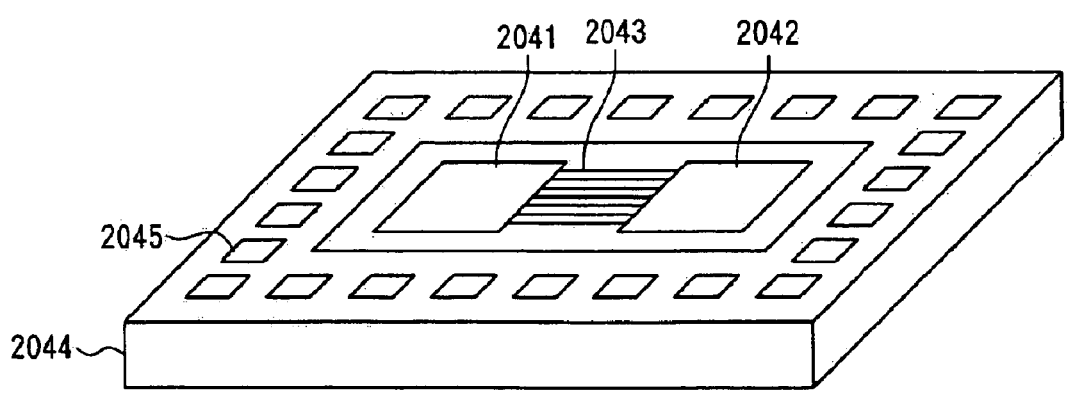

On the other hand, in FIG. 27B, circuit blocks 2041 and 2042 are formed on a semiconductor chip 2044. Pad electrodes 2045 are arranged around the circuit blocks 2041 and 2042. Wirings 2043 for performing data transmission between the circuit blocks 2031 and 2302 are formed on the semiconductor chip 2044.

In FIG. 27B, data transmission is performed between the circuit blocks 2041 and 2042 by performing communication between the circuit blocks 2041 and 2042 via the wiring 2043. Therefore, in order to transmit a large quantity of data between the circuit blocks 2041 and 2042 at high speed, the number of wirings 2043 becomes enormous. Thus, it is necessary to cope with an increase in a wiring space on the semiconductor chip 2044. In addition, it is necessary to draw around the wirings 2043 on the semiconductor chip 2044. As a result, layout design is complicated.

What is claimed is:

1. A radio communication terminal comprising:
   a radio transmission unit that transmits transmission data in accordance with a predetermined frequency hopping sequence;
   a radio reception unit that receives reception data in accordance with a predetermined frequency hopping sequence; and
   a hopping control unit that sends, by wire, information that causes the radio communication terminal to perform frequency hopping in accordance with the predetermined frequency hopping sequences to both the radio transmission unit and the radio reception unit.

2. The radio communication terminal according to any one of claims 1, further comprising: a slot length setting unit that sets a slot length on the basis of an amount of data in data communication, wherein
   the hopping control unit changes a hopping frequency at the time of communication on the basis of a slot length set by the slot length setting unit.

3. A radio communication terminal comprising:
   a first radio transmission unit that transmits transmission data in accordance with a first frequency hopping sequence;
   a first radio reception unit that receives reception data in accordance with the first frequency hopping sequence;
   a second radio transmission unit that transmits transmission data in accordance with a second frequency hopping sequence in which a hopping frequency at a time of transmission is set so as not to overlap a hopping frequency specified by the first frequency hopping sequence;
   a second radio reception unit that receives reception data in accordance with the second frequency hopping sequence; and
   a hopping control unit that sends, by wire, information that causes the radio communication terminal to perform frequency hopping in accordance with the first frequency hopping sequence to both the first radio transmission unit and the first radio reception unit and sends, by wire, information that causes the radio communication terminal to perform frequency hopping in accordance with the second frequency hopping sequence to both the second radio transmission unit and the second radio reception unit.

4. The radio communication terminal according to claim 3, wherein the hopping control unit comprises:
   a hopping pattern acquiring unit that acquires a hopping pattern in which hopping frequencies are arranged so as not to overlap one another; and
   a hopping pattern delaying unit that delays an output of a hopping frequency included in the hopping pattern by one slot; and
   wherein the hopping control unit sends, by wire, a hopping pattern acquired by the hopping pattern acquiring unit to both the first radio transmission unit and the first radio reception unit in accordance with predetermined hopping timing and sends, by wire, a hopping pattern outputted from the hopping pattern delaying unit to both the second radio transmission unit and the second radio reception unit in accordance with the hopping timing.

5. The radio communication terminal according to claim 3, wherein the first and the second radio transmission units and the first and the second radio reception units are arranged on at least one of semiconductor chip, on a printed board, in a housing, in a module, in a package, or in apparatuses that are used integrally.

6. A radio communication terminal comprising:
   a radio transmission unit that transmits transmission data in accordance with a predetermined frequency hopping sequence;
   a radio reception unit that receives reception data in accordance with a predetermined frequency hopping sequence;
   a first hopping control unit that controls frequency hopping in the radio transmission unit;
   a second hopping control unit that controls frequency hopping in the radio reception unit; and
   a wire control unit that controls, by wire, the first hopping control unit and the second hopping control unit such that the frequency hopping sequences of the radio transmission unit and the radio reception unit coincide with each other.

7. The radio communication terminal according to claim 6, further comprising:
   a first hopping pattern storing unit that is provided on a first hopping control unit side and stores a hopping pattern in which hopping frequencies are arranged; and
   a second hopping pattern storing unit that is provided on a second hopping control unit side and stores a hopping pattern identical with the hopping pattern stored in the first hopping pattern storing unit;
   wherein the wire control unit selects a hopping pattern and setting of an initial phase at a start of communication such that hopping patterns and hopping timings of the radio transmission unit and the radio reception unit coincide with each other.

8. The radio communication terminal according to claim 6, wherein the first hopping control unit includes a first hopping pattern generating unit that generates a hopping pattern in which hopping frequencies are arranged;
   the second hopping control unit includes a second hopping pattern generating unit that generates a hopping pattern identical with the hopping pattern generated by the first hopping pattern generating unit; and
   the wire control unit causes the radio communication terminal to send a reset signal for causing hopping timings of the hopping patterns to coincide with each other between the first hopping control unit and the second hopping control unit.

9. The radio communication terminal according to claim 6, further comprising:
   a slot length setting unit that sets a slot length on the basis of an amount of data in data communication, wherein at least one of the first and the second hopping control units changes a hopping frequency at the time of communication on the basis of a slot length set by the slot length setting unit.

10. The radio communication terminal according to claim 6, further comprising:
an error rate detecting unit that detects an error rate of reception data received by the radio reception unit; and
a hopping sequence changing unit that changes the frequency hopping sequence on the basis of an error rate detected by the error rate detecting unit.

11. The radio communication terminal according to claim 6, wherein the radio transmission unit and the radio reception unit are arranged on at least one of a semiconductor chip, a printed board, a housing, a module, a package, or apparatuses that are used integrally.

12. A radio communication terminal comprising:
a local oscillator that generates a local oscillation signal;
a radio transmission unit that transmits radio communication data while receiving the local oscillation signal;
a radio reception unit that receives radio communication data while receiving the local oscillation signal;
a control unit that causes the radio communication terminal to perform hopping or chirping for a frequency of the local oscillation signal generated by the local oscillator; and
a wire unit that supplies the local oscillation signal, a frequency of which changes according to the hopping or the chirping, to the radio transmission unit and the radio reception unit.

13. The radio communication terminal according to claim 12, wherein the radio transmission unit further comprises:
a first frequency multiplying circuit that multiplies a frequency of the local oscillation signal to thereby generate a first carrier signal; and
a first mixer that mixes the first carrier signal in a base band signal to thereby perform up-convert for the base band signal;
wherein the radio reception unit comprises:
a second frequency multiplying circuit that multiplies a frequency of the local oscillation signal to thereby generate a detection signal; and
a second mixer that mixes the detection signal in a reception signal to thereby perform down-convert for the reception signal.

14. A radio communication terminal according to claim 12, further comprising:
an error rate detecting unit that detects an error rate of reception data received by the radio reception unit;
wherein the control unit changes a hopping frequency or a chirping frequency at the time of communication on the basis of an error rate detected by the error rate detecting unit.

15. A radio communication terminal comprising:
a first local oscillator that generates a first local oscillation signal;
a first radio transmission unit that transmits radio communication data while receiving the first local oscillation signal;
a first radio reception unit that receives radio communication data while receiving the first local oscillation signal;
a second local oscillator that generates a second local oscillation signal;
a second radio transmission unit that transmits radio communication data while receiving a second local oscillation signal;
a second radio reception unit that receives radio communication data while receiving the second local oscillation signal;
a control unit that causes the radio communication terminal to perform hopping or chirping for frequencies of the first and the second local oscillation signals generated by the first and the second local oscillators, respectively, such that frequencies outputted from the first and the second local oscillators do not overlap each other;
a first wire unit that supplies, by wire, the first local oscillation signal, a frequency of which changes according to the hopping or the chirping, to the first radio transmission unit and the first radio reception unit; and
a second wire unit that supplies, by wire, the second local oscillation signal, a frequency of which changes according to the hopping or the chirping, to the second radio transmission unit and the second radio reception unit.

16. The radio communication terminal according to claim 15, further comprising:
an error rate detecting unit that detects an error rate of reception data received by at least one of the first radio reception unit and the second radio reception unit;
wherein the control unit changes a hopping frequency or a chirping frequency at the time of communication on the basis of an error rate detected by the error rate detecting unit.

17. The radio communication terminal according to claim 15, further comprising:
a slot length setting unit that sets a slot length on the basis of an amount of data in data communication
wherein the control unit changes a hopping frequency or a chirping frequency at the time of communication on the basis of a slot length set by the slot length setting unit.

18. The radio communication terminal according to claim 15, wherein the first and the second radio transmission units and the first and the second radio reception units are arranged on at least one of a semiconductor chip, a printed board, a housing, a module, a package, or in apparatuses that are used integrally.

19. A radio communication terminal comprising:
a first housing unit;
a second housing unit coupled to the first housing unit;
a coupling unit that couples the first housing unit and the second housing unit such that a positional relationship between the first housing unit and the second housing unit can be changed;
an antenna for external radio communication mounted on the first housing unit or the second housing unit;
an external radio communication control unit that is mounted on the first housing unit and control for controls external radio communication performed via the antenna for external radio communication;
a display unit mounted on the second housing unit;
a first antenna for internal radio communication mounted on the first housing unit;
a second antenna for internal radio communication mounted on the second housing unit;
a first internal radio communication control unit that is mounted on the first housing unit and performs internal radio communication processing in accordance with a predetermined frequency hopping sequence;
a second internal radio communication control unit that is mounted on the second housing unit and performs internal radio communication processing in accordance with a predetermined frequency hopping sequence; and
a hopping control unit that sends, by wire, information that causes the radio communication terminal to perform frequency hopping in accordance with the frequency hopping sequence to both the first and the second internal radio communication control units.

20. A radio communication terminal comprising:
first and second circuit blocks formed on semiconductor chip;
a first antenna for internal radio communication formed on the semiconductor chip in association with the first circuit block;
a second antenna for internal radio communication formed on the semiconductor chip in association with the second circuit block;
a first internal radio communication control unit that is mounted on the semiconductor chip in association with the first circuit block and transmits data between the first and the second circuit blocks through internal radio communication in accordance with a predetermined frequency hopping sequence;
a second internal radio communication control unit that is mounted on the semiconductor chip in association with the second circuit block and transmits data between the first and the second circuit blocks through internal radio communication in accordance with a predetermined frequency hopping sequence; and
a hopping control unit that sends, by wire, information that causes the radio communication terminal to perform frequency hopping in accordance with the frequency hopping sequences to both the first and the second internal radio communication control units.

21. A radio communication terminal comprising:
first and second semiconductor chips packaged on a packaging substrate;
a first antenna for internal radio communication formed on the first semiconductor chip;
a second antenna for internal radio communication formed on the second semiconductor chip;
a first internal radio communication control unit that is mounted on the first semiconductor chip and transmits data between the first and the second semiconductor chips through internal radio communication in accordance with a predetermined frequency hopping sequence;
a second internal radio communication control unit that is mounted on the second semiconductor chip and transmits data between the first and the second semiconductor chips through internal radio communication in accordance with a predetermined frequency hopping sequence; and
a hopping control unit that sends, by wire, information that causes the radio communication terminal to perform frequency hopping in accordance with the frequency hopping sequences to both the first and the second internal radio communication control units.

22. A radio communication terminal comprising:
a first packaging substrate on which a first semiconductor chip is packaged;
a second packaging substrate on which a second semiconductor chip is packaged;
a first antenna for internal radio communication that is formed on the first packaging substrate and connected to the first semiconductor chip;
a second antenna for internal radio communication that is formed on the second packaging substrate and connected to the second semiconductor chip;
a first internal radio communication control unit that is mounted on the first semiconductor chip and transmits data between the first and the second packaging substrates through internal radio communication in accordance with a predetermined frequency hopping sequence;
a second internal radio communication control unit that is mounted on the second semiconductor chip and transmits data between the first and the second packaging substrates through internal radio communication in accordance with a predetermined frequency hopping sequence; and
a hopping control unit that sends, by wire, information for causing the radio communication terminal to perform frequency hopping in accordance with the frequency hopping sequences to both the first and the second internal radio communication control unit.

23. A radio communication terminal comprising:
a first housing unit;
a second housing unit coupled to the first housing unit;
a coupling unit that couples the first housing unit and the second housing unit such that a positional relationship between the first housing unit and the second housing unit can be changed;
an antenna for external radio communication mounted on the first housing unit or the second housing unit;
an external radio communication control unit that is mounted on the first housing unit and manages control for external radio communication performed via the antenna for external radio communication;
a display unit mounted on the second housing unit;
a first antenna for internal radio communication mounted on the first housing unit;
a second antenna for internal radio communication mounted on the second housing unit;
a local oscillator that generates a local oscillation signal;
a first internal radio communication control unit that is mounted on the first housing unit and performs internal radio communication processing while receiving the local oscillation signal;
a second internal radio communication control unit that is mounted on the second housing unit and performs internal radio communication processing while receiving the local oscillation signal;
a control unit that causes the radio communication terminal to perform hopping or chirping for a frequency of the local oscillation signal generated by the local oscillator; and
a wire unit that supplies the local oscillation signal, a frequency of which changes according to the hopping or the chirping, to both the first and the second internal radio communication control units by wire.

24. A radio communication terminal comprising:
first and second circuit blocks formed on a semiconductor chip;
a first antenna for internal radio communication formed on the semiconductor chip in association with the first circuit block;
a second antenna for internal radio communication formed on the semiconductor chip in association with the second circuit block;
a local oscillator that generates a local oscillation signal;
a frequency control unit that causes the radio communication terminal to perform hopping or chirping for a frequency of the local oscillation signal generated by the local oscillator;
a first internal radio communication control unit that is mounted on the semiconductor chip in association with the first circuit block and transmits data between the first and the second circuit blocks through internal radio communication while receiving the local oscillation signal, a frequency of which is controlled by the frequency control unit, by wire; and a second internal radio communication control unit that is mounted on the semiconductor chip in association with the second circuit block and transmits data between the first and the second circuit blocks through internal radio communication while receiving the local oscillation signal, a frequency of which is controlled by the frequency control unit, by wire.

25. A radio communication terminal comprising:

first and second semiconductor chips packaged on a packaging substrate;

a first antenna for internal radio communication formed on the first semiconductor chip;

a second antenna for internal radio communication formed on the second semiconductor chip;

a local oscillator that generates a local oscillation signal;

a frequency control unit that causes the radio communication terminal to perform hopping or chirping for a frequency of a local oscillation signal generated by the local oscillator;

a first internal radio communication control unit that is mounted on the first semiconductor chip and transmits data between the first and the second semiconductor chips through internal radio communication while receiving supply of a local oscillator signal, a frequency of which is controlled by the frequency control unit, by wire; and a second internal radio communication control unit that is mounted on the second semiconductor chip and transmits data between the first and the second semiconductor chips through internal radio communication while receiving the local oscillation signal, a frequency of which is controlled by the frequency control unit, by wire.

26. A radio communication terminal comprising:

a first packaging substrate on which a first semiconductor chip is packaged;

a second packaging substrate on which a second semiconductor chip is packaged;

a first antenna for internal radio communication that is formed on the first packaging substrate and connected to the first semiconductor chip;

a second antenna for internal radio communication that is formed on the second packaging substrate and connected to the second semiconductor chip;

a local oscillator that generates a local oscillation signal;

a frequency control unit that causes the radio communication terminal to perform hopping or chirping for a frequency of the local oscillation signal generated by the local oscillator;

a first internal radio communication control unit that is mounted on the first semiconductor chip and transmits data between the first and the second packaging substrates through internal radio communication while receiving the local oscillation signal, a frequency of which is controlled by the frequency control unit, by wire; and a second internal radio communication control unit that is mounted on the second semiconductor chip and performs data transmission between the first and the second packaging substrates through internal radio communication while receiving a local oscillation signal, a frequency of which is controlled by the frequency control unit, by wire.

27. A radio communication control method comprising:

causing a radio communication terminal to perform transmit data of a frequency hopping system between a transmission side and a reception side while supplying, by wire, information for causing the radio communication terminal to perform frequency hopping in accordance with a predetermined frequency hopping sequence to both the transmission side and the reception side.

28. A radio communication control method comprising:

causing a radio communication terminal to perform radio communication of a frequency hopping system or a frequency chirping system between a transmission side and a reception side while supplying, by wire, a local oscillation signal, a frequency of which changes according to hopping or chirping, to both the transmission side and the reception side.

* * * * *